United States Patent
Hosaka et al.

(10) Patent No.: US 10,241,359 B2
(45) Date of Patent: Mar. 26, 2019

(54) LIQUID CRYSTAL DISPLAY DEVICE

(71) Applicants: Nissan Chemical Industries, Ltd., Chiyoda-ku (JP); Kyusyu Nanotec Optics Co. Ltd., Hayami-gun (JP)

(72) Inventors: Kazuyoshi Hosaka, Funabashi (JP); Noritoshi Miki, Funabashi (JP); Hiroyuki Omura, Funabashi (JP); Jun Hashimoto, Funabashi (JP); Junichi Baba, Hayami-gun (JP); Shota Yoshida, Hayami-gun (JP)

(73) Assignees: Nissan Chemical Industries, Ltd., Chiyoda-ku (JP); Kyusyu Nanotec Optics Co., Ltd., Hayami-gun (JP)

( * ) Notice: Subject to any disclaimer, the term of this patent is extended or adjusted under 35 U.S.C. 154(b) by 0 days.

(21) Appl. No.: 15/524,949

(22) PCT Filed: Nov. 6, 2015

(86) PCT No.: PCT/JP2015/081341
§ 371 (c)(1),
(2) Date: May 5, 2017

(87) PCT Pub. No.: WO2016/072498
PCT Pub. Date: May 12, 2016

(65) Prior Publication Data
US 2017/0343840 A1    Nov. 30, 2017

(30) Foreign Application Priority Data

Nov. 7, 2014  (JP) .................................. 2014-227294

(51) Int. Cl.
*G02F 1/1334* (2006.01)
*G02F 1/1337* (2006.01)
(Continued)

(52) U.S. Cl.
CPC .......... *G02F 1/1334* (2013.01); *C09K 19/063* (2013.01); *C09K 19/20* (2013.01);
(Continued)

(58) Field of Classification Search
CPC ............. G02F 1/133723; G02F 1/1334; G02F 2001/133742; G02F 2001/133303;
(Continued)

(56) References Cited

U.S. PATENT DOCUMENTS

2004/0188653 A1* 9/2004 Kataoka ................. C09K 19/14
252/299.01
2012/0229744 A1    9/2012 Hattori et al.
(Continued)

FOREIGN PATENT DOCUMENTS

EP    3 200 022 A1    8/2017
JP    07-05440 A  *  10/1995
(Continued)

OTHER PUBLICATIONS

Extended European Search Report dated May 2, 2018 in European Patent Application No. 15857224.8, 13 pages.
(Continued)

*Primary Examiner* — Ruiyun Zhang
(74) *Attorney, Agent, or Firm* — Oblon, McClelland, Maier & Neustadt, L.L.P.

(57) ABSTRACT

A liquid crystal display device, whereby transparency when no voltage is applied and scattering properties when a voltage is applied, are good, adhesion between a liquid crystal layer and a vertical liquid crystal alignment film is high, and its lifespan is long even in a severe environment. The liquid crystal display device has a liquid crystal layer formed by disposing a liquid crystal composition containing a liquid crystal and a polymerizable compound between a pair of substrates provided with electrodes, and irradiating
(Continued)

and curing the composition with ultraviolet rays by an ultraviolet irradiation apparatus, and at least one substrate is provided with a liquid crystal alignment film to vertically align a liquid crystal, wherein the ultraviolet irradiation apparatus is an ultraviolet irradiation apparatus capable of controlling the irradiation light intensity and wavelength of the ultraviolet rays to be irradiated and the surface temperature of the pair of the substrates.

23 Claims, 2 Drawing Sheets

(51) Int. Cl.
| | |
|---|---|
| C09K 19/06 | (2006.01) |
| C09K 19/20 | (2006.01) |
| C09K 19/56 | (2006.01) |
| C09K 19/30 | (2006.01) |
| C09K 19/04 | (2006.01) |
| C09K 19/54 | (2006.01) |

(52) U.S. Cl.
CPC ...... *C09K 19/2007* (2013.01); *C09K 19/2014* (2013.01); *C09K 19/3003* (2013.01); *C09K 19/56* (2013.01); *G02F 1/1337* (2013.01); C09K 2019/0448 (2013.01); C09K 2019/2035 (2013.01); C09K 2019/548 (2013.01); *Y10T 428/10* (2015.01); *Y10T 428/1005* (2015.01); *Y10T 428/1023* (2015.01)

(58) Field of Classification Search
CPC .............. G02F 2202/023; C09K 19/56; C08G 73/1007; C08G 73/1042; C08G 73/12; Y10T 428/10; Y10T 428/1005; Y10T 428/1023
USPC ........ 428/1.1, 1.2, 1.25, 1.26; 349/123, 130, 349/127
See application file for complete search history.

(56) References Cited

U.S. PATENT DOCUMENTS

2012/0249940 A1\* 10/2012 Choi ................ G02F 1/133753
349/123
2017/0247513 A1  8/2017 Hosaka et al.

FOREIGN PATENT DOCUMENTS

| | | | |
|---|---|---|---|
| JP | 2885116 B2 | 2/1999 | |
| JP | 2008-58374 A | 3/2008 | |
| JP | 4132424 B2 | 6/2008 | |
| WO | WO-2013099937 A1 \* | 7/2013 | ......... C08G 73/1007 |
| WO | 2014/171493 A1 | 10/2014 | |

OTHER PUBLICATIONS

International Search Report dated Dec. 22, 2015 in PCT/JP2015/081341 filed Nov. 6, 2015.

\* cited by examiner

LIQUID CRYSTAL DISPLAY DEVICE

TECHNICAL FIELD

The present invention relates to a transmission/scattering type liquid crystal display device which is in a transparent state when no voltage is applied and in a scattering state when a voltage is applied.

BACKGROUND ART

As a liquid crystal display device employing a liquid crystal material, a TN mode liquid crystal display device is in practical use. In such a mode, light switching is carried out by utilizing the optical rotation property of a liquid crystal, and a liquid crystal display device in this mode requires use of a polarizing plate. However, use of a polarizing plate lowers light utilization efficiency.

As a liquid crystal display device which achieves high light utilization efficiency without using a polarizing plate, a liquid crystal display device in which switching is conducted between a transmission state (also called a transparent state) and a scattering state of a liquid crystal may be mentioned, and a liquid crystal display device employing a polymer dispersed liquid crystal (PDLC) or a polymer network liquid crystal (PNLC) is commonly known.

A liquid crystal display device employing such a liquid crystal is a liquid crystal display device having a liquid crystal layer, that is, a cured product composite (for example, a polymer network) of a liquid crystal and a polymerizable compound, formed by disposing, between a pair of substrates provided with electrodes, a liquid crystal composition containing the polymerizable compound which undergoes polymerization by ultraviolet rays and curing the liquid crystal composition by irradiation with ultraviolet rays. In such a liquid crystal display device, the transmission state and the scattering state of the liquid crystal are controlled by application of a voltage.

A conventional liquid crystal display device employing PDLC or PNLC is a liquid crystal display device (a normal device) which is in a cloudy (scattering) state when no voltage is applied, since liquid crystal molecules are randomly aligned, and is in a transmission state when a voltage is applied, since liquid crystal molecules are aligned in an electric field direction, whereby light is transmitted. However, in a normal device, it is necessary to always apply a voltage in order to obtain a transmission state, and accordingly when it is used for an application which is mainly used in a transparent state, for example, when used for window glass, the electrical power consumption tends to be large.

On the other hand, a liquid crystal display device employing PDLC (a reverse device), which is in a transmission state when no voltage is applied and is in a scattering state when a voltage is applied, has been reported (e.g. Patent Documents 1 and 2).

PRIOR ART DOCUMENTS

Patent Documents

Patent Document 1: Japanese Patent No. 2885116
Patent Document 2: Japanese Patent No. 4132424

DISCLOSURE OF INVENTION

Technical Problem

In the case of PDLC and PNLC, an ultraviolet irradiation apparatus employing a metal halide lamp or a high-pressure mercury lamp as a light source is used in the step of irradiation with ultraviolet rays to form a cured product composite. However, by such a light source, it is difficult to control the intensity, wavelength and temperature of ultraviolet rays, and it is not possible to control the cured product composite to be homogeneous i.e. the size and shape of the polymer network to be as desired, whereby there is a problem that good optical properties (referred to also as transmission/scattering properties) cannot be obtained. Therefore, in the step of irradiation with ultraviolet rays, it is necessary to control the intensity, wavelength and temperature of the light source.

A polymerizable compound in the liquid crystal composition has a role to form a polymer network to obtain desired optical properties and a role as a curing agent to increase adhesion between the liquid crystal layer and the liquid crystal alignment film (referred to also as the vertical liquid crystal alignment film). In order to increase the adhesion to the liquid crystal alignment film, it is necessary to let the polymer network be more densified, but if the polymer network is densified, there will be a problem such that the vertical alignment property of the liquid crystal tends to be impaired, and the optical properties of the reverse device, i.e. the transparency when no voltage is applied and the scattering property when a voltage is applied, tend to be deteriorated. Therefore, the liquid crystal composition to be used in the reverse device is required to be one whereby the vertical alignment property of the liquid crystal at the time of forming the liquid crystal layer becomes high.

In addition, the liquid crystal alignment film used for the reverse device is a highly hydrophobic membrane in order to align the liquid crystal vertically, whereby there is a problem that adhesion between the liquid crystal layer and the liquid crystal alignment film tends to be low. Therefore, to the liquid crystal composition to be used in the reverse device, it is necessary to incorporate the polymerizable compound having a role as a curing agent in a large amount. However, if the polymerizable compound is incorporated in a large amount, the vertical alignment property of the liquid crystal will be impaired, and there will be a problem that the transparency when no voltage is applied and the scattering property when a voltage is applied, tend to be substantially lowered. Therefore, the liquid crystal alignment film to be used for the reverse device, is required to be one presenting a high vertical alignment property of the liquid crystal.

Further, in a case where a reverse device is prepared by using a plastic substrate or film, and it is used as affixed to a window glass of an automobile or architectural building, the reverse device may be used for a long time under an environment of high temperature and high humidity, or under an environment exposed to irradiation with light. Therefore, it is necessary that even in such a harsh environment, the vertical alignment property of the liquid crystal will not be lowered, and adhesion between the liquid crystal layer and the liquid crystal alignment film will be high.

Therefore, it is an object of the present invention to provide a liquid crystal display device, whereby the vertical alignment property of a liquid crystal is high, the optical properties are good, i.e. the transparency when no voltage is applied, and the scattering property when a voltage is applied, are good, further, adhesion between the liquid crystal layer and the liquid crystal alignment film is high, and these properties can be maintained even in an environment exposed to high temperature and high humidity, or to irradiation with light, for a long time.

Solution to Problem

The present inventors have conducted extensive studies in order to accomplish the above object and as a result, have completed the present invention having the following construction.

(1) A liquid crystal display device having a liquid crystal layer formed by disposing a liquid crystal composition containing a liquid crystal and a polymerizable compound between a pair of substrates provided with electrodes and irradiating and curing the composition with ultraviolet rays by an ultraviolet irradiation apparatus, and at least one of the substrates being provided with a liquid crystal alignment film to vertically align a liquid crystal, wherein the ultraviolet irradiation apparatus is an ultraviolet irradiation apparatus capable of controlling the irradiation light intensity and wavelength of the ultraviolet rays to be irradiated and the surface temperature of the pair of the substrates, said liquid crystal composition contains a compound represented by the following formula [1], and said liquid crystal alignment film is a liquid crystal alignment film obtained from a liquid crystal alignment treating agent containing a polymer having a side chain structure represented by the following formula [2-1] or formula [2-2]:

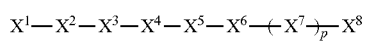
[1]

wherein $X^1$ is at least one selected from the group consisting of the following formula [1-a] to formula [1-g], $X^2$ is at least one bond group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—, $X^3$ is a single bond or —(CH$_2$)$_a$— (a is an integer of from 1 to 15), $X^4$ is at least one bond group selected from the group consisting of a single bond, —O—, —OCH$_2$—, —COO— and —OCO—, $X^5$ is a benzene ring, a cyclohexane ring or a $C_{17-51}$ divalent organic group having a steroid skeleton, $X^6$ is at least one bond group selected from the group consisting of a single bond, —O—, —OCH$_2$—, —CH$_2$O—, —COO— and —OCO—, $X^7$ is a benzene ring or a cyclohexane ring, wherein any optional hydrogen atom on the cyclic group of said $X^5$ or $X^7$ may be substituted by a $C_{1-3}$ alkyl group, a $C_{1-3}$ alkoxy group, a $C_{1-3}$ fluorinated alkyl group, a $C_{1-3}$ fluorinated alkoxy group or a fluorine atom, p is an integer of from 0 to 4, and $X^8$ is at least one selected from the group consisting of a $C_{1-18}$ alkyl group, a $C_{2-18}$ alkenyl group, a $C_{1-18}$ fluorinated alkyl group, a $C_{1-18}$ alkoxy group and a $C_{1-18}$ fluorinated alkoxy group,

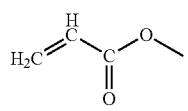
[1-a]

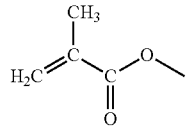
[1-b]

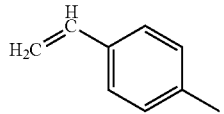
[1-c]

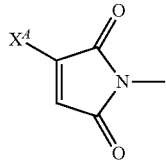
[1-d]

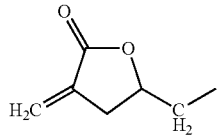
[1-e]

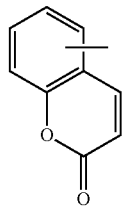
[1-f]

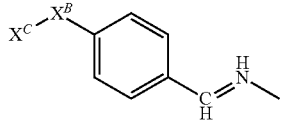
[1-g]

wherein $X^A$ is a hydrogen atom or a benzene ring, $X^B$ is at least one cyclic group selected from the group consisting of a benzene ring, a cyclohexane ring and a heterocyclic ring, and $X^C$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group,

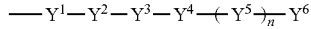
[2-1]

wherein $Y^1$ is at least one bond group selected from the group consisting of a single bond, —(CH$_2$)$_a$— (a is an integer of from 1 to 15), —O—, —CH$_2$O—, —CONH—, —NHCO—, —CON(CH$_3$)—, —N(CH$_3$)CO—, —COO— and —OCO—, $Y^2$ is a single bond or —(CH$_2$)$_b$— (b is an integer of from 1 to 15), $Y^3$ is at least one selected from the group consisting of a single bond, —(CH$_2$)$_c$— (c is an integer of from 1 to 15), —O—, —CH$_2$O—, —COO— and —OCO—, $Y^4$ is at least one divalent cyclic group selected from the group consisting of a benzene ring, a cyclohexane ring and a heterocyclic ring, or a $C_{17-51}$ divalent organic group having a steroid skeleton, $Y^5$ is at least one divalent cyclic group selected from the group consisting of a benzene ring, a cyclohexane ring and a heterocyclic ring, wherein any optional hydrogen atom on the cyclic group of said $Y^4$ or $Y^5$ may be substituted by a $C_{1-3}$ alkyl group, a $C_{1-3}$ alkoxy group, a $C_{1-3}$ fluorinated alkyl group, a $C_{1-3}$ fluorinated alkoxy group or a fluorine atom, n is an integer of from 0 to 4, and $Y^6$ is at least one selected from the group consisting of a $C_{1-18}$ alkyl group, a $C_{2-18}$ alkenyl group, a $C_{1-18}$ fluorinated alkyl group, a $C_{1-18}$ alkoxy group and a $C_{1-18}$ fluorinated alkoxy group,

  [2-2]

wherein $Y^7$ is at least one bond group selected from the group consisting of a single bond, —O—, —CH$_2$O—, —CONH—, —NHCO—, —CON(CH$_3$)—, —N(CH$_3$)CO—, —COO— and —OCO—, and $Y^8$ is a $C_{8-22}$ alkyl group or a $C_{6-18}$ fluorinated alkyl group.

Advantageous Effects of Invention

According to the present invention, it is possible to provide a reverse device, whereby the optical properties are good, i.e. the transparency when no voltage is applied and the scattering property when a voltage is applied, are good, and adhesion between the liquid crystal layer and the liquid crystal alignment film is high, and further, these properties can be maintained, even in an environment exposed to high temperature and high humidity, or to irradiation with light, for a long time. The mechanisms whereby a liquid crystal display device having such excellent properties is obtainable by the present invention, are not necessarily clear, but are considered to be as follows.

The ultraviolet irradiation apparatus in the liquid crystal display device of the present invention is capable of controlling the irradiation light intensity and wavelength of ultraviolet rays to be irradiated, and the surface temperature of the pair of substrates. Therefore, when the specific ultraviolet irradiation apparatus is used, it is possible to form a uniform cured product composite, i.e. a liquid crystal layer having a polymer network (cured resin) controlled to have the desired size and shape, and thus to obtain a liquid crystal display device which exhibits good optical properties.

A specific compound represented by the above formula [1] contained in the liquid crystal composition in the liquid crystal display device of the present invention, has a site of rigid structure such as a benzene ring or a cyclohexane ring, and a site for the polymerization reaction by ultraviolet rays as represented by $X^1$ in the formula [1]. Therefore, when the specific compound is incorporated in the liquid crystal composition, the site of rigid structure of the specific compound enhances the vertical alignment property of the liquid crystal, and further, the site for the polymerization reaction and a polymerizable compound are reacted, whereby it is possible to enhance the stability of the vertical alignment property of the liquid crystal. Accordingly, it is considered that even when the polymer network becomes dense in order to increase the adhesion to the liquid crystal alignment film, the vertical alignment property of the liquid crystal will not be impaired, and it is possible to obtain a reverse device which exhibits good optical properties.

Further, in the liquid crystal composition used in the present invention, a polyfunctional thiol compound and an urethane acrylate or urethane methacrylate are preferably contained. These compounds will, by irradiation with ultraviolet rays, form a polymer network and, at the same time, chemically react with the liquid crystal alignment film. Therefore, it is possible to enhance the adhesion between the liquid crystal layer and the liquid crystal alignment film in the liquid crystal display device.

The liquid crystal alignment film in the liquid crystal display device of the present invention is obtained from a liquid crystal alignment treating agent containing a polymer having a side chain structure of the above formula [2-1] or formula [2-2]. In particular, the side chain structure represented by the formula [2-1] presents a rigid structure, whereby a liquid crystal display device using a liquid crystal alignment film having such a side chain structure, is capable of obtaining a high and stable vertical alignment property of the liquid crystal. Therefore, particularly in a case where a side chain structure of the formula [2-1] is used, it is considered possible to obtain a reverse device which exhibits good optical properties.

Further, for the liquid crystal alignment film in the liquid crystal display device of the present invention, it is preferred to use a liquid crystal alignment treating agent containing a specific polymer having a side chain structure (referred to also as a specific side chain structure (2)) represented by the formula [3] together with the specific side chain structure (1). In a step of irradiation with ultraviolet rays as a step in the process for preparing the liquid crystal display device, this specific side chain structure (2) is considered to undergo a photoreaction with a reactive group of a polymerizable compound in the liquid crystal composition, whereby the adhesion between the liquid crystal layer and the liquid crystal alignment film will be further strengthened. Especially, since the specific side chain structure (2) is located in the polymer as the base, its effect is large as compared with a case where a compound having a group which undergoes a photoreaction, is incorporated in the liquid crystal alignment treating agent.

DESCRIPTION OF EMBODIMENTS

<Liquid Crystal Display Device>

Figure 1:
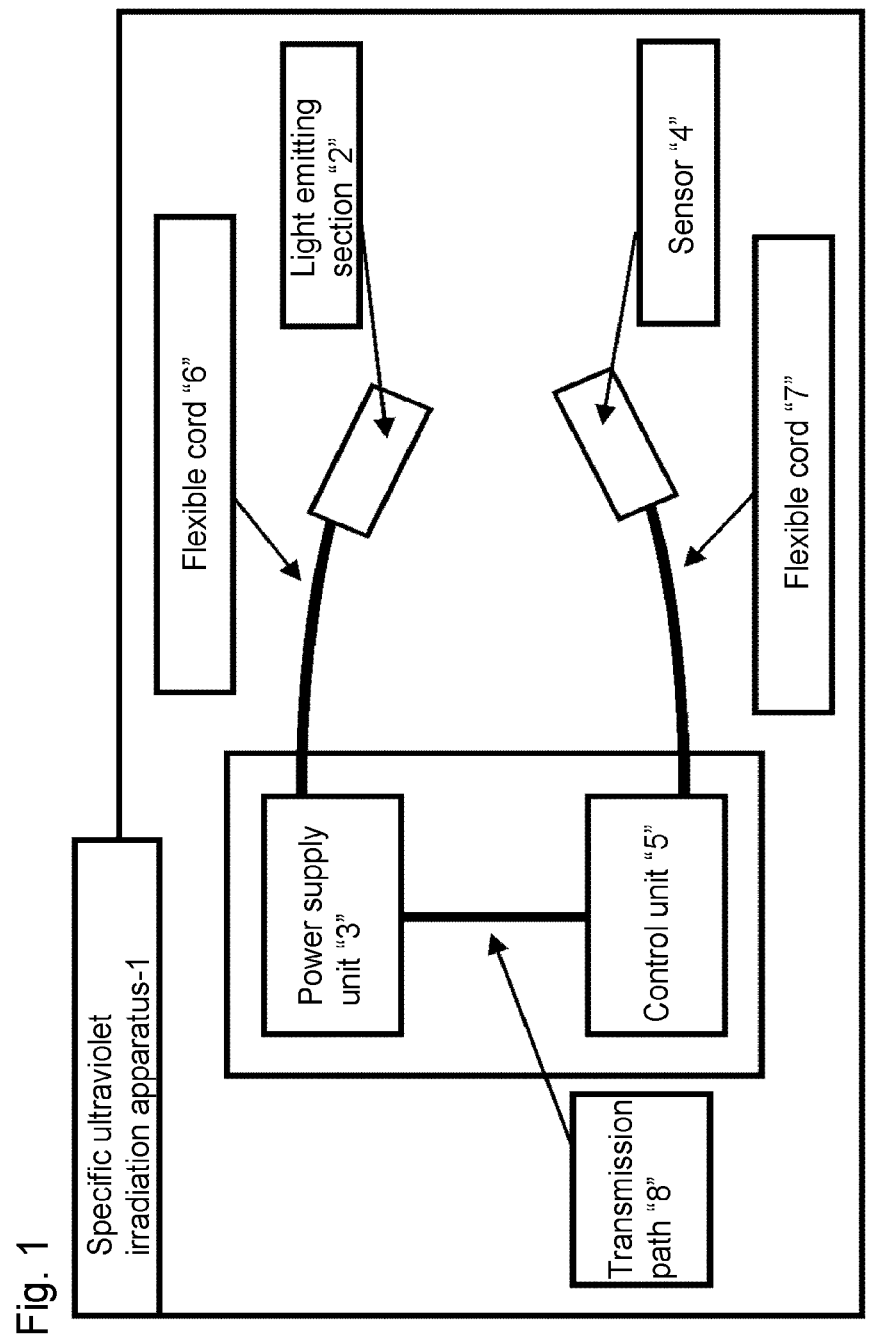
FIG. 1 is a schematic block diagram of a specific ultraviolet irradiation apparatus 1 in the present invention.

The liquid crystal display device of the present invention is a liquid crystal display device having a liquid crystal layer formed by disposing a liquid crystal composition containing a liquid crystal and a polymerizable compound between a pair of substrates provided with electrodes, and curing it by irradiation with ultraviolet rays by means of an ultraviolet irradiation apparatus, wherein at least one of the substrates is provided with a liquid crystal alignment film so as to align the liquid crystal vertically, and it is suitable for use as a reverse device which becomes a transparent state when no voltage is applied, and becomes a scattering state when a voltage is applied.

The liquid crystal composition in the present invention contains a liquid crystal and a polymerizable compound to be polymerized by ultraviolet rays, and this polymerizable compound plays a role of forming a polymer network (cured resin). Further, the above-mentioned liquid crystal layer is a cured product composite of the liquid crystal and the polymerizable compound, and the cured product composite here means, as mentioned above, for example, such a state that the liquid crystal is present in the polymer network formed by the polymerizable compound.

<Specific Compound>

The liquid crystal composition in the present invention is a liquid crystal composition which contains a liquid crystal, a polymerizable compound and a specific compound represented by the following formula [1].

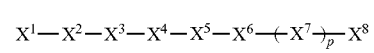  [1]

In the formula [1], $X^1$, $X^2$, $X^3$, $X^4$, $X^5$, $X^6$, $X^7$, $X^8$ and p are as defined above, and inter alia, respectively, the following ones are preferred.

$X^1$ is, from the viewpoint of optical properties of the liquid crystal display device, preferably a structure represented by the above formula [1-a], formula [1-b], formula [1-c] or formula [1-e]. More preferred are the formula [1-a], formula [1-b] or formula [1-c]. $X^2$ is, from the viewpoint of availability of raw material or easy synthesis, preferably a single bond, —O—, —CH$_2$O—, —CONH—, —COO— or —OCO—. More preferred is a single bond, —O—, —COO— or —OCO—. $X^3$ is preferably a single bond or —(CH$_2$)$_a$— (a is an integer of from 1 to 10). More preferred is —(CH$_2$)$_a$— (a is an integer of from 1 to 10).

$X^4$ is, from the viewpoint of availability of raw material or easy synthesis, preferably a single bond, —O— or —COO—. More preferred is —O—. $X^5$ is, from the viewpoint of optical properties of the liquid crystal display device, preferably a benzene ring or a cyclohexane ring, or a $C_{17-51}$ divalent organic group having a steroid skeleton. More preferred is a benzene ring or a $C_{17-51}$ divalent organic group having a steroid skeleton. $X^6$ is, from the viewpoint of easy synthesis, preferably a single bond, —O—, —COO— or —OCO—. More preferred is a single bond, —COO— or —OCO—. $X^7$ is, from the viewpoint of optical properties of the liquid crystal display device, preferably a benzene ring or a cyclohexane ring. $X^8$ is, from the viewpoint of optical properties of the liquid crystal display device, preferably a $C_{1-18}$ alkyl group, a $C_{2-18}$ alkenyl group or a $C_{1-18}$ alkoxy group. More preferred is a $C_{1-12}$ alkyl group or a $C_{2-12}$ alkenyl group. p is, from the viewpoint of availability of raw material or easy synthesis, preferably an integer of 0 to 2.

Preferred combinations of $X^1$ to $X^8$ and p in the formula [1] are as shown in the following Tables 1 to 9.

TABLE 1

| | | $X^1$ | $X^2$ | $X^3$ | $X^4$ | $X^5$ | $X^6$ | $X^7$ | $X^8$ | p |
|---|---|---|---|---|---|---|---|---|---|---|
| 1-1a | Formula [1-a] | Single bond | —(CH$_2$)$_a$— (a is an integer of 1 to 10) | —O— | Benzene ring | Single bond | Benzene ring | $C_{1-12}$ alkyl group | 1 |
| 1-2a | Formula [1-a] | Single bond | —(CH$_2$)$_a$— (a is an integer of 1 to 10) | —O— | Benzene ring | Single bond | Benzene ring | $C_{1-12}$ alkyl group | 2 |
| 1-3a | Formula [1-a] | Single bond | —(CH$_2$)$_a$— (a is an integer of 1 to 10) | —O— | Benzene ring | Single bond | Cyclohexane ring | $C_{1-12}$ alkyl group | 1 |
| 1-4a | Formula [1-a] | Single bond | —(CH$_2$)$_a$— (a is an integer of 1 to 10) | —O— | Benzene ring | Single bond | Cyclohexane ring | $C_{1-12}$ alkyl group | 2 |
| 1-5a | Formula [1-a] | Single bond | —(CH$_2$)$_a$— (a is an integer of 1 to 10) | —COO— | Benzene ring | Single bond | Benzene ring | $C_{1-12}$ alkyl group | 1 |
| 1-6a | Formula [1-a] | Single bond | —(CH$_2$)$_a$— (a is an integer of 1 to 10) | —COO— | Benzene ring | Single bond | Benzene ring | $C_{1-12}$ alkyl group | 2 |
| 1-7a | Formula [1-a] | Single bond | —(CH$_2$)$_a$— (a is an integer of 1 to 10) | —COO— | Benzene ring | Single bond | Cyclohexane ring | $C_{1-12}$ alkyl group | 1 |
| 1-8a | Formula [1-a] | Single bond | —(CH$_2$)$_a$— (a is an integer of 1 to 10) | —COO— | Benzene ring | Single bond | Cyclohexane ring | $C_{1-12}$ alkyl group | 2 |
| 1-9a | Formula [1-a] | Single bond | —(CH$_2$)$_a$— (a is an integer of 1 to 10) | —O— | Benzene ring | —COO— | Benzene ring | $C_{1-12}$ alkyl group | 1 |
| 1-10a | Formula [1-a] | Single bond | —(CH$_2$)$_a$— (a is an integer of 1 to 10) | —O— | Benzene ring | —COO— | Benzene ring | $C_{1-12}$ alkyl group | 2 |
| 1-11a | Formula [1-a] | Single bond | —(CH$_2$)$_a$— (a is an integer of 1 to 10) | —O— | Benzene ring | —COO— | Cyclohexane ring | $C_{1-12}$ alkyl group | 1 |
| 1-12a | Formula [1-a] | Single bond | —(CH$_2$)$_a$— (a is an integer of 1 to 10) | —O— | Benzene ring | —COO— | Cyclohexane ring | $C_{1-12}$ alkyl group | 2 |
| 1-13a | Formula [1-a] | Single bond | —(CH$_2$)$_a$— (a is an integer of 1 to 10) | —COO— | Benzene ring | —COO— | Benzene ring | $C_{1-12}$ alkyl group | 1 |
| 1-14a | Formula [1-a] | Single bond | —(CH$_2$)$_a$— (a is an integer of 1 to 10) | —COO— | Benzene ring | —COO— | Benzene ring | $C_{1-12}$ alkyl group | 2 |
| 1-15a | Formula [1-a] | Single bond | —(CH$_2$)$_a$— (a is an integer of 1 to 10) | —COO— | Benzene ring | —COO— | Cyclohexane ring | $C_{1-12}$ alkyl group | 1 |

TABLE 2

| | | $X^1$ | $X^2$ | $X^3$ | $X^4$ | $X^5$ | $X^6$ | $X^7$ | $X^8$ | p |
|---|---|---|---|---|---|---|---|---|---|---|
| 1-16a | Formula [1-a] | Single bond | —(CH$_2$)$_a$— (a is an integer of 1 to 10) | —COO— | Benzene ring | —COO— | Cyclohexane ring | $C_{1-12}$ alkyl group | 2 |
| 1-17a | Formula [1-a] | Single bond | —(CH$_2$)$_a$— (a is an integer of 1 to 10) | —O— | Benzene ring | —OCO— | Benzene ring | $C_{1-12}$ alkyl group | 1 |
| 1-18a | Formula [1-a] | Single bond | —(CH$_2$)$_a$— (a is an integer of 1 to 10) | —O— | Benzene ring | —OCO— | Benzene ring | $C_{1-12}$ alkyl group | 2 |
| 1-19a | Formula [1-a] | Single bond | —(CH$_2$)$_a$— (a is an integer of 1 to 10) | —O— | Benzene ring | —OCO— | Cyclohexane ring | $C_{1-12}$ alkyl group | 1 |
| 1-20a | Formula [1-a] | Single bond | —(CH$_2$)$_a$— (a is an integer of 1 to 10) | —O— | Benzene ring | —OCO— | Cyclohexane ring | $C_{1-12}$ alkyl group | 2 |
| 1-21a | Formula [1-a] | Single bond | —(CH$_2$)$_a$— (a is an integer of 1 to 10) | —COO— | Benzene ring | —OCO— | Benzene ring | $C_{1-12}$ alkyl group | 1 |
| 1-22a | Formula [1-a] | Single bond | —(CH$_2$)$_a$— (a is an integer of 1 to 10) | —COO— | Benzene ring | —OCO— | Benzene ring | $C_{1-12}$ alkyl group | 2 |
| 1-23a | Formula [1-a] | Single bond | —(CH$_2$)$_a$— (a is an integer of 1 to 10) | —COO— | Benzene ring | —OCO— | Cyclohexane ring | $C_{1-12}$ alkyl group | 1 |

TABLE 2-continued

| | $X^1$ | $X^2$ | $X^3$ | $X^4$ | $X^5$ | $X^6$ | $X^7$ | $X^8$ | p |
|---|---|---|---|---|---|---|---|---|---|
| 1-24a | Formula [1-a] | Single bond | —(CH$_2$)$_a$— (a is an integer of 1 to 10) | —COO— | Benzene ring | —OCO— | Cyclohexane ring | C$_{1-12}$ alkyl group | 2 |
| 1-25a | Formula [1-b] | Single bond | —(CH$_2$)$_a$— (a is an integer of 1 to 10) | —O— | Benzene ring | Single bond | Benzene ring | C$_{1-12}$ alkyl group | 1 |
| 1-26a | Formula [1-b] | Single bond | —(CH$_2$)$_a$— (a is an integer of 1 to 10) | —O— | Benzene ring | Single bond | Benzene ring | C$_{1-12}$ alkyl group | 2 |
| 1-27a | Formula [1-b] | Single bond | —(CH$_2$)$_a$— (a is an integer of 1 to 10) | —O— | Benzene ring | Single bond | Cyclohexane ring | C$_{1-12}$ alkyl group | 1 |
| 1-28a | Formula [1-b] | Single bond | —(CH$_2$)$_a$— (a is an integer of 1 to 10) | —O— | Benzene ring | Single bond | Cyclohexane ring | C$_{1-12}$ alkyl group | 2 |
| 1-29a | Formula [1-b] | Single bond | —(CH$_2$)$_a$— (a is an integer of 1 to 10) | —COO— | Benzene ring | Single bond | Benzene ring | C$_{1-12}$ alkyl group | 1 |
| 1-30a | Formula [1-b] | Single bond | —(CH$_2$)$_a$— (a is an integer of 1 to 10) | —COO— | Benzene ring | Single bond | Benzene ring | C$_{1-12}$ alkyl group | 2 |

TABLE 3

| | $X^1$ | $X^2$ | $X^3$ | $X^4$ | $X^5$ | $X^6$ | $X^7$ | $X^8$ | p |
|---|---|---|---|---|---|---|---|---|---|
| 1-31a | Formula [1-b] | Single bond | —(CH$_2$)$_a$— (a is an integer of 1 to 10) | —COO— | Benzene ring | Single bond | Cyclohexane ring | C$_{1-12}$ alkyl group | 1 |
| 1-32a | Formula [1-b] | Single bond | —(CH$_2$)$_a$— (a is an integer of 1 to 10) | —COO— | Benzene ring | Single bond | Cyclohexane ring | C$_{1-12}$ alkyl group | 2 |
| 1-33a | Formula [1-b] | Single bond | —(CH$_2$)$_a$— (a is an integer of 1 to 10) | —O— | Benzene ring | —COO— | Benzene ring | C$_{1-12}$ alkyl group | 1 |
| 1-34a | Formula [1-b] | Single bond | —(CH$_2$)$_a$— (a is an integer of 1 to 10) | —O— | Benzene ring | —COO— | Benzene ring | C$_{1-12}$ alkyl group | 2 |
| 1-35a | Formula [1-b] | Single bond | —(CH$_2$)$_a$— (a is an integer of 1 to 10) | —O— | Benzene ring | —COO— | Cyclohexane ring | C$_{1-12}$ alkyl group | 1 |
| 1-36a | Formula [1-b] | Single bond | —(CH$_2$)$_a$— (a is an integer of 1 to 10) | —O— | Benzene ring | —COO— | Cyclohexane ring | C$_{1-12}$ alkyl group | 2 |
| 1-37a | Formula [1-b] | Single bond | —(CH$_2$)$_a$— (a is an integer of 1 to 10) | —COO— | Benzene ring | —COO— | Benzene ring | C$_{1-12}$ alkyl group | 1 |
| 1-38a | Formula [1-b] | Single bond | —(CH$_2$)$_a$— (a is an integer of 1 to 10) | —COO— | Benzene ring | —COO— | Benzene ring | C$_{1-12}$ alkyl group | 2 |
| 1-39a | Formula [1-b] | Single bond | —(CH$_2$)$_a$— (a is an integer of 1 to 10) | —COO— | Benzene ring | —COO— | Cyclohexane ring | C$_{1-12}$ alkyl group | 1 |
| 1-40a | Formula [1-b] | Single bond | —(CH$_2$)$_a$— (a is an integer of 1 to 10) | —COO— | Benzene ring | —COO— | Cyclohexane ring | C$_{1-12}$ alkyl group | 2 |
| 1-41a | Formula [1-b] | Single bond | —(CH$_2$)$_a$— (a is an integer of 1 to 10) | —O— | Benzene ring | —OCO— | Benzene ring | C$_{1-12}$ alkyl group | 1 |
| 1-42a | Formula [1-b] | Single bond | —(CH$_2$)$_a$— (a is an integer of 1 to 10) | —O— | Benzene ring | —OCO— | Benzene ring | C$_{1-12}$ alkyl group | 2 |
| 1-43a | Formula [1-b] | Single bond | —(CH$_2$)$_a$— (a is an integer of 1 to 10) | —O— | Benzene ring | —OCO— | Cyclohexane ring | C$_{1-12}$ alkyl group | 1 |
| 1-44a | Formula [1-b] | Single bond | —(CH$_2$)$_a$— (a is an integer of 1 to 10) | —O— | Benzene ring | —OCO— | Cyclohexane ring | C$_{1-12}$ alkyl group | 2 |
| 1-45a | Formula [1-b] | Single bond | —(CH$_2$)$_a$— (a is an integer of 1 to 10) | —COO— | Benzene ring | —OCO— | Benzene ring | C$_{1-12}$ alkyl group | 1 |

TABLE 4

| | $X^1$ | $X^2$ | $X^3$ | $X^4$ | $X^5$ | $X^6$ | $X^7$ | $X^8$ | p |
|---|---|---|---|---|---|---|---|---|---|
| 1-46a | Formula [1-b] | Single bond | —(CH$_2$)$_a$— (a is an integer of 1 to 10) | —COO— | Benzene ring | —OCO— | Benzene ring | C$_{1-12}$ alkyl group | 2 |
| 1-47a | Formula [1-b] | Single bond | —(CH$_2$)$_a$— (a is an integer of 1 to 10) | —COO— | Benzene ring | —OCO— | Cyclohexane ring | C$_{1-12}$ alkyl group | 1 |
| 1-48a | Formula [1-b] | Single bond | —(CH$_2$)$_a$— (a is an integer of 1 to 10) | —COO— | Benzene ring | —OCO— | Cyclohexane ring | C$_{1-12}$ alkyl group | 2 |
| 1-49a | Formula [1-c] | —O— | —(CH$_2$)$_a$— (a is an integer of 1 to 10) | —O— | Benzene ring | Single bond | Benzene ring | C$_{1-12}$ alkyl group | 1 |
| 1-50a | Formula [1-c] | —O— | —(CH$_2$)$_a$— (a is an integer of 1 to 10) | —O— | Benzene ring | Single bond | Benzene ring | C$_{1-12}$ alkyl group | 2 |
| 1-51a | Formula [1-c] | —COO— | —(CH$_2$)$_a$— (a is an integer of 1 to 10) | —O— | Benzene ring | Single bond | Benzene ring | C$_{1-12}$ alkyl group | 1 |
| 1-52a | Formula [1-c] | —COO— | —(CH$_2$)$_a$— (a is an integer of 1 to 10) | —O— | Benzene ring | Single bond | Benzene ring | C$_{1-12}$ alkyl group | 2 |

TABLE 4-continued

|  | $X^1$ | $X^2$ | $X^3$ | $X^4$ | $X^5$ | $X^6$ | $X^7$ | $X^8$ | p |
|---|---|---|---|---|---|---|---|---|---|
| 1-53a | Formula [1-c] | —OCO— | —(CH$_2$)$_a$— (a is an integer of 1 to 10) | —O— | Benzene ring | Single bond | Benzene ring | C$_{1-12}$ alkyl group | 1 |
| 1-54a | Formula [1-c] | —OCO— | —(CH$_2$)$_a$— (a is an integer of 1 to 10) | —O— | Benzene ring | Single bond | Benzene ring | C$_{1-12}$ alkyl group | 2 |
| 1-55a | Formula [1-c] | —O— | —(CH$_2$)$_a$— (a is an integer of 1 to 10) | —COO— | Benzene ring | Single bond | Benzene ring | C$_{1-12}$ alkyl group | 1 |
| 1-56a | Formula [1-c] | —O— | —(CH$_2$)$_a$— (a is an integer of 1 to 10) | —COO— | Benzene ring | Single bond | Benzene ring | C$_{1-12}$ alkyl group | 2 |
| 1-57a | Formula [1-c] | —COO— | —(CH$_2$)$_a$— (a is an integer of 1 to 10) | —COO— | Benzene ring | Single bond | Benzene ring | C$_{1-12}$ alkyl group | 1 |
| 1-58a | Formula [1-c] | —COO— | —(CH$_2$)$_a$— (a is an integer of 1 to 10) | —COO— | Benzene ring | Single bond | Benzene ring | C$_{1-12}$ alkyl group | 2 |
| 1-59a | Formula [1-c] | —OCO— | —(CH$_2$)$_a$— (a is an integer of 1 to 10) | —COO— | Benzene ring | Single bond | Benzene ring | C$_{1-12}$ alkyl group | 1 |
| 1-60a | Formula [1-c] | —OCO— | —(CH$_2$)$_a$— (a is an integer of 1 to 10) | —COO— | Benzene ring | Single bond | Benzene ring | C$_{1-12}$ alkyl group | 2 |

TABLE 5

|  | $X^1$ | $X^2$ | $X^3$ | $X^4$ | $X^5$ | $X^6$ | $X^7$ | $X^8$ | p |
|---|---|---|---|---|---|---|---|---|---|
| 1-61a | Formula [1-c] | —O— | —(CH$_2$)$_a$— (a is an integer of 1 to 10) | —O— | Benzene ring | —COO— | Benzene ring | C$_{1-12}$ alkyl group | 1 |
| 1-62a | Formula [1-c] | —O— | —(CH$_2$)$_a$— (a is an integer of 1 to 10) | —O— | Benzene ring | —COO— | Benzene ring | C$_{1-12}$ alkyl group | 2 |
| 1-63a | Formula [1-c] | —COO— | —(CH$_2$)$_a$— (a is an integer of 1 to 10) | —O— | Benzene ring | —COO— | Benzene ring | C$_{1-12}$ alkyl group | 1 |
| 1-64a | Formula [1-c] | —COO— | —(CH$_2$)$_a$— (a is an integer of 1 to 10) | —O— | Benzene ring | —COO— | Benzene ring | C$_{1-12}$ alkyl group | 2 |
| 1-65a | Formula [1-c] | —OCO— | —(CH$_2$)$_a$— (a is an integer of 1 to 10) | —O— | Benzene ring | —COO— | Benzene ring | C$_{1-12}$ alkyl group | 1 |
| 1-66a | Formula [1-c] | —OCO— | —(CH$_2$)$_a$— (a is an integer of 1 to 10) | —O— | Benzene ring | —COO— | Benzene ring | C$_{1-12}$ alkyl group | 2 |
| 1-67a | Formula [1-c] | —O— | —(CH$_2$)$_a$— (a is an integer of 1 to 10) | —COO— | Benzene ring | —COO— | Benzene ring | C$_{1-12}$ alkyl group | 1 |
| 1-68a | Formula [1-c] | —O— | —(CH$_2$)$_a$— (a is an integer of 1 to 10) | —COO— | Benzene ring | —COO— | Benzene ring | C$_{1-12}$ alkyl group | 2 |
| 1-69a | Formula [1-c] | —COO— | —(CH$_2$)$_a$— (a is an integer of 1 to 10) | —COO— | Benzene ring | —COO— | Benzene ring | C$_{1-12}$ alkyl group | 1 |
| 1-70a | Formula [1-c] | —COO— | —(CH$_2$)$_a$— (a is an integer of 1 to 10) | —COO— | Benzene ring | —COO— | Benzene ring | C$_{1-12}$ alkyl group | 2 |
| 1-71a | Formula [1-c] | —OCO— | —(CH$_2$)$_a$— (a is an integer of 1 to 10) | —COO— | Benzene ring | —COO— | Benzene ring | C$_{1-12}$ alkyl group | 1 |
| 1-72a | Formula [1-c] | —OCO— | —(CH$_2$)$_a$— (a is an integer of 1 to 10) | —COO— | Benzene ring | —COO— | Benzene ring | C$_{1-12}$ alkyl group | 2 |
| 1-73a | Formula [1-c] | —O— | —(CH$_2$)$_a$— (a is an integer of 1 to 10) | —O— | Benzene ring | —OCO— | Benzene ring | C$_{1-12}$ alkyl group | 1 |
| 1-74a | Formula [1-c] | —O— | —(CH$_2$)$_a$— (a is an integer of 1 to 10) | —O— | Benzene ring | —OCO— | Benzene ring | C$_{1-12}$ alkyl group | 2 |
| 1-75a | Formula [1-c] | —COO— | —(CH$_2$)$_a$— (a is an integer of 1 to 10) | —O— | Benzene ring | —OCO— | Benzene ring | C$_{1-12}$ alkyl group | 1 |

TABLE 6

|  | $X^1$ | $X^2$ | $X^3$ | $X^4$ | $X^5$ | $X^6$ | $X^7$ | $X^8$ | p |
|---|---|---|---|---|---|---|---|---|---|
| 1-76a | Formula [1-c] | —COO— | —(CH$_2$)$_a$— (a is an integer of 1 to 10) | —O— | Benzene ring | —OCO— | Benzene ring | C$_{1-12}$ alkyl group | 2 |
| 1-77a | Formula [1-c] | —OCO— | —(CH$_2$)$_a$— (a is an integer of 1 to 10) | —O— | Benzene ring | —OCO— | Benzene ring | C$_{1-12}$ alkyl group | 1 |
| 1-78a | Formula [1-c] | —OCO— | —(CH$_2$)$_a$— (a is an integer of 1 to 10) | —O— | Benzene ring | —OCO— | Benzene ring | C$_{1-12}$ alkyl group | 2 |
| 1-79a | Formula [1-c] | —O— | —(CH$_2$)$_a$— (a is an integer of 1 to 10) | —COO— | Benzene ring | —OCO— | Benzene ring | C$_{1-12}$ alkyl group | 1 |
| 1-80a | Formula [1-c] | —O— | —(CH$_2$)$_a$— (a is an integer of 1 to 10) | —COO— | Benzene ring | —OCO— | Benzene ring | C$_{1-12}$ alkyl group | 2 |
| 1-81a | Formula [1-c] | —COO— | —(CH$_2$)$_a$— (a is an integer of 1 to 10) | —COO— | Benzene ring | —OCO— | Benzene ring | C$_{1-12}$ alkyl group | 1 |

TABLE 6-continued

|  | X$^1$ | X$^2$ | X$^3$ | X$^4$ | X$^5$ | X$^6$ | X$^7$ | X$^8$ | p |
|---|---|---|---|---|---|---|---|---|---|
| 1-82a | Formula [1-c] | —COO— | —(CH$_2$)$_a$— (a is an integer of 1 to 10) | —COO— | Benzene ring | —OCO— | Benzene ring | C$_{1-12}$ alkyl group | 2 |
| 1-83a | Formula [1-c] | —OCO— | —(CH$_2$)$_a$— (a is an integer of 1 to 10) | —COO— | Benzene ring | —OCO— | Benzene ring | C$_{1-12}$ alkyl group | 1 |
| 1-84a | Formula [1-c] | —OCO— | —(CH$_2$)$_a$— (a is an integer of 1 to 10) | —COO— | Benzene ring | —OCO— | Benzene ring | C$_{1-12}$ alkyl group | 2 |
| 1-85a | Formula [1-c] | —O— | —(CH$_2$)$_a$— (a is an integer of 1 to 10) | —O— | Benzene ring | Single bond | Cyclohexane ring | C$_{1-12}$ alkyl group | 1 |
| 1-86a | Formula [1-c] | —O— | —(CH$_2$)$_a$— (a is an integer of 1 to 10) | —O— | Benzene ring | Single bond | Cyclohexane ring | C$_{1-12}$ alkyl group | 2 |
| 1-87a | Formula [1-c] | —COO— | —(CH$_2$)$_a$— (a is an integer of 1 to 10) | —O— | Benzene ring | Single bond | Cyclohexane ring | C$_{1-12}$ alkyl group | 1 |
| 1-88a | Formula [1-c] | —COO— | —(CH$_2$)$_a$— (a is an integer of 1 to 10) | —O— | Benzene ring | Single bond | Cyclohexane ring | C$_{1-12}$ alkyl group | 2 |
| 1-89a | Formula [1-c] | —OCO— | —(CH$_2$)$_a$— (a is an integer of 1 to 10) | —O— | Benzene ring | Single bond | Cyclohexane ring | C$_{1-12}$ alkyl group | 1 |
| 1-90a | Formula [1-c] | —OCO— | —(CH$_2$)$_a$— (a is an integer of 1 to 10) | —O— | Benzene ring | Single bond | Cyclohexane ring | C$_{1-12}$ alkyl group | 2 |

TABLE 7

|  | X$^1$ | X$^2$ | X$^3$ | X$^4$ | X$^5$ | X$^6$ | X$^7$ | X$^8$ | p |
|---|---|---|---|---|---|---|---|---|---|
| 1-91a | Formula [1-c] | —O— | —(CH$_2$)$_a$— (a is an integer of 1 to 10) | —COO— | Benzene ring | Single bond | Cyclohexane ring | C$_{1-12}$ alkyl group | 1 |
| 1-92a | Formula [1-c] | —O— | —(CH$_2$)$_a$— (a is an integer of 1 to 10) | —COO— | Benzene ring | Single bond | Cyclohexane ring | C$_{1-12}$ alkyl group | 2 |
| 1-93a | Formula [1-c] | —COO— | —(CH$_2$)$_a$— (a is an integer of 1 to 10) | —COO— | Benzene ring | Single bond | Cyclohexane ring | C$_{1-12}$ alkyl group | 1 |
| 1-94a | Formula [1-c] | —COO— | —(CH$_2$)$_a$— (a is an integer of 1 to 10) | —COO— | Benzene ring | Single bond | Cyclohexane ring | C$_{1-12}$ alkyl group | 2 |
| 1-95a | Formula [1-c] | —OCO— | —(CH$_2$)$_a$— (a is an integer of 1 to 10) | —COO— | Benzene ring | Single bond | Cyclohexane ring | C$_{1-12}$ alkyl group | 1 |
| 1-96a | Formula [1-c] | —OCO— | —(CH$_2$)$_a$— (a is an integer of 1 to 10) | —COO— | Benzene ring | Single bond | Cyclohexane ring | C$_{1-12}$ alkyl group | 2 |
| 1-97a | Formula [1-c] | —O— | —(CH$_2$)$_a$— (a is an integer of 1 to 10) | —O— | Benzene ring | —COO— | Cyclohexane ring | C$_{1-12}$ alkyl group | 1 |
| 1-98a | Formula [1-c] | —O— | —(CH$_2$)$_a$— (a is an integer of 1 to 10) | —O— | Benzene ring | —COO— | Cyclohexane ring | C$_{1-12}$ alkyl group | 2 |
| 1-99a | Formula [1-c] | —COO— | —(CH$_2$)$_a$— (a is an integer of 1 to 10) | —O— | Benzene ring | —COO— | Cyclohexane ring | C$_{1-12}$ alkyl group | 1 |
| 1-100a | Formula [1-c] | —COO— | —(CH$_2$)$_a$— (a is an integer of 1 to 10) | —O— | Benzene ring | —COO— | Cyclohexane ring | C$_{1-12}$ alkyl group | 2 |
| 1-101a | Formula [1-c] | —OCO— | —(CH$_2$)$_a$— (a is an integer of 1 to 10) | —O— | Benzene ring | —COO— | Cyclohexane ring | C$_{1-12}$ alkyl group | 1 |
| 1-102a | Formula [1-c] | —OCO— | —(CH$_2$)$_a$— (a is an integer of 1 to 10) | —O— | Benzene ring | —COO— | Cyclohexane ring | C$_{1-12}$ alkyl group | 2 |
| 1-103a | Formula [1-c] | —O— | —(CH$_2$)$_a$— (a is an integer of 1 to 10) | —COO— | Benzene ring | —COO— | Cyclohexane ring | C$_{1-12}$ alkyl group | 1 |
| 1-104a | Formula [1-c] | —O— | —(CH$_2$)$_a$— (a is an integer of 1 to 10) | —COO— | Benzene ring | —COO— | Cyclohexane ring | C$_{1-12}$ alkyl group | 2 |
| 1-105a | Formula [1-c] | —COO— | —(CH$_2$)$_a$— (a is an integer of 1 to 10) | —COO— | Benzene ring | —COO— | Cyclohexane ring | C$_{1-12}$ alkyl group | 1 |

TABLE 8

|  | X$^1$ | X$^2$ | X$^3$ | X$^4$ | X$^5$ | X$^6$ | X$^7$ | X$^8$ | p |
|---|---|---|---|---|---|---|---|---|---|
| 1-106a | Formula [1-c] | —COO— | —(CH$_2$)$_a$— (a is an integer of 1 to 10) | —COO— | Benzene ring | —COO— | Cyclohexane ring | C$_{1-12}$ alkyl group | 2 |
| 1-107a | Formula [1-c] | —OCO— | —(CH$_2$)$_a$— (a is an integer of 1 to 10) | —COO— | Benzene ring | —COO— | Cyclohexane ring | C$_{1-12}$ alkyl group | 1 |
| 1-108a | Formula [1-c] | —OCO— | —(CH$_2$)$_a$— (a is an integer of 1 to 10) | —COO— | Benzene ring | —COO— | Cyclohexane ring | C$_{1-12}$ alkyl group | 2 |
| 1-109a | Formula [1-c] | —O— | —(CH$_2$)$_a$— (a is an integer of 1 to 10) | —O— | Benzene ring | —OCO— | Cyclohexane ring | C$_{1-12}$ alkyl group | 1 |
| 1-110a | Formula [1-c] | —O— | —(CH$_2$)$_a$— (a is an integer of 1 to 10) | —O— | Benzene ring | —OCO— | Cyclohexane ring | C$_{1-12}$ alkyl group | 2 |

TABLE 8-continued

| | | X¹ | X² | X³ | X⁴ | X⁵ | X⁶ | X⁷ | X⁸ | p |
|---|---|---|---|---|---|---|---|---|---|---|
| 1-111a | Formula [1-c] | —COO— | —(CH$_2$)$_a$— (a is an integer of 1 to 10) | —O— | Benzene ring | —OCO— | Cyclohexane ring | C$_{1-12}$ alkyl group | 1 |
| 1-112a | Formula [1-c] | —COO— | —(CH$_2$)$_a$— (a is an integer of 1 to 10) | —O— | Benzene ring | —OCO— | Cyclohexane ring | C$_{1-12}$ alkyl group | 2 |
| 1-113a | Formula [1-c] | —OCO— | —(CH$_2$)$_a$— (a is an integer of 1 to 10) | —O— | Benzene ring | —OCO— | Cyclohexane ring | C$_{1-12}$ alkyl group | 1 |
| 1-114a | Formula [1-c] | —OCO— | —(CH$_2$)$_a$— (a is an integer of 1 to 10) | —O— | Benzene ring | —OCO— | Cyclohexane ring | C$_{1-12}$ alkyl group | 2 |
| 1-115a | Formula [1-c] | —O— | —(CH$_2$)$_a$— (a is an integer of 1 to 10) | —COO— | Benzene ring | —OCO— | Cyclohexane ring | C$_{1-12}$ alkyl group | 1 |
| 1-116a | Formula [1-c] | —O— | —(CH$_2$)$_a$— (a is an integer of 1 to 10) | —COO— | Benzene ring | —OCO— | Cyclohexane ring | C$_{1-12}$ alkyl group | 2 |
| 1-117a | Formula [1-c] | —COO— | —(CH$_2$)$_a$— (a is an integer of 1 to 10) | —COO— | Benzene ring | —OCO— | Cyclohexane ring | C$_{1-12}$ alkyl group | 1 |
| 1-118a | Formula [1-c] | —COO— | —(CH$_2$)$_a$— (a is an integer of 1 to 10) | —COO— | Benzene ring | —OCO— | Cyclohexane ring | C$_{1-12}$ alkyl group | 2 |
| 1-119a | Formula [1-c] | —OCO— | —(CH$_2$)$_a$— (a is an integer of 1 to 10) | —COO— | Benzene ring | —OCO— | Cyclohexane ring | C$_{1-12}$ alkyl group | 1 |
| 1-120a | Formula [1-c] | —OCO— | —(CH$_2$)$_a$— (a is an integer of 1 to 10) | —COO— | Benzene ring | —OCO— | Cyclohexane ring | C$_{1-12}$ alkyl group | 2 |

TABLE 9

| | | X¹ | X² | X³ | X⁴ | X⁵ | X⁶ | X⁷ | X⁸ | p |
|---|---|---|---|---|---|---|---|---|---|---|
| 1-121a | Formula [1-a] | Single bond | —(CH$_2$)$_a$— (a is an integer of 1 to 10) | —O— | C$_{17-51}$ organic group having steroid skeleton | Single bond | — | C$_{2-12}$ alkenyl group | 0 |
| 1-122a | Formula [1-b] | Single bond | —(CH$_2$)$_a$— (a is an integer of 1 to 10) | —O— | C$_{17-51}$ organic group having steroid skeleton | Single bond | — | C$_{2-12}$ alkenyl group | 0 |
| 1-123a | Formula [1-a] | Single bond | —(CH$_2$)$_a$— (a is an integer of 1 to 10) | —COO— | C$_{17-51}$ organic group having steroid skeleton | Single bond | — | C$_{2-12}$ alkenyl group | 0 |
| 1-124a | Formula [1-b] | Single bond | —(CH$_2$)$_a$— (a is an integer of 1 to 10) | —COO— | C$_{17-51}$ organic group having steroid skeleton | Single bond | — | C$_{2-12}$ alkenyl group | 0 |
| 1-125a | Formula [1-c] | —O— | —(CH$_2$)$_a$— (a is an integer of 1 to 10) | —O— | C$_{17-51}$ organic group having steroid skeleton | Single bond | — | C$_{2-12}$ alkenyl group | 0 |
| 1-126a | Formula [1-c] | —COO— | —(CH$_2$)$_a$— (a is an integer of 1 to 10) | —O— | C$_{17-51}$ organic group having steroid skeleton | Single bond | — | C$_{2-12}$ alkenyl group | 0 |
| 1-127a | Formula [1-c] | —OCO— | —(CH$_2$)$_a$— (a is an integer of 1 to 10) | —O— | C$_{17-51}$ organic group having steroid skeleton | Single bond | — | C$_{2-12}$ alkenyl group | 0 |
| 1-128a | Formula [1-c] | —O— | —(CH$_2$)$_a$— (a is an integer of 1 to 10) | —COO— | C$_{17-51}$ organic group having steroid skeleton | Single bond | — | C$_{2-12}$ alkenyl group | 0 |
| 1-129a | Formula [1-c] | —COO— | —(CH$_2$)$_a$— (a is an integer of 1 to 10) | —COO— | C$_{17-51}$ organic group having steroid skeleton | Single bond | — | C$_{2-12}$ alkenyl group | 0 |
| 1-130a | Formula [1-c] | —OCO— | —(CH$_2$)$_a$— (a is an integer of 1 to 10) | —COO— | C$_{17-51}$ organic group having steroid skeleton | Single bond | — | C$_{2-12}$ alkenyl group | 0 |

Among them, from the viewpoint of optical properties of the liquid crystal display device, preferred is a combination of (1-1a) to (1-12a), (1-13a), (1-14a), (1-17a), (1-18a), (1-21a), (1-22a), (1-25a) to (1-38a), (1-41a), (1-42a), (1-45a), (1-46a), (1-49a) to (1-96a) or (1-121a) to (1-130a).

More preferred is a combination of (1-1a) to (1-4a), (1-9a) to (1-12a), (1-25a) to (1-28a), (1-33a) to (1-36a), (1-49a) to (1-52a), (1-61a) to (1-64a), (1-85a) to (1-88a), (1-121a), (1-122a), (1-125a) or (1-126a).

Particularly preferred is a combination of (1-3a), (1-4a), (1-9a), (1-10a), (1-27a), (1-28a), (1-33a), (1-34a), (1-49a) to (1-52a), (1-61a) to (1-64a), (1-85a) to (1-88a), (1-121a), (1-122a), (1-125a) or (1-126a).

As more specific preferred specific compounds, compounds represented by the following formula [1a-1] to formula [1a-6] may be mentioned.

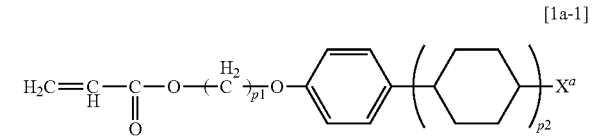

[1a-1]

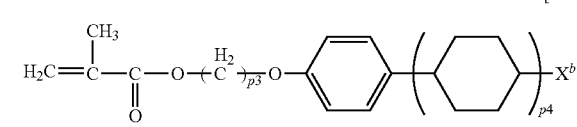

[1a-2]

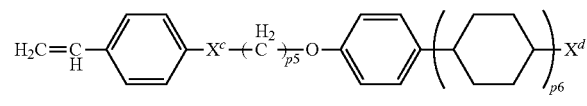

[1a-3]

-continued

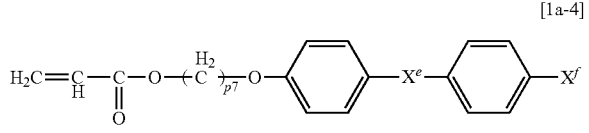

[1a-4]

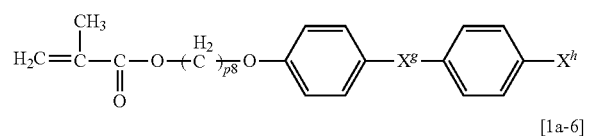

[1a-5]

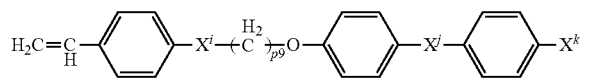

[1a-6]

In the formula [1a-1] to formula [1a-6], $X^a$ to $X^k$ and p1 to p9 are as defined above. Among them, respectively, the following ones are preferred.

$X^a$, $X^b$, $X^d$, $X^f$, $X^h$ and $X^k$ are each independently, from the viewpoint of optical properties of the liquid crystal display device, preferably a $C_{1-12}$ alkyl group or a $C_{1-12}$ alkoxy group. More preferred is a $C_{1-8}$ alkyl group or a $C_{1-8}$ alkoxy group. $X^c$ and $X^i$ are each independently, from the viewpoint of availability of raw material or easy synthesis, preferably —O— or —COO—. $X^e$, $X^g$ and $X^j$ are each independently, from the viewpoint of availability of raw material or easy synthesis, preferably —COO— or —OCO—. p1, p3, p5, p7, p8 and p9 are each independently preferably an integer of from 1 to 10. More preferred from the viewpoint of optical properties of the liquid crystal display device, is an integer of from 1 to 8. p2, p4 and p6 are each independently preferably an integer of 1 or 2.

The proportion of the specific compound to be used (contained) in the liquid crystal composition is, from the viewpoint of optical properties of the liquid crystal display device, preferably from 0.1 to 20 parts by mass to 100 parts by mass of the liquid crystal composition excluding the specific compound. More preferred is from 0.5 to 15 parts by mass, and particularly preferred is from 1 to 10 parts by mass.

Here, as the specific compound, one type may be used alone or two or more types may be used as mixed, depending on the optical properties of the liquid crystal display device, or the adhesion property between liquid crystal layer and the liquid crystal alignment film.

As the liquid crystal in the liquid crystal composition, a nematic liquid crystal, a smectic liquid crystal or a cholesteric liquid crystal may be used. Among them, preferred is one having a negative dielectric anisotropy. Further, from the viewpoint of low voltage driving and scattering properties of the liquid crystal display device, one having a large anisotropy of dielectric constant and a large anisotropy of refractive index, is preferred. Specifically, the anisotropy of dielectric constant (Δ∈: referred to also as the dielectric anisotropy) is preferably from −1 to −10, more preferably from −3 and −6. Further, the anisotropy of refractive index (Δn: referred to also as the refractive index anisotropy) is preferably from 0.150 to 0.350, more preferably from 0.150 to 0.250. Further, the phase transition temperature of the liquid crystal is preferably from 40 to 120° C., more preferably from 80 to 100° C. Further, as the liquid crystal, it is also possible to use at least two types of liquid crystal as mixed, depending upon various physical properties such as the phase transition temperature, dielectric anisotropy and refractive index anisotropy.

In order to drive the liquid crystal display device as an active element such as TFT (Thin Film Transistor), the liquid crystal is required to have a high electrical resistance and a high voltage holding ratio (referred to also as VHR). Therefore, as the liquid crystal, it is preferred to use a fluorinated or chlorinated liquid crystal which has a high electrical resistance, and of which VHR will not be lowered by active energy rays such as ultraviolet rays.

Further, the liquid crystal display device may be made to be a guest-host type device by dissolving a dichroic dye in the liquid crystal composition. In such a case, it is possible to obtain a device which is transparent when no voltage is applied, and becomes absorbed (scattered) when a voltage is applied. Further, in this liquid crystal display device, the direction of the liquid crystal director (direction of alignment) changes by 90 degrees depending on the presence or absence of the voltage application. Therefore, with this liquid crystal display device, by utilizing the difference in light absorption properties of the dichroic dye, it is possible to obtain a high contrast as compared to a conventional guest-host type device to carry out switching between random alignment and vertical alignment. Further, with the guest-host type device having a dichroic dye dissolved, the liquid crystal becomes colored when aligned horizontally, and becomes opaque only in a scattering state. Therefore, it is also possible to obtain a device which is switchable from colorless transparent at the time of no application of a voltage to a state of colored opaque and colored transparent, as a voltage is applied.

The polymerizable compound in the liquid crystal composition may be one capable of undergoing a polymerization reaction by ultraviolet rays to form a cured product composite of the liquid crystal composition (e.g. like a polymer network), i.e. a liquid crystal layer. At that time, a monomer of the polymerizable compound may be incorporated in the liquid crystal composition, or, in advance, the monomer may be subjected to a polymerization reaction, and the obtained polymer may be incorporated in the liquid crystal composition. However, even when the polymer is used, it should have a site which undergoes a polymerization reaction by ultraviolet rays. More preferably, from the viewpoint of the handling efficiency of the liquid crystal composition, that is, from the viewpoint of inhibition of a high viscosity of the liquid crystal composition or its solubility in the liquid crystal, preferred is a method of incorporating the monomer in the liquid crystal composition, and subjecting it to a polymerization reaction by irradiation with ultraviolet rays at the time of preparing a liquid crystal display device, to form a cured product.

The polymerizable compound is preferably a compound which is soluble in the liquid crystal. However, it becomes necessary that when the polymerizable compound is dissolved in the liquid crystal, a temperature is present at which a part or whole of the liquid crystal composition exhibits a liquid crystal phase. Even in a case where a part of the liquid crystal composition exhibits a liquid crystal phase, it is preferred that when the liquid crystal display device is observed with the naked eye, substantially uniform transparency and scattering properties are obtainable throughout the entire inside of the device.

The polymerizable compound may be any compound which undergoes a polymerization reaction by ultraviolet rays, and at that time, the polymerization may be proceeded in any reaction mode to form a cured product of the liquid crystal composition. As a specific reaction mode, radical polymerization, cationic polymerization, anionic polymerization or polyaddition reaction may be mentioned.

Among them, radical polymerization is preferred as the reaction mode of the polymerizable compound. At that time, as the polymerizable compound, the following radical-type polymerizable compounds (monomers) and their oligomers may be used. Further, as mentioned above, it is also possible to use polymers obtained by subjecting these monomers to a polymerization reaction.

A monofunctional polymerizable compound may, for example, be acrylic acid, 2-ethylhexyl acrylate, butylethyl acrylate, butoxyethyl acrylate, 2-cyanoethyl acrylate, benzyl acrylate, cyclohexyl acrylate, hydroxyethyl acrylate, hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, glycidyl acrylate, tetrahydrofurfuryl acrylate, isobornyl acrylate, isodecyl acrylate, lauryl acrylate, morpholine acrylate, phenoxyethyl acrylate, phenoxydiethylene glycol acrylate, 2,2, 2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, or their methacrylates.

Among them, preferred is acrylic acid, 2-ethylhexyl acrylate, butylethyl acrylate, butoxyethyl acrylate, cyclohexyl acrylate, hydroxyethyl acrylate, hydroxypropyl acrylate, 2-ethoxyethyl acrylate, dicyclopentanyl acrylate, dicyclopentenyl acrylate, tetrahydrofurfuryl acrylate, isobornyl acrylate, morpholine acrylate, phenoxyethyl acrylate, phenoxydiethylene glycol acrylate, or their methacrylates. More preferred is acrylic acid, 2-ethylhexyl acrylate, hydroxyethyl acrylate, hydroxypropyl acrylate, tetrahydrofurfuryl acrylate, isobornyl acrylate, morpholine acrylate, phenoxyethyl acrylate, phenoxydiethylene glycol acrylate, or their methacrylates.

A bifunctional polymerizable compound may, for example, be 4,4'-diacryloyloxy stilbene, 4,4'-diacryloyloxy dimethyl stilbene, 4,4'-diacryloyloxy diethyl stilbene, 4,4'-diacryloyloxy dipropyl stilbene, 4,4'-diacryloyloxy dibutyl stilbene, 4,4'-diacryloyloxy dipentyl stilbene, 4,4'-diacryloyloxy dihexyl stilbene, 4,4'-diacryloyloxy difluorostilbene, 2,2,3,3,4,4-hexafluoropentanediol-1,5-diacrylate, 1,1,2,2,3,3-hexafluoropropyl-1,3-diacrylate, diethylene glycol diacrylate, triethylene glycol diacrylate, 1,4-butanediol diacrylate, 1,3-butylene glycol diacrylate, 1,6-hexanediol diacrylate, neopentyl glycol diacrylate, tetraethylene glycol diacrylate, 4,4'-biphenyl diacrylate, diethylstilbestrol diacrylate, 1,4-bisacryloyloxybenzene, 4,4'-bisacryloyloxydiphenyl ether, 4,4'-bisacryloyloxydiphenylmethane, 3,9-[1,1-dimethyl-2-acryloyloxyethyl]-2,4,8,10-tetraspiro[5,5]undecane, α,α'-bis[4-acryloyloxyphenyl]-1,4-diisopropylbenzene, 1,4-bisacryloyloxytetrafluorobenzene, 4,4'-bisacryloyloxyoctafluorobiphenyl, dicyclopentanyl diacrylate, glycerol diacrylate, 1,6-hexanediol diacrylate, 1,9-nonanediol diacrylate, polyethylene glycol diacrylate, polypropylene glycol diacrylate, or their dimethacrylates.

Among them, preferred is diethylene glycol diacrylate, triethylene glycol diacrylate, neopentyl glycol diacrylate, tetraethylene glycol diacrylate, 1,9-nonanediol diacrylate, polyethylene glycol diacrylate, polypropylene glycol diacrylate, or their dimethacrylates.

A polyfunctional polymerizable compound may, for example, be trimethylolpropane triacrylate, pentaerythritol tetraacrylate, pentaerythritol triacrylate, ditrimethylolpropane tetraacrylate, dipentaerythritol hexaacrylate, dipentaerythritol monohydroxy pentaacrylate, trimethylolpropane trimethacrylate, pentaerythritol tetraacrylate, pentaerythritol trim ethacrylate, ditrimethylolpropane tetramethacrylate, dipentaerythritol hexamethacrylate, dipentaerythritol monohydroxy pentamethacrylate or triaryl isocyanate.

Among them, preferred is trimethylolpropane triacrylate, pentaerythritol tetraacrylate, pentaerythritol triacrylate, trimethylolpropane trimethacrylate, pentaerythritol tetramethacrylate, pentaerythritol trimethacrylate or triaryl isocyanate.

In the present invention, from the viewpoint of adhesion between the liquid crystal layer and the liquid crystal alignment film of the liquid crystal display device, it is preferred to use the following polyfunctional thiol compound as the polymerizable compound.

For example, 1,11-undecanedithiol, 4-ethyl-benzene-1,3-dithiol, 1,2-ethanedithiol, 1,8-octanedithiol, 1,18-octadecanedithiol, 2,5-dichlorobenzene-1,3-dithiol, 1,3-(4-chlorophenyl)propane-2,2-dithiol, 1,1-cyclohexanedithiol, 1,2-cyclohexanedithiol, 1,4-cyclohexanedithiol, 1,1-cycloheptanedithiol, 1,1-cyclopentanedithiol, 4,8-dithioundecane-1,11-dithiol, dithiopentaerythritol, dithiothreitol, 1,3-diphenylpropane-2,2-dithiol, 1,3-dihydroxy-2-propyl-2',3'-dimercaptopropyl ether, 2,3-dihydroxypropyl-2',3'-dimercaptopropyl ether, 2,6-dimethyloctane-2,6-dithiol, 2,6-dimethyloctane-3,7-dithiol, 2,4-dimethylbenzene-1,3-dithiol, 4,5-dim ethylbenzene-1,3-dithiol, 3,3-dimethylbutane-2,2-dithiol, 2,2-dimethylpropane-1,3-dithiol, 1,3-di(4-methoxyphenyl)propane-2,2-dithiol, 3,4-dimethoxybutane-1,2-dithiol, 10,11-dimercaptoundecanoic acid, 6,8-dim ercaptooctanoic acid, 2,5-dimercapto-1,3,4-thiadiazole, 2,2'-dimercapto-biphenyl, 4,4'-dimercaptobiphenyl, 4,4'-dimeraptobibenzyl, 3,4-dimercaptobutanol, 3,4-dim ercaptobutyl acetate, 2,3-dimercapto-1-propanol, 1,2-dimercapto-1,3-butanediol, 2,3-dimercaptopropionic acid, 1,2-dimercaptopropyl methyl ether, 2,3-dimercaptopropyl-2',3'-dimethoxypropyl ether, 3,4-thiophenedithiol, 1,10-decanedithiol, 1,12-dodecanedithiol, 3,5,5-trimethylhexane-1,1-dithiol, 2,5-toluenedithiol, 3,4-toluenedithiol, 1,4-naphthalenedithiol, 1,5-naphthalenedithiol, 2,6-naphthalenedithiol, 1,9-nonanedithiol, norbornene-2,3-dithiol, bis(2-mercaptoisopropyl) ether, bis(11-mercaptoundecyl) sulfide, bis(2-mercaptoethyl) ether, bis(2-mercaptoethyl) sulfide, bis(18-mercaptooctadecyl) sulfide, bis(8-mercaptooctyl) sulfide, bis(12-mercapto-decyl) sulfide, bis(9-mercaptononyl) sulfide, bis(4-mercaptobutyl) sulfide, bis(3-mercaptopropyl) ether, bis(3-mercaptopropyl) sulfide, bis(6-mercaptohexyl) sulfide, bis(7-mercaptoheptyl) sulfide, bis(5-mercaptopentyl) sulfide, 2,2'-bis(mercaptomethyl) acetic acid, 1,1-bis(mercaptomethyl)cyclohexane, phenylmethane-1,1-dithiol, 1,2-butane dithiol, 1,4-butane dithiol, 2,3-butane dithiol, 2,2-butanedithiol, 1,2-propanedithiol, 1,3-propanedithiol, 2,2-propanedithiol, 1,2-hexanedithiol, 1,6-hexanedithiol, 2,5-hexanedithiol, 1,7-heptanedithiol, 2,6-heptanedithiol, 1,5-pentanedithiol, 2,4-pentanedithiol, 3,3-pentanedithiol, 7,8-heptadecanedithiol, 1,2-benzenedithiol, 1,3-benzenedithiol, 1,4-benzenedithiol, 2-methylcyclohexane-1,1-dithiol, 2-methylbutane-2,3-dithiol, ethylene glycol bis(3-mercaptopropionate), 1,2,3-propanetrithiol, 1,2,4-butanetrithiol, pentaerythritol tris(3-mercaptopropionate), 1,3,5-benzenetrithiol, 2,4,6-mesitylenetrithiol, neopentanetetrathiol, 2 4,6-toluenetrithiol, trimethylolpropane tris(3-mercaptopropionate), tris-[(3-mercaptopropionyloxy)-ethyl]-isocyanurate, pentaerythritol tetrakis(3-mercaptopropionate), tetraethylene glycol bis(3-mercaptopropionate), dipentaerythritol hexakis(3-mercaptopropionate), trimethylolpropane tris(3-mercaptobutyrate), trimethylolethane tris(3-mercaptobutyrate), pentaerythritol tetrakis(3-mercaptobutyrate), 1,4-bis(3-mercaptobutyryloxy)butane, 1,3,5-tris(3-mercaptobutyryloxyethyl)-1,3,5-triazine-2,4,6-

(1H.3H.5H)-trione, neopentanetetrathiol, 2,2'-bis(mercaptomethyl)-1,3-propanedithiol, pentaerythritol tetrakis(3-mercaptopropionate), 1,4-dithiane-2,5-di(methanethiol), etc. may be mentioned.

Among them, preferred is trimethylolpropane tris(3-mercaptopropionate), tris-[(3-mercaptopropionyloxy)-ethyl]-isocyanurate, pentaerythritol tetrakis(3-mercaptopropionate), tetraethyleneglycol bis(3-mercaptopropionate), dipentaerythritol hexakis(3-mercaptopropionate), trimethylolpropane tris(3-mercaptobutyrate), trimethylolethane tris(3-mercaptobutyrate), pentaerythritol tetrakis(3-mercaptobutyrate), 1,4-bis(3-mercaptobutyryloxy)butane, 1,3,5-tris(3-mercaptobutyryloxyethyl)-1,3,5-triazine-2,4,6-(1H.3H.5H)-trione, neopentanetetrathiol, 2,2'-bis(mercaptomethyl)-1,3-propanedithiol, pentaerythritol tetrakis(3-mercaptopropionate) or 1,4-dithiane-2,5-di(methanethiol).

More preferred from the viewpoint of adhesion between the liquid crystal layer and the liquid crystal alignment film of the liquid crystal display device, is trimethylolpropane tris(3-mercaptopropionate), trimethylolpropane tris(3-mercaptobutyrate), trimethylolethane tris(3-mercaptobutyrate), pentaerythritol tetrakis(3-mercaptobutyrate), 1,4-bis(3-mercaptobutyryloxy)butane or 1,4-dithiane-2,5-di(methanethiol).

The proportion of the polyfunctional thiol compound to be used (contained) is preferably from 0.1 to 100 parts by mass, more preferably from 1 to 50 parts by mass, particularly preferably from 5 to 40 parts by mass, to 100 parts by mass of the liquid crystal in the liquid crystal composition.

Further, from the viewpoint of optical properties of the liquid crystal display device, the polymerizable compound preferably contains an urethane acrylate (or urethane methacrylate) compound obtained from the reaction of a diisocyanate component and a hydroxy group-containing acrylate (or methacrylate) compound. Such a compound may be a monomer or an oligomer, or it may be one further polymerized. In particular, the diisocyanate component is preferably of an aliphatic structure.

The diisocyanate component may, specifically, be ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethyl hexamethylene diisocyanate, 1,6,11-undecane triisocyanate, 1,3,6-hexamethylene triisocyanate, 1,8-diisocyanato-4-isocyanate methyloctane, 2,5,7-trimethyl-1,8-diisocyanate-5-isocyanate methyloctane, bis(isocyanateethyl) carbonate, bis(isocyanatoethyl) ether, 1,4-butylene glycol dipropyl ether-ω,ω'-diisocyanate, lysine diisocyanate methyl ester, lysine triisocyanate, 2-isocyanateethyl-2,6-diisocyanate hexanoate, 2-isocyanatepropyl-2,6-diisocyanate hexanoate, xylylene diisocyanate, bis(isocyanateethyl)benzene, bis(isocyanatepropyl)benzene, a,a,a',a'-tetramethylxylylene diisocyanate, bis(isocyanatebutyl)benzene, bis(isocyanatemethyl)naphthalene, bis(isocyanatemethyl) diphenyl ether, bis(isocyanateethyl)phthalate, mesitylene triisocyanate or an alicyclic corn pound such as 2,6-di(isocyanatemethyl)furan, isophorone diisocyanate, bis(isocyanatomethyl)cyclohexane, dicyclohexylmethane diisocyanate, cyclohexane diisocyanate, methylcyclohexane diisocyanate, dicyclohexyl-dimethylmethane diisocyanate, 2,2'-dimethyldicyclohexylmethane diisocyanate, bis(4-isocyanate-n-butylidene)-pentaerythritol, dimer acid diisocyanate, 2-isocyanatomethyl-3-(3-isocyanate propyl)-5-isocyanatemethyl-bicyclo-(2,2,1)-heptane, 2-isocyanatemethyl-2-(3-isocyanatepropyl)-6-methyl isocyanate-bicyclo-(2, 2,1)-heptane, 2-isocyanatemethyl-2-(3-isocyanatepropyl)-5-methyl isocyanate-bicyclo-(2,2,1)-heptane, 2-isocyanatemethyl-3-(3-isocyanatepropyl)-6-isocyanatomethyl-bicyclo-(2,2,1)-heptane, 2-isocyanatomethyl-3-(3-isocyanatepropyl)-5-(2-isocyanatomethyl)-bicyclo-(2,2,1)-heptane, 2-isocyanatomethyl-3-(3-isocyanatepropyl)-6-(2-isocyanatoethyl)-bicyclo-(2,2,1)-heptane, 2-isocyanatomethyl-2-(3-isocyanatepropyl)-5-(2-isocyanateethyl)-bicyclo-(2,2,1)-heptane, 2-isocyanatemethyl-2-(3-isocyanatepropyl)-6-(2-isocyanateethyl)-bicyclo-(2,2,1)-heptane, etc.

The hydroxy group-containing acrylate (or methacrylate) may, for example, be hydroxyethyl acrylate, hydroxypropyl acrylate, phenyl glycidyl ether acrylate, pentaerythritol triacrylate or dipentaerythritol pentaacrylate, or their methacrylates.

The urethane acrylate (or methacrylate) is, from the viewpoint of optical properties of the liquid crystal display device, preferably pheny glycidyl ether acrylate hexamethylene diisocyanate urethane prepolymer, pentaerythritol triacrylate hexamethylene diisocyanate urethane prepolymer or dipentaerythritol pentaacrylate hexamethylene diisocyanate, or their methacrylates.

The proportion of the urethane acrylate (or methacrylate) to be used (contained) is preferably from 1 to 200 parts by mass, more preferably from 5 to 150 parts by mass, particularly preferably from 5 to 100 parts by mass, to 100 parts by mass of the liquid crystal in the liquid crystal composition.

As the polymerizable compound in the present invention, it is preferred to use both of the above polyfunctional thiol compound and urethane acrylate (or urethane methacrylate).

Further, as the polymerizable compound, it is preferred to use, together with the polyfunctional thiol compound and urethane acrylate (or urethane methacrylate), the above-mentioned monofunctional polymerizable compound, bifunctional polymerizable compound, polyfunctional polymerizable corn pound, etc.

It is more preferred to use the polyfunctional thiol compound, urethane acrylate (or urethane methacrylate), monofunctional acrylate, polyfunctional acrylate, polyfunctional acrylate, monofunctional methacrylate and/or polyfunctional acrylate. It is still more preferred to use the polyfunctional thiol compound, urethane acrylate (or urethane methacrylate), monofunctional acrylate, monofunctional methacrylate and/or polyfunctional methacrylate.

The proportion of the monofunctional acrylate to be used (contained) is preferably from 10 to 300 parts by mass, more preferably from 20 to 250 parts by mass, particularly preferably from 25 to 200 parts by mass, to 100 parts by mass of the liquid crystal in the liquid crystal composition.

The proportion of the monofunctional methacrylate to be used (contained) is preferably from 0.1 to 100 parts by mass, more preferably from 1 to 50 parts by mass, particularly preferably from 1 to 25 parts by mass, to 100 parts by mass of the liquid crystal in the liquid crystal composition.

The proportion of the polyfunctional methacrylate to be used (contained) is preferably from 0.1 to 200 parts by mass, more preferably from 1 to 150 parts by mass, particularly preferably from 10 to 100 parts by mass, to 100 parts by mass of the liquid crystal in the liquid crystal composition.

In the present invention, for the purpose of promoting formation of a curable resin by facilitating radical polymerization of a polymerizable compound, it is preferred to incorporate a radical initiator (referred to also as a polymerization initiator) that generates radicals by ultraviolet rays, in the liquid crystal composition.

Specifically, for example, organic peroxides such as tert-butylperoxy-iso-butarate, 2,5-dimethyl-2,5-bis(benzoyldioxy)hexane, 1,4-bis[α-(tert-butyldioxy)-iso-propoxy]benzene, di-tert-butyl peroxide, 2,5-dimethyl-2,5-bis(tert-butyldioxy)hexene hydroperoxide, α-(iso-propylphenyl)-iso-propyl hydroperoxide, 2,5-dimethylhexane, tert-butyl hydroperoxide, 1,1-bis(tert-butyldioxy)-3,3,5-trimethylcyclohexane, butyl-4,4-bis(tert-butyldioxy)valerate, cyclohexanone peroxide, 2,2',5,5'-tetra(tert-butylperoxycarbonyl) benzophenone, 3,3',4,4'-tetra(tert-butylperoxycarbonyl) benzophenone, 3,3',4,4'-tetra(tert-amylperoxycarbonyl) benzophenone, 3,3',4,4'-tetra(tert-hexylperoxycarbonyl) benzophenone, 3,3'-bis(tert-butylperoxycarbonyl)-4,4'-dicarboxybenzophenone, tert-butyl peroxybenzoate, di-tert-butyldiperoxy isophthalate, 1-methyl-1-phenylethyl peroxide, cumene hydroperoxide, etc.; quinones such as 9,10-anthraquinone, 1-chloroanthraquinone, 2-chloroanthraquinone, octamethyl anthraquinone, 1,2-benzanthraquinone, etc.; and benzoin derivatives such as benzoin methyl, benzoin ethyl ether, α-methyl benzoin, α-phenyl benzoin, etc. may be mentioned.

The proportion of the radical initiator to be used is preferably from 0.1 to 50 parts by mass, more preferably from 0.1 to 35 parts by mass, particularly preferably from 0.1 to 10 parts by mass, to 100 parts by mass of the entire liquid crystal.

Further, depending on the optical properties of the liquid crystal display device or the adhesion between the liquid crystal layer and the liquid crystal alignment film, one of these radical initiators, or two or more of them as mixed, may be used.

In addition, in the present invention, from the viewpoint of adhesion between the liquid crystal layer and the liquid crystal alignment film of the liquid crystal display device, it is preferred that an organic phosphoric acid compound is contained in the liquid crystal composition.

Specifically, for example, triphenyl phosphate, trisnonyl phosphate, tricresyl phosphate, triethyl phosphate, tris(2-ethylhexyl) phosphate, diphenyl mono(2-ethylhexyl) phosphate, diethyl hydrogen phosphate, diphenyl hydrogen phosphate, tetraphenyl dipropylene glycol diphosphate, bis (decyl) pentaerythritol diphosphate, tris(2,4-di-tert-butylphenyl) phosphate, diphenyl(2,4,6-trimethylbenzoyl) phosphine oxide, etc. may be mentioned. Among them, preferred is triphenyl phosphate, tricresyl phosphate, diphenyl hydrogen phosphate, tetraphenyl dipropylene glycol diphosphate or diphenyl(2,4,6-trimethylbenzoyl) phosphone oxide. More preferred from such a viewpoint that the above effects are more enhanced, is tetraphenyl dipropylene glycol diphosphate or diphenyl(2,4,6-trimethylbenzoyl) phosphone oxide.

The proportion of the organic phosphoric acid compound to be used (contained) is preferably from 0.1 to 50 parts by mass, more preferably from 0.1 to 20 parts by mass, particularly preferably from 0.1 to 10 parts by mass, to 100 parts by mass of the entire liquid crystal.

<Specific Side Chain Structure (1)>

The specific side chain structure (1) in the present invention is represented by the following formula [2-1] or formula [2-2].

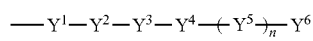

[2-1]

In the formula [2-1], $Y^1$, $Y^2$, $Y^3$, $Y^4$, $Y^5$, $Y^6$ and n are as defined above, but inter alia, respectively, the following ones are preferred.

$Y^1$ is, from the viewpoint of availability of raw material and easy synthesis, preferably a single bond, $—(CH_2)_a—$ (a is an integer of from 1 to 15), $—O—$, $—CH_2O—$ or $—COO—$. More preferred is a single bond, $—(CH_2)_a—$ (a is an integer of from 1 to 10), $—O—$, $—CH_2O—$ or $—COO—$. $Y^2$ is preferably a single bond or $—(CH_2)_b—$ (b is an integer of from 1 to 10). $Y^3$ is, from the viewpoint of easy synthesis, preferably a single bond, $—(CH_2)_c—$ (c is an integer of from 1 to 15), $—O—$, $—CH_2O—$ or $—COO—$. More preferred is a single bond, $—(CH_2)_c—$ (c is an integer of from 1 to 10), $—O—$, $—CH_2O—$ or $—COO—$. $Y^4$ is, from the viewpoint of easy synthesis, preferably a benzene ring, a cyclohexane ring or a $C_{17-51}$ organic group having a steroid skeleton. $Y^5$ is preferably a benzene ring or a cyclohexane ring.

$Y^6$ is preferably a 01-18 alkyl group, a $C_{2-18}$ alkenyl group, a $C_{1-10}$ fluorinated alkyl group, a $C_{1-18}$ alkoxy group, or a $C_{1-10}$ fluorinated alkoxy group. More preferred is a $C_{1-12}$ alkyl group, a $C_{2-12}$ alkenyl group or a $C_{1-12}$ alkoxy group. Particularly preferred is a $C_{1-9}$ alkyl group, a $C_{2-12}$ alkenyl group or a $C_{1-9}$ alkoxy group. n is, from the viewpoint of availability of raw material or easy synthesis, preferably from 0 to 3, more preferably from 0 to 2.

Preferred combinations of $Y^1$, $Y^2$, $Y^3$, $Y^4$, $Y^5$, $Y^6$ and n may be the same combinations as (2-1) to (2-629) disclosed in Tables 6 to 47 on pages 13 to 34 in WO (international publication) 2011/132751. In each Table in the international publication, $Y^1$ to $Y^6$ in the present invention are shown as Y1 to Y6, and therefore, Y1 to Y6 shall be read as $Y^1$ to $Y^6$. Further, in (2-605) to (2-629) listed in each Table in the international publication, the $C_{17-51}$ organic group having a steroid skeleton in the present invention, is shown as a $C_{12-25}$ organic group having a steroid skeleton, and therefore, the $C_{12-25}$ organic group having a steroid skeleton shall be read as a $C_{17-51}$ organic group having a steroid skeleton.

Among them, preferred is a combination of (2-25) to (2-96), (2-145) to (2-168), (2-217) to (2-240), (2-268) to (2-315), (2-364) to (2-387), (2-436) to (2-483), (2-603) to (2-615) or (2-624). A particularly preferred combination is (2-49) to (2-96), (2-145) to (2-168), (2-217) to (2-240), (2-603) to (2-606), (2-607) to (2-609), (2-611), (2-612) or (2-624).

[2-2]

In the formula [2-2], $Y^7$ and $Y^8$ are as defined above, but inter alia, respectively, the following ones are preferred.

$Y^7$ is preferably a single bond, $—O—$, $—CH_2O—$, $—CONH—$, $—CON(CH_3)—$ or $—COO—$. More preferred is a single bond, $—O—$, $—CONH—$ or $—COO—$. $Y^8$ is preferably a $C_{8-18}$ alkyl group.

The specific side chain structure (1) in the present invention is preferably of the formula [2-1], from such a viewpoint that it is possible to obtain a high and stable vertical alignment of the liquid crystal as described above.

<Specific Polymer>

The specific polymer having a specific side chain structure (1) is not particularly limited, but at least one polymer selected from the group consisting of an acrylic polymer, a methacrylic polymer, a novolak resin, a polyhydroxystyrene, a polyimide precursor, a polyimide, a polyamide, a polyester, a cellulose and a polysiloxane, is preferred. More preferred is a polyimide precursor, a polyimide or a polysiloxane. Particularly preferred is a polyimide precursor or a polyimide.

In the case of using, as the specific polymer, a polyimide precursor or a polyimide (collectively referred to as a polyimide-type polymer), it is preferably a polyimide precursor or polyimide obtained by reacting a diamine component and tetracarboxylic acid component.

The polyimide precursor has a structure represented by the following formula [A].

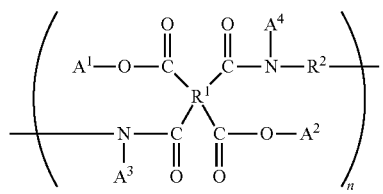

[A]

($R^1$ is a tetravalent organic group, $R^2$ is a divalent organic group, $A^1$ and $A^2$ are each independently a hydrogen atom or a $C_{1-8}$ alkyl group, $A^3$ and $A^4$ are each independently a hydrogen atom, a $C_{1-5}$ alkyl group or an acetyl group, and n is a positive integer.)

The above diamine component is a diamine having two primary or secondary amino groups in the molecule, and the above tetracarboxylic acid component may, for example, be a tetracarboxylic acid, a tetracarboxylic dianhydride, a tetracarboxylic acid dihalide, a tetracarboxylic acid dialkyl ester or a tetracarboxylic acid dialkyl ester dihalide.

The polyimide type polymer is preferably a polyamic acid consisting of repeating units represented by the following structural formula [D] or a polyimide obtained by imidizing such a polyamic acid, for such a reason that it is relatively easily obtainable by using, as raw materials, a tetracarboxylic acid dianhydride represented by the following formula [B] and a diamine represented by the following formula [C].

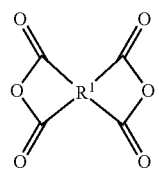

[B]

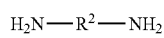

[C]

($R^1$ and $R^2$ have the same meanings as those defined in the formula [A].)

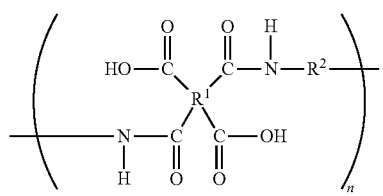

[D]

($R^1$ and $R^2$ have the same meanings as those defined in the formula [A].)

Further, by a usual synthetic method, it is also possible to introduce the $C_{1-8}$ alkyl group of $A^1$ and $A^2$ of the formula [A], and the $C_{1-5}$ alkyl group or the acetyl group of $A^3$ and $A^4$ of the formula [A] to the polymer of the formula [D] obtained as described above.

As a method for introducing the specific side chain structure (1) to the polyimide-type polymer, it is preferred to use a diamine having the specific side chain structure, as a part of the raw material.

Specifically, as the diamine having a specific side chain structure (1), it is preferred to use a diamine represented by the following formula [2a] (also referred to as a specific side chain type diamine (1)).

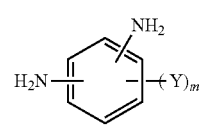

[2a]

In the formula [2a], Y is the above formula [2-1] or formula [2-2]. Here, definitions and preferred combinations of $Y^1$, $Y^2$, $Y^3$, $Y^4$, $Y^5$, $Y^6$ and n in the formula [2-1] are as described above, and definitions and preferred combinations of $Y^7$ and $Y^8$ in the formula [2-2] are as described above. m is an integer of form 1 to 4. It is particularly preferably an integer of 1.

The specific side chain type diamine (1) having a specific side chain structure (1) represented by the formula [2-1] may, specifically, be diamine compounds of the formula [2-1] to formula [2-6] and the formula [2-9] to formula [2-31], as described on pages 15 to 19 in international publication WO2013/125595. Here, in the description of the publication, $R_2$ in the formula [2-1] to formula [2-3] and $R_4$ in the formula [2-4] to formula [2-6] represent at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group. Further, $A^4$ in the formula [2-13] is a $C_{3-18}$ straight or branched alkyl group. In addition, $R_3$ in the formula [2-4] to formula [2-6] is at least one selected from the group consisting of —O—, —CH$_2$O—, —COO— and —OCO—. Among them, a preferred diamine is a diamine compound of the formula [2-1] to formula [2-6], the formula [2-9] to formula [2-13] or the formula [2-22] to formula [2-31], as described in the publication.

In the present invention, diamines represented by the following formula [2a-32] to formula [2a-36] are most preferred from the viewpoint of the vertical alignment properties of the liquid crystal and the optical properties of of the liquid crystal display device, when used for a liquid crystal alignment film.

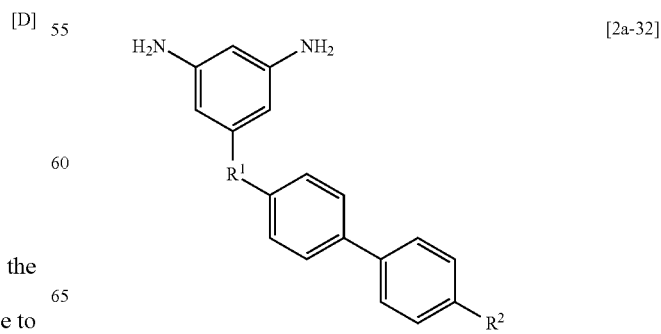

[2a-32]

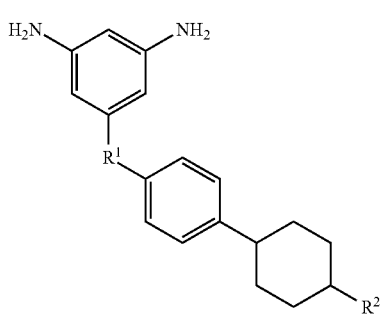
[2a-33]

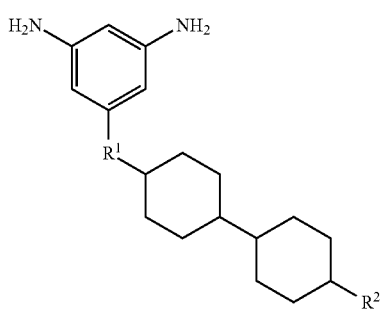
[2a-34]

($R^1$ is —$CH_2O$—, and $R^2$ is a $C_{3-12}$ alkyl group.)

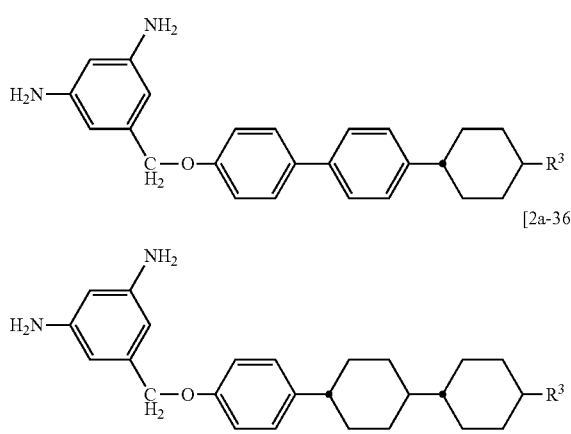
[2a-35]

[2a-36]

($R^3$ is a $C_{3-12}$ alkyl group, and with respect to the cis-trans isomerism, 1,4-cyclohexylene is a trans isomer.)

The specific side chain type diamine (1) having a specific side chain structure (1) represented by the above formula [2-2] may, specifically, be diamine compounds of formula [DA1] to formula [DA11] as described on page 23 in International Publication WO2013/125595. In the description of the publication, $A_1$ in the formula [DA1] to formula [DA5] is a $C_{8-22}$ alkyl group or a $C_{6-18}$ fluorinated alkyl group.

The proportion of the specific side chain type diamine (1) to be used, is preferably from 10 to 80 mol %, more preferably from 20 to 70 mol %, to the total diamine component, from the viewpoint of the vertical alignment properties of the liquid crystal when it is used for a liquid crystal alignment film, and from the viewpoint of adhesion between the liquid crystal layer and the liquid crystal alignment film in the liquid crystal display device.

Further, as the specific side chain type diamine (1), one type alone, or two or more types as mixed, may be used depending upon the solubility of the polyimide-type polymer in the solvent, and the vertical alignment property of the liquid crystal when it is used for a liquid crystal alignment film, and further depending upon the properties such as optical properties of the liquid crystal display device.

In the present invention, in a case where a polyimide type polymer is to be used as the specific polymer, it is preferred to use a diamine component which contains a diamine having a specific side chain structure (2) represented by the following formula [3] together with a diamine having a specific side chain structure (1).

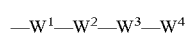
[3]

In the formula [3], $W^1$, $W^2$, $W^3$ and $W^4$ are as defined above, and inter alia, respectively, the following ones are preferred.

$W^1$ is, from the viewpoint of availability of raw material and easy synthesis, preferably a single bond, —O—, —$CH_2O$—, —CONH—, —CON($CH_3$)— or —COO—. More preferred is —O—, —$CH_2O$— or —COO—. $W^2$ is preferably a single bond, a $C_{1-18}$ alkylene group, or a $C_{6-12}$ organic group having a benzene ring or a cyclohexane ring. More preferred is a $C_{2-10}$ alkylene group from the viewpoint of optical properties of the liquid crystal display device. $W^3$ is, from the viewpoint of availability of raw material and easy synthesis, preferably a single bond, —O—, —$CH_2O$—, —COO— or —OCO—. $W^4$ is, from the viewpoint of optical properties of the liquid crystal display device, preferably the following formula [3-a], formula [3-b], formula [3-c] or formula [3-e].

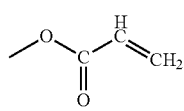
[3-a]

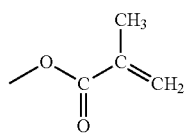
[3-b]

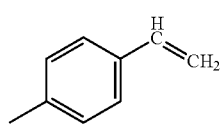
[3-c]

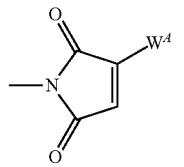
[3-d]

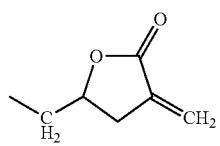
[3-e]

-continued

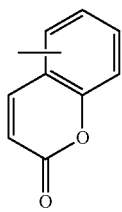

[3-f]

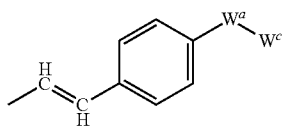

[3-g]

Preferred combinations of $W^1$ to $W^4$ in the formula [3] are shown in the following Table 10 and Table 11.

TABLE 10

| | $W^1$ | $W^2$ | $W^3$ | $W^4$ |
|---|---|---|---|---|
| 3-1a | —O— | $C_{2-10}$ alkylene group | Single bond | Formula [3-a] |
| 3-2a | —CH$_2$O— | $C_{2-10}$ alkylene group | Single bond | Formula [3-a] |
| 3-3a | —COO— | $C_{2-10}$ alkylene group | Single bond | Formula [3-a] |
| 3-4a | —O— | $C_{2-10}$ alkylene group | Single bond | Formula [3-b] |
| 3-5a | —CH$_2$O— | $C_{2-10}$ alkylene group | Single bond | Formula [3-b] |
| 3-6a | —COO— | $C_{2-10}$ alkylene group | Single bond | Formula [3-b] |
| 3-7a | —O— | $C_{2-10}$ alkylene group | —O— | Formula [3-c] |
| 3-8a | —CH$_2$O— | $C_{2-10}$ alkylene group | —O— | Formula [3-c] |
| 3-9a | —COO— | $C_{2-10}$ alkylene group | —O— | Formula [3-c] |
| 3-10a | —O— | $C_{2-10}$ alkylene group | —CH$_2$O— | Formula [3-c] |
| 3-11a | —CH$_2$O— | $C_{2-10}$ alkylene group | —CH$_2$O— | Formula [3-c] |
| 3-12a | —COO— | $C_{2-10}$ alkylene group | —CH$_2$O— | Formula [3-c] |
| 3-13a | —O— | $C_{2-10}$ alkylene group | —COO— | Formula [3-c] |
| 3-14a | —CH$_2$O— | $C_{2-10}$ alkylene group | —COO— | Formula [3-c] |
| 3-15a | —COO— | $C_{2-10}$ alkylene group | —COO— | Formula [3-c] |

TABLE 11

| | $W^1$ | $W^2$ | $W^3$ | $W^4$ |
|---|---|---|---|---|
| 3-16a | —O— | $C_{2-10}$ alkylene group | —OCO— | Formula [3-c] |
| 3-17a | —CH$_2$O— | $C_{2-10}$ alkylene group | —OCO— | Formula [3-c] |
| 3-18a | —COO— | $C_{2-10}$ alkylene group | —OCO— | Formula [3-c] |
| 3-19a | —O— | $C_{2-10}$ alkylene group | Single bond | Formula [3-e] |
| 3-20a | —CH$_2$O— | $C_{2-10}$ alkylene group | Single bond | Formula [3-e] |
| 3-21a | —COO— | $C_{2-10}$ alkylene group | Single bond | Formula [3-e] |
| 3-22a | —O— | $C_{2-10}$ alkylene group | —CH$_2$O— | Formula [3-e] |
| 3-23a | —CH$_2$O— | $C_{2-10}$ alkylene group | —CH$_2$O— | Formula [3-e] |
| 3-24a | —COO— | $C_{2-10}$ alkylene group | —CH$_2$O— | Formula [3-e] |
| 3-25a | —O— | $C_{2-10}$ alkylene group | —COO— | Formula [3-e] |
| 3-26a | —CH$_2$O— | $C_{2-10}$ alkylene group | —COO— | Formula [3-e] |
| 3-27a | —COO— | $C_{2-10}$ alkylene group | —COO— | Formula [3-e] |
| 3-28a | —O— | $C_{2-10}$ alkylene group | —OCO— | Formula [3-e] |
| 3-29a | —CH$_2$O— | $C_{2-10}$ alkylene group | —OCO— | Formula [3-e] |
| 3-30a | —COO— | $C_{2-10}$ alkylene group | —OCO— | Formula [3-e] |

Among them, from the viewpoint of optical properties of the liquid crystal display device, preferred is a combination of (3-1a) to (3-9a), (3-13a) to (3-24a) or (3-28a) to (3-30a). More preferred is a combination of (3-1a) to (3-9a) or (3-16a) to (3-24a). Particularly preferred is a combination of (3-1a) to (3-9a) or (3-16a) to (3-18a).

As the diamine having a specific side chain structure (2), it is preferred to use a diamine represented by the following formula [3a] (referred to also as a specific side chain type diamine (2)).

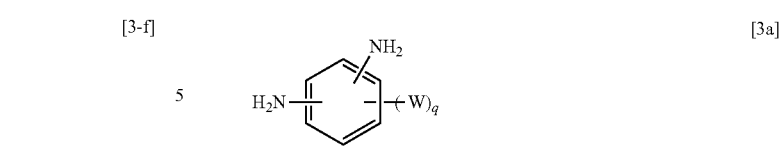

[3a]

In the formula [3a], W is a structure represented by the formula [3]. Definitions and preferred combinations of $W^1$, $W^2$, $W^3$ and $W^4$ in the formula [3] are as described above. m is an integer of from 1 to 4. It is particularly preferably an integer of 1.

As the specific side chain type diamine (2), specifically, for example, the following formula [3a-1] to formula [3a-27] may be mentioned, and it is preferred to use them.

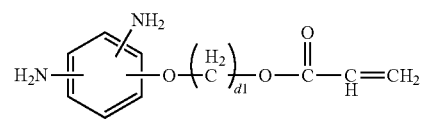

[3a-1]

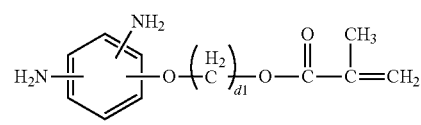

[3a-2]

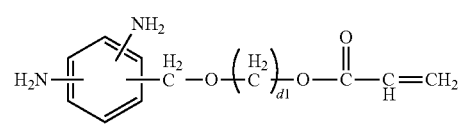

[3a-3]

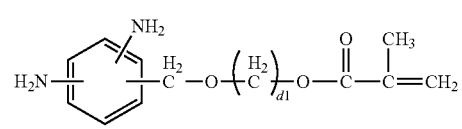

[3a-4]

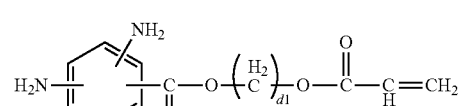

[3a-5]

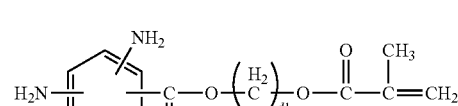

[3a-6]

(d1 is an integer of from 2 to 10.)

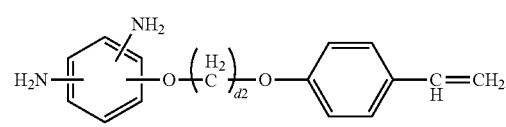

[3a-7]

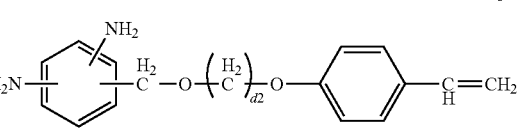

[3a-8]

[3a-9]
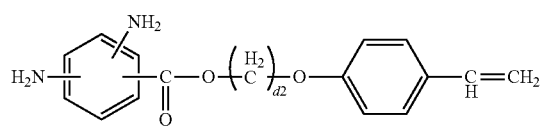

[3a-10]
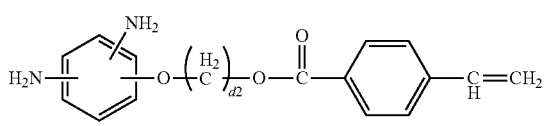

[3a-11]
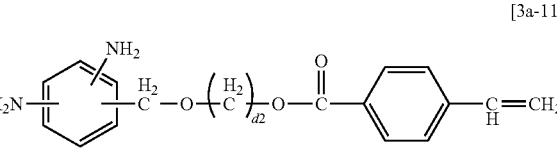

[3a-12]
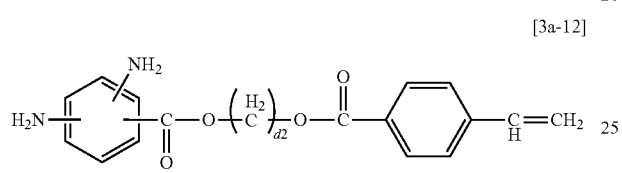

[3a-13]
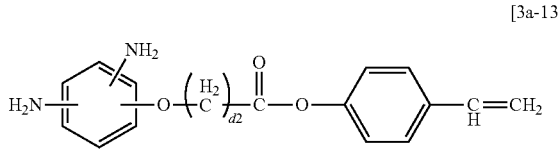

[3a-14]
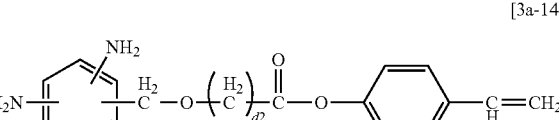

[3a-15]
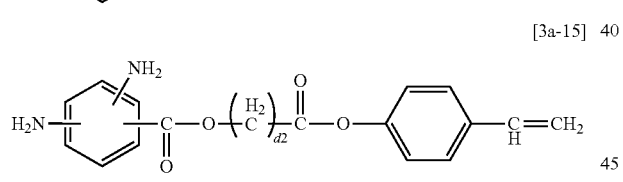

(d2 is an integer of from 2 to 10.)

[3a-16]
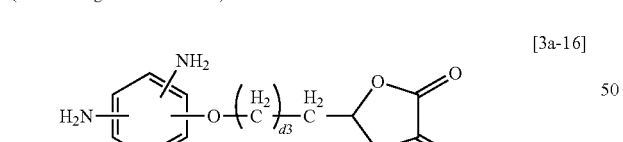

[3a-17]
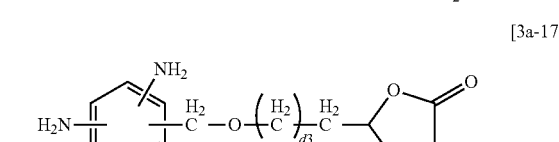

[3a-18]
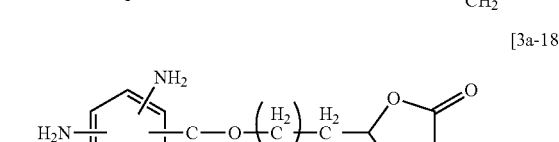

[3a-19]
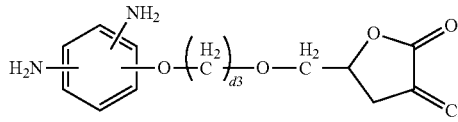

[3a-20]
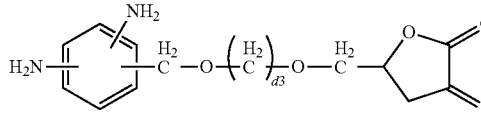

[3a-21]
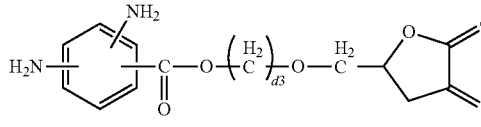

[3a-22]
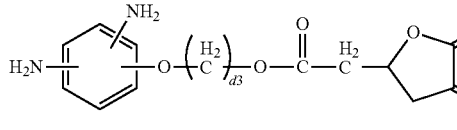

[3a-23]
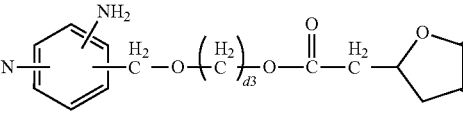

[3a-24]
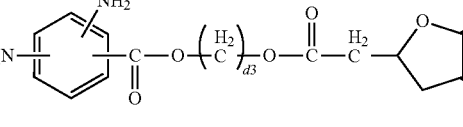

[3a-25]
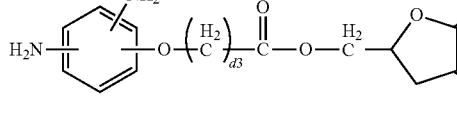

[3a-26]
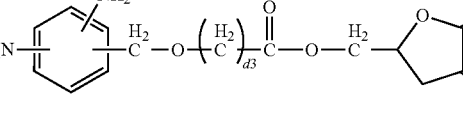

[3a-27]
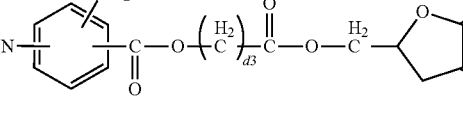

(d3 is an integer of from 2 to 10.)

The proportion of the specific side chain type diamine (2) to be used, is preferably from 5 to 60 mol %, more preferably from 10 to 50 mol %, to the total diamine component, from the viewpoint of adhesion between the liquid crystal layer and the liquid crystal alignment film in the liquid crystal display device.

Further, as the specific side chain type diamine (2), one type alone, or two or more types as mixed, may be used depending upon the solubility of the polyimide-type polymer in the solvent, and the vertical alignment property of the liquid crystal when it is used for a liquid crystal alignment film, and further, depending on the properties such as optical properties of the liquid crystal display device.

In a case where a polyimide type polymer is to be used as the specific polymer, as its diamine component, it is preferred to use a diamine represented by the following formula [4a] (also referred to as a third diamine) together with the specific side chain type diamine (1) and the specific side chain type diamine (2).

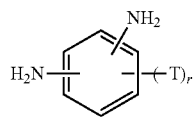
[4a]

T is at least one substituent selected from the group consisting of the following formula [4-1] to formula [4-4]. r is an integer of from 1 to 4. It is particularly preferably an integer of 1.

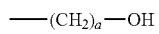
[4-1]

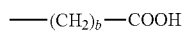
[4-2]

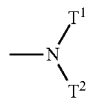
[4-3]

[4-4]

In the formula [4-1], a is an integer of from 0 to 4. Among them, from the viewpoint of availability of raw material or easy synthesis, an integer of 0 or 1 is preferred. In the formula [4-2], b is an integer of from 0 to 4. Among them, from the viewpoint of availability of raw material or easy synthesis, an integer of 0 or 1 is preferred. In the formula [4-3], $T^1$ and $T^2$ are each independently a $C_{1-12}$ hydrocarbon group. In the formula [4-4], $T^3$ is a $C_{1-5}$ alkyl group.

Specific examples of the third diamine will be given below, but are not limited thereto. For example, 2,4-dimethyl-m-phenylenediamine, 2,6-diaminotoluene, 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid or 3,5-diaminobenzoic acid, and further, diamines of structures represented by the following formula [4a-1] to [4a-6] may be mentioned.

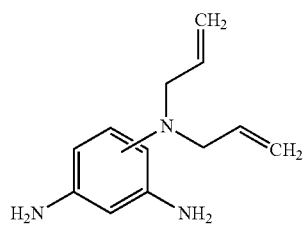
[4a-1]

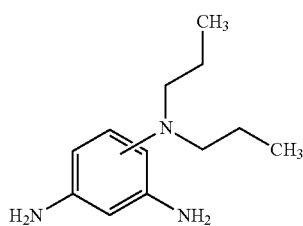
[4a-2]

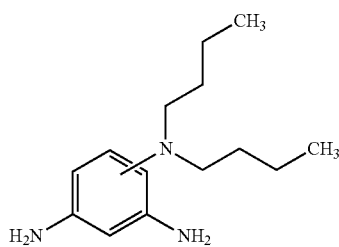
[4a-3]

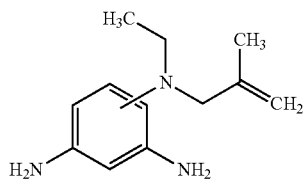
[4a-4]

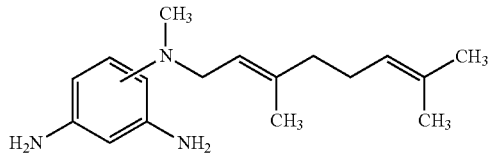
[4a-5]

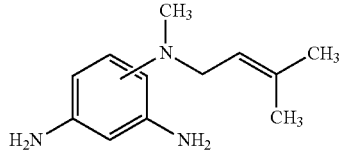
[4a-6]

Among them, preferred is 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid, 3,5-diaminobenzoic acid, or a diamine represented by the formula [4a-1], formula [4a-2] or formula [4a-3]. Particularly preferred from the viewpoint of the solubility of the polyimide-type polymer in the solvent or the optical properties of the liquid crystal display device, is 2,4-diaminophenol, 3,5-diaminophenol, 3,5-diaminobenzyl alcohol, 3,5-diaminobenzoic acid, or a diamine represented by the formula [4a-1] or formula [4a-2].

The proportion of the third diamine to be used is preferably from 1 to 50 mol %, more preferably from 1 to 40 mol %, particularly preferably from 5 to 40 mol %, to the total diamine component, from the viewpoint of adhesion between the liquid crystal layer and the liquid crystal alignment film in the liquid crystal display device.

As the third diamine, one type alone, or two or more types as mixed, may be used depending upon the solubility of the polyimide-type polymer in the solvent, the vertical alignment properties of the liquid crystal when it is used for a liquid crystal alignment film, and further, depending on the properties such as optical properties of the liquid crystal display device.

As a diamine component for producing the polyimide type polymer, it is also possible to use a diamine (also referred to as other diamine) other than the specific side chain type diamine (1), the specific side chain type diamine (2) and the third diamine, so long as it does not impair the effects of the present invention.

Specifically, other diamines as described on pages 19 to 23 in International Publication WO2013/125595, diamines of the formula [DA12], formula [DA15] to formula [DA20] and formula [DA22] to formula [DA25] as described on pages 24 to 25 in the same publication and diamines of the formula [DA27] and formula [DA28] as described on pates 25 to 26 in the same publication, may be mentioned.

As other diamines, one type alone, or two or more types as mixed, may be used depending upon the solubility of the polyimide type polymer in the solvent, the vertical alignment properties of the liquid crystal when formed into a liquid crystal alignment film, and further depending upon the properties such as optical properties of the liquid crystal display device.

As the tetracarboxylic acid component for producing the polyimide type polymer, preferred is a tetracarboxylic acid dianhydride represented by the following formula [5], or its tetracarboxylic acid derivative such as a tetracarboxylic acid, a tetracarboxylic acid dihalide, a tetracarboxylic acid dialkyl ester or a tetracarboxylic acid dialkyl ester dihalide (all collectively referred to as a specific tetracarboxylic acid component).

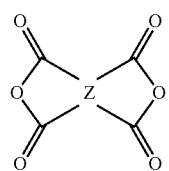

[5]

Z is at least one structure selected from the group consisting of the following formula [5a] to formula [5k].

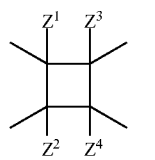

[5a]

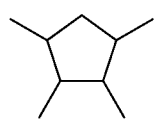

[5b]

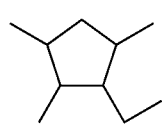

[5c]

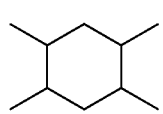

[5d]

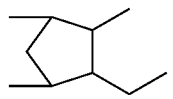

[5e]

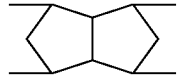

[5f]

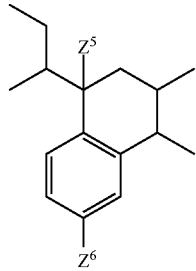

[5g]

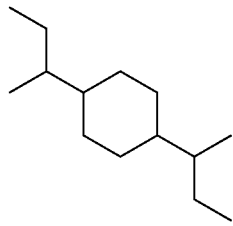

[5h]

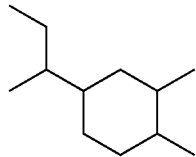

[5i]

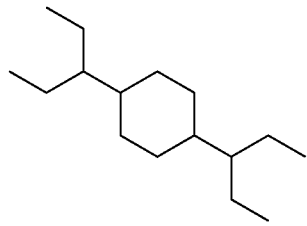

[5j]

[5k]

Z in the formula [5] is, from easy synthesis and the polymerization reaction efficiency at the time of producing the polymer, preferably the above formula [5a], formula [5c], formula [5d], formula [5e], formula [5f], formula [5g] or formula [5k]. More preferred from the viewpoint of optical properties of the liquid crystal display device, is the formula [5a], formula [5e], formula [5f], formula [5g] or formula [5k].

The proportion of the specific tetracarboxylic acid component to be used is preferably at least 1 mol % to the total tetracarboxylic acid component. More preferred is at least 5 mol %, and further preferred is at least 10 mol %. Among them, from the viewpoint of optical properties of the liquid crystal display device, particularly preferred is from 10 to 90 mol %.

Further, in the case of using a specific tetracarboxylic acid component of the above formula [5e], formula [5f], formula

[5g] or formula [5k], by adjusting its proportion to be at least 20 mol % in the entire tetracarboxylic acid component, the desired effect is obtainable. More preferred is at least 30 mol %. Moreover, the entire tetracarboxylic acid component may be a tetracarboxylic acid component of the formula [5e], formula [5f], formula [5g] or formula [5k].

For the polyimide-type polymer, it is possible to use other tetracarboxylic acid component other than the specific tetracarboxylic acid component, so long as it does not impair the effects of the present invention. As such other tetracarboxylic acid component, the following tetracarboxylic acid, tetracarboxylic dianhydride, dicarboxylic acid dihalide, dicarboxylic acid dialkyl ester or dialkyl ester dihalide may be mentioned. Specifically, other tetracarboxylic acid dianhydrides as described on pages 27 to 28 in International Publication WO2013/125595 may be mentioned.

Further, the specific tetracarboxylic acid component and other tetracarboxylic acid component, may be used either singly or in combination depending upon the solubility of the polyimide type polymer in the solvent, the vertical alignment properties of the liquid crystal when formed into a liquid crystal alignment film, and further depending upon the properties such as optical properties of the liquid crystal display device.

The method for synthesizing a polyimide-type polymer is not particularly limited. Usually, it is obtained by reacting a diamine component and a tetracarboxylic acid component. Specifically, a method which is described on pages 29 to 33 in International Publication WO2013/125595 may be mentioned.

The reaction of the diamine component and the tetracarboxylic acid component is usually conducted in a solvent containing the diamine component and the tetracarboxylic acid component. The solvent to be used at that time is not particularly limited so long as the resulting polyimide precursor will be dissolved therein. For example, N-methyl-2-pyrrolidone, N-ethyl-2-pyrrolidone or γ-butyrolactone, N,N-dimethylformamide, N,N-dimethylacetamide, dimethylsulfoxide, 1,3-dimethyl-imidazolidinone, etc. may be mentioned. Further, in a case where the solvent solubility of the polyimide precursor is high, it is possible to use methyl ethyl ketone, cyclohexanone, cyclopentanone, 4-hydroxy-4-methyl-2-pentanone or a solvent represented the following formula [D-1] to formula [D-3]. They may be used alone or as mixed.

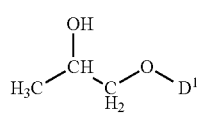
[D1]

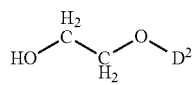
[D2]

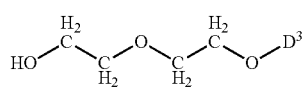
[D3]

($D^1$, $D^2$ and $D^3$ are each independently a $C_{1-4}$ alkyl group.)

The polyimide is a polyimide obtained by ring closure of a polyimide precursor, and in this polyimide, the ring-closure rate of the amic acid groups (also called the imidization rate) is not necessarily 100%, and may be optionally adjusted depending on the application or the purpose. In particular, from the viewpoint of solubility of the polyimide-type polymer in a solvent, it is preferably from 30 to 80%, more preferably, from 40 to 70%.

The molecular weight of the polyimide-type polymer is, from the viewpoint of the strength of the liquid crystal alignment film obtained therefrom, the working efficiency and film coating properties during film formation, preferably from 5,000 to 1,000,000, more preferably from 10,000 to 150,000, by Mw as measured by a GPC (Gel Permeation Chromatography) method.

In a case where a polysiloxane is to be used as the specific polymer, it is preferably a polysiloxane obtained by polycondensing an alkoxysilane represented by the following formula [A1], or a polysiloxane obtained by polycondensing the alkoxysilane represented by the formula [A1] and an alkoxysilane represented by the following formula [A2] and/or formula [A3], (collectively referred to as a polysiloxane-type polymer).

Alkoxysilane represented by the formula [A1]:

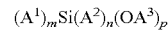
[A1]

In the formula [A1], $A^1$ is a structure represented by the formula [2-1] or formula [2-2]. Further, definitions and preferred combinations of $Y^1$, $Y^2$, $Y^3$, $Y^4$, $Y^5$, $Y^6$ and n in the formula [2-1] are as defined above, and definitions and preferred combinations of $Y^7$ and $Y^8$ in the formula [2-2] are as described above.

In the present invention, $A^1$ is preferably a specific side chain structure represented by the formula [2-1] from the viewpoint of the vertical alignment of the liquid crystal when formed into a liquid crystal alignment film, and from the viewpoint of the optical properties of the liquid crystal display device.

In the formula [A1], $A^2$, $A^3$, m, n and p are as defined above, but inter alia, respectively, the following ones are preferred. $A^2$ is preferably a hydrogen atom or a $C_{1-3}$ alkyl group. $A^3$ is, from the viewpoint of reactivity for polycondensation, preferably a $C_{1-3}$ alkyl group. m is, from the viewpoint of synthesis, preferably an integer of 1. n is an integer of from 0 to 2. p is, from the viewpoint of reactivity for polycondensation, preferably an integer of from 1 to 3, more preferably an integer of 2 or 3. m+n+p is an integer of 4.

Specific examples of the alkoxysilane having a specific side chain structure represented by the formula [2-1], may be alkoxysilanes of the formula [A1-1] to formula [A1-22] and the formula [A1-25] to formula [A1-32] as described on pages 41 to 44 in International Publication WO2014/061779. Here, in the description of the publication, $R^2$ in the formula [A1-19] to formula [A1-22] and the formula [A1-25] to formula [A1-31] is at least one member selected from the group consisting of —O—, —CH$_2$O—, —COO— and —OCO—. Among them, a preferred alkoxysilane is, from the viewpoint of the vertical alignment of the liquid crystal when made into a liquid crystal alignment film, or optical properties of the liquid crystal display device, the formula [A1-9] to formula [A1-21], the formula [A1-25] to formula [A1-28] or the formula [A1-32] as described in the publication.

As the alkoxysilane represented by the formula [A1], one type alone, or two or more types as mixed, may be used, depending upon the solubility of the polysiloxane-type polymer in the solvent, the vertical alignment properties of the liquid crystal when formed into a liquid crystal alignment film and further, depending on the properties such as optical properties of the liquid crystal display device.

Alkoxysilane represented by the formula [A2]:

$(B^1)_m Si(B^2)_n (OB^3)_p$      [A2]

In the formula [A2], $B^1$, $B^2$, $B^3$, m, n and p are as defined above, but inter alia, respectively, the following ones are preferred.

$B^1$ is, from the viewpoint of easy availability, preferably an organic group having a vinyl group, an epoxy group, an amino group, a methacryl group, an acryl group or an ureido group. More preferred is an organic group having a methacryl group, an acryl group or an ureido group. $B^2$ is preferably a hydrogen atom or a $C_{1-3}$ alkyl group. $B^3$ is, from the viewpoint of reactivity for polycondensation, preferably a $C_{1-3}$ alkyl group. m is, from the viewpoint of synthesis, preferably an integer of 1. n is an integer of from 0 to 2. p is, from the viewpoint of reactivity for polycondensation, preferably an integer of from 1 to 3, more preferably an integer of 2 or 3. m+n+p is 4.

Specific examples of the alkoxysilane represented by the formula [A2] may be those represented by the formula [A2] as described on pages 45 to 46 in International Publication WO2014/061779.

Among them, preferred is allyltriethoxysilane, allyltrimethoxysilane, diethoxymethylvinylsilane, dimethoxymethylvinylsilane, triethoxyvinylsilane, vinyltrimethoxysilane, vinyltris(2-methoxyethoxy)silane, 3-(triethoxysilyl)propyl methacrylate, 3-(trimethoxysilyl)propyl acrylate, 3-(trimethoxysilyl)propyl methacrylate, 3-glycidyloxypropyl(dimethoxy)methylsilane, 3-glycidyloxypropyl(diethoxy)methylsilane, 3-glycidyloxypropyltrimethoxysilane or 2-(3,4-epoxycyclohexyl)ethyltrimethoxysilane.

Particularly preferred from the viewpoint of adhesion between the liquid crystal layer and the liquid crystal alignment film of the liquid crystal display device, is 3-(triethoxysilyl)propyl methacrylate, 3-(trimethoxysilyl)propyl acrylate, 3-(trimethoxysilyl)propyl methacrylate, 3-glycidyloxypropyl(dimethoxy)methylsilane, 3-glycidyloxypropyl(diethoxy)methylsilane, 3-glycidyloxypropyltrimethoxysilane or 2-(3,4-epoxycyclohexyl)ethyltrimethoxysilane.

As the alkoxysilane of the formula [A2], one type alone, or two or more types as mixed, may be used depending upon the solubility of the polysiloxane-type polymer in a solvent, and the vertical alignment properties of the liquid crystal when formed into a liquid crystal alignment film, and further, depending on the properties such as optical properties of the liquid crystal display device.

Alkoxysilane represented by the formula [A3]:

$(D^1)_n Si(OD^2)_{4-n}$      [A3]

In the formula [A3], $D^1$, $D^2$ and n are as defined above, but inter alia, respectively, the following ones are preferred.

$D^1$ is preferably a hydrogen atom or a $C_{1-3}$ alkyl group. $D^2$ is, from the viewpoint of reactivity for polycondensation, preferably a $C_{1-3}$ alkyl group. n is an integer of from 0 to 3.

Specific examples of the alkoxysilane of the formula [A3] may be alkoxysilanes represented by the formula [A3] as described on page 47 in International Publication WO2014/061779.

In the formula [A3], as the alkoxysilane wherein n is 0, tetramethoxysilane, tetraethoxysilane, tetrapropoxysilane or tetrabutoxysilane, may be mentioned, and it is preferred to use such an alkoxysilane.

As the alkoxysilane of the formula [A3], one type alone, or two or more types as mixed, may be used, depending upon the solubility of the polysiloxane-type polymer in a solvent, and the vertical alignment properties of the liquid crystal when formed into a liquid crystal alignment film, and further, depending on the properties such as optical properties of the liquid crystal display device.

The polysiloxane-type polymer is a polysiloxane obtained by polycondensation of an alkoxysilane represented by the above formula [A1], or a polysiloxane obtained by polycondensation of an alkoxysilane represented by the above formula [A1] and an alkoxysilane represented by the formula [A2] and/or formula [A3]. That is, the polysiloxane-type polymer is any one of a polysiloxane obtained by polycondensation of only the alkoxysilane represented by the formula [A1], a polysiloxane obtained by polycondensation of two types of the alkoxysilanes represented by the formula [A1] and formula [A2], a polysiloxane obtained by polycondensation of two types of the alkoxysilanes represented by the formula [A1] and formula [A3], and a polysiloxane obtained by polycondensation of three types of the alkoxysilanes represented by the formula [A1], formula [A2] and formula [A3].

Among them, from the viewpoint of the reactivity for polycondensation or the solubility of the polysiloxane-type polymer in a solvent, preferred is a polysiloxane obtained by polycondensation of plural types of alkoxysilanes. That is, it is preferred to use any one of a polysiloxane obtained by polycondensation of two types of alkoxysilanes represented by the formula [A1] and formula [A2], a polysiloxane obtained by polycondensation of two types of alkoxysilanes represented by the formula [A1] and formula [A3], and a polysiloxane obtained by polycondensation of three types of alkoxysilanes represented by the formula [A1], formula [A2] and formula [A3].

In the case of using plural types of alkoxysilanes at the time of producing a polysiloxane-type polymer, the proportion of the alkoxysilane represented by the formula [A1] is preferably from 1 to 40 mol %, more preferably from 1 to 30 mol %, in all alkoxysilanes. Further, the proportion of the alkoxysilane represented by the formula [A2] is preferably from 1 to 70 mol %, more preferably from 1 to 60 mol %, in all alkoxysilanes. Furthermore, the proportion of the alkoxysilane represented by the formula [A3] is preferably from 1 to 99 mol %, more preferably from 1 to 80 mol %, in all alkoxysilanes.

The method for the polycondensation reaction to produce a polysiloxane-type polymer is not particularly limited. Specifically, the method described on pages 49 to 52 in International Publication WO2014/061779 may be mentioned.

In the polycondensation reaction to produce a polysiloxane-type polymer, in the case of using plural types of alkoxysilanes represented by the formula [A1], formula [A2] and formula [A3], a mixture obtained by previously mixing the plural types of alkoxysilanes may be used for the reaction, or the reaction may be carried out by sequentially adding the plural types of alkoxysilanes.

In the present invention, a solution of the polysiloxane-type polymer obtained by the above method may be used as it is, as the specific polymer, or if necessary, the solution of the polysiloxane-type polymer obtained by the above method, may be concentrated, or diluted by adding a solvent, or by substituting the solvent by another solvent, to be used as the specific polymer.

The solvent to be used for dilution (referred to also as diluting solvent) may be the solvent used in the polycondensation reaction or other solvent. The diluting solvent is not particularly limited so long as the polysiloxane type polymer is homogeneously dissolved, and one type or two or more types, may be optionally selected for use. As such a diluting solvent, in addition to the solvent used in the polycondensation reaction, for example, a ketone solvent such as acetone, methyl ethyl ketone or methyl isobutyl ketone, an ester solvent such as methyl acetate, ethyl acetate or ethyl lactate may be mentioned. Further, in a case where as the specific polymer, a polysiloxane-type polymer and other polymer are to be used, it is preferred that an alcohol generated at the time of the polycondensation of the polysiloxane-type polymer, is distilled off under normal pressure or under reduced pressure, before mixing other polymer to the polysiloxane-type polymer.

<Treating Agent for Liquid Crystal Alignment>

The liquid crystal alignment treating agent is a solution for forming a liquid crystal alignment film, and is a solution containing the specific polymer having a specific side chain structure represented by the above formula [2-1] or formula [2-2].

The specific polymer having the specific side chain structure is, as mentioned above, not particularly limited, but is preferably at least one polymer selected from the group consisting of an acrylic polymer, a methacrylic polymer, a novolak resin, a polyhydroxystyrene, a polyimide precursor, a polyimide, a polyamide, a polyester, a cellulose and a polysiloxane. More preferred is a polyimide precursor, a polyimide or a polysiloxane. Further, as the specific polymer, one of these polymers, or two or more of them, may be used.

All of polymer components in the liquid crystal alignment treating agent, may all be the specific polymers, or polymer(s) other than the specific polymers may be mixed. At that time, the content of other polymer(s) is from 0.5 to 15 parts by mass, preferably from 1 to 10 parts by mass, to 100 parts by mass of the specific polymer. Such other polymer(s) may be the above-mentioned polymer that does not have a specific side chain structure represented by the above formula [2-1] or formula [2-2].

The content of the solvent in the liquid crystal alignment treating agent may be suitably selected depending on the coating method of the liquid crystal alignment treating agent or with a view to obtaining a desired film thickness. Particularly, from the viewpoint of forming a uniform liquid crystal alignment film by coating, the content of the solvent in the liquid crystal alignment treating agent is preferably from 50 to 99.9 mass %, more preferably from 60 to 99 mass %. Particularly preferred is from 65 to 99 mass %.

The solvent to be used in the liquid crystal alignment treating agent is not particularly limited so long as it is a solvent for dissolving the specific polymer. Particularly, in a case where the specific polymer is a polyimide precursor, a polyimide, a polyamide or a polyester, or in a case where the solubility of an acrylic polymer, a methacrylic polymer, a novolak resin, a polyhydroxystyrene, a cellulose or a polysiloxane in the solvent is low, it is preferred to use the following solvent (referred to also as the solvent A).

For example, N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone or 4-hydroxy-4-methyl-2-pentanone. Among them, it is preferred to use N-methyl-2-pyrrolidone, N-ethyl-2-pyrrolidone or γ-butyrolactone. Further, they may be used alone, or may be used as mixed.

In a case where the specific polymer is an acrylic polymer, a methacrylic polymer, a novolak resin, a polyhydroxystyrene, a cellulose or a polysiloxane, or further, in a case where the specific polymer is a polyimide precursor, a polyimide, a polyamide or a polyester, and the solubility of such a specific polymer in a solvent is high, it is possible to use the following solvent (referred to also as the solvent B).

Specific examples of the solvent B may be poor solvents as described on pages 35 to 37 in International Publication WO2013/125595.

Among them, it is preferred to use 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone, or a solvent represented by the above formula [D1] to formula [D3].

Further, at the time of using such solvent B, in order to improve the coating properties of the liquid crystal alignment treating agent, it is preferred to use the solvent A such as N-methyl-2-pyrrolidone, N-ethyl-2-pyrrolidone or γ-butyrolactone in combination. More preferred is a combined use of γ-butyrolactone.

Such solvent B is capable of improving the coating property and surface smoothness of the liquid crystal alignment film at the time of applying the liquid crystal alignment treating agent, and therefore, in a case where a polyimide precursor, a polyimide, a polyamide or a polyester is used as the specific polymer, it is preferred to use the solvent B in combination with the solvent A. At that time, the solvent B is preferably from 1 to 99 mass % in the total solvent contained in the liquid crystal alignment treating agent. Further, preferred is from 10 to 99 mass %. More preferred is from 20 to 95 mass %.

To the liquid crystal alignment treating agent of the present invention, it is preferred to incorporate at least one generating agent (also called a specific generating agent) selected from the group consisting of a photo-radical generating agent, a photo-acid generating agent and a photo-base generating agent.

As the specific generating agent, specifically, those disclosed on pages 54 to 56 in International Publication 2014/171493 may be mentioned. Among them, as the specific generating agent, it is preferred to use a photo-radical generating agent from the viewpoint of adhesion between the liquid crystal layer and the liquid crystal alignment film.

The proportion of the specific generating agent to be used (contained) in the liquid crystal alignment treating agent is preferably from 0.1 to 20 parts by mass, to 100 parts by mass of all polymer components. From the viewpoint of the above effects, more preferred is from 0.5 to 15 parts by mass, and particularly preferred is from 1 to 10 parts by mass.

To the liquid crystal alignment treating agent in the present invention, it is preferred to incorporate a compound (referred to also as a specific adhesion compound) having at least one structure selected from the group consisting of the following formula [b-1] to formula [b-8] in order to enhance the adhesion between the liquid crystal layer and the liquid crystal alignment film of the liquid crystal display device.

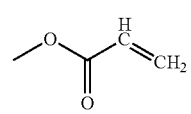

[b-1]

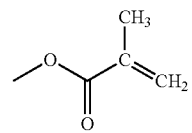

[b-2]

-continued

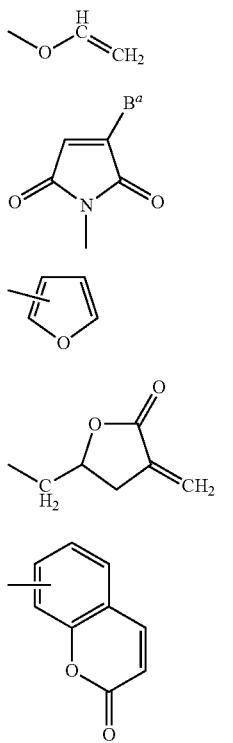

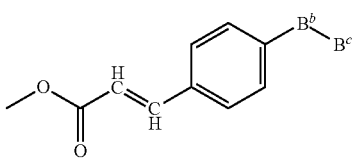

In the formula [b-4], $B^a$ is a hydrogen atom or a benzene ring. Among them, a hydrogen atom is preferred. In the formula [b-8], $B^b$ is at least one cyclic group selected from the group consisting of a benzene ring, a cyclohexane ring and a heterocyclic ring. $B^c$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group. Among them, a $C_{1-12}$ alkyl group or a $C_{1-12}$ alkoxy group is preferred.

As the specific adhesion compound, specifically, compounds represented by the following formula [6] as disclosed on pages 43 to 46 in International Publication WO 2015/012368 (published on 2015 Jan. 29) may be mentioned.

Among them, as the specific adhesion compound, preferred is at least one compound selected from the group consisting of the following formula [7a-1] to formula [7a-5].

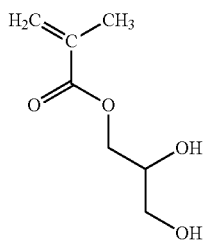

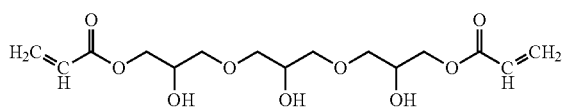

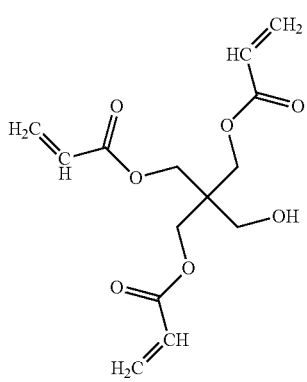

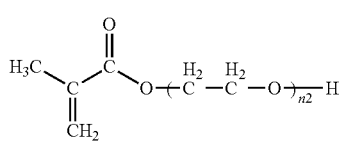

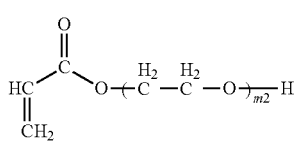

(n2 is an integer of from 1 to 10, and m2 is an integer of from 1 to 10.)

Further, as the specific adhesion compound, those disclosed on pages 61 to 63 in International Publication WO2014/171493 may also be used.

The proportion of the specific adhesion compound to be used (contained) in the liquid crystal alignment treating agent is preferably from 0.1 to 150 parts by mass to 100 parts by mass of all polymer components. In order to let the crosslinking reaction proceed to provide the desired effects, it is more preferably from 0.1 to 100 parts by mass, particularly preferably from 1 to 50 parts by mass.

As the specific adhesion compound, one type may be used alone, or two or more types may be used as mixed, depending upon the vertical alignment properties of the liquid crystal at the time of being formed into a liquid crystal alignment film, and further depending upon the properties such as optical properties of the liquid crystal display device.

The liquid crystal alignment treating agent of the present invention preferably contains a compound having epoxy groups, isocyanate groups, oxetane groups, or cyclocarbonate groups, or a compound having at least one type of groups selected from the group consisting of hydroxy groups, hydroxyalkyl groups and $C_{1-3}$ alkoxyalkyl groups (collectively referred to as a specific crosslinkable compound). At that time, such groups should be present at least two in the compound.

As examples of the crosslinkable compound having epoxy groups or isocyanate groups, specifically, those described on pages 37 to 38 in International Publication WO2013/125595 may be mentioned.

As the crosslinkable compound having oxetane groups, specifically, those represented by the formula [4a] to formula [4k] as published on pages 58 to 59 in International Publication WO2011/132751 may be mentioned.

As the crosslinkable compound having cyclocarbonate groups, specifically, crosslinkable compounds represented by the formula [5-1] to formula [5-42] as published on pages 76 to 82 in International Publication WO2012/014898 may be mentioned.

As the crosslinkable compound having at least one type of groups selected from the group consisting of hydroxy groups, hydroxyalkyl groups and lower alkoxyalkyl groups, specifically, melamine derivatives or benzoguanamine derivatives as described on pages 39 to 40 in International Publication WO2013/125595 and crosslinkable compounds represented by the formula [6-1] to formula [6-48] as published on pages 62 to 66 in International Publication WO2011/132751 may be mentioned.

The proportion of the specific crosslinkable compound to be used (contained) in the liquid crystal alignment treating agent is preferably from 0.1 to 100 parts by mass to 100 parts by mass of all polymer components. In order to let the crosslinking reaction proceed thereby to provide the desired effects, it is more preferably from 0.1 to 50 parts by mass, particularly preferably from 1 to 30 parts by mass.

To the liquid crystal alignment treating agent, in order to promote charge transfer in the liquid crystal alignment film thereby to facilitate electrostatic discharge of the device, a nitrogen-containing heterocyclic amine compound represented by the formula [M1] to formula [M156] as published on pages 69 to 73 in International Publication WO2011/132751 may be added. The amine compound may be added directly to the liquid crystal alignment treating agent, but, it is preferably added after being formed into its solution with a concentration of from 0.1 to 10 mass %, preferably from 1 to 7 mass %, by a suitable solvent. This solvent is not particularly limited so long as it is an organic solvent capable of dissolving the specific polymer.

Further, for the liquid crystal alignment treating agent, it is possible to use a compound to improve uniformity of the film thickness or surface smoothness of the liquid crystal alignment film when the liquid crystal alignment treating agent is applied, so long as it does not impair the effects of the present invention. Furthermore, it is also possible to use such a compound that improves adhesion between the liquid crystal alignment film and the substrate.

As the compound to improve uniformity of the film thickness or surface smoothness of the liquid crystal alignment film, a fluorinated surfactant, a silicone-type surfactant, a nonionic surfactant, etc. may be mentioned. Specifically, those disclosed on pates 42 to 43 in International Publication WO2013/125595 may be mentioned.

The amount of the surfactant to be used (contained) is preferably from 0.01 to 2 parts by mass, more preferably from 0.01 to 1 part by mass, to 100 parts by mass of all polymer components contained in the liquid crystal alignment treating agent.

As specific examples of the compound to improve adhesion between the liquid crystal alignment film and the substrate, a functional silane-containing compound and an epoxy group-containing compound may be mentioned. Specifically, those described on pages 43 to 44 in International Publication WO2013/125595 may be mentioned.

The proportion of the compound to be used (contained) to improve the adhesion to the substrate is preferably from 0.1 to 30 parts by mass, more preferably from 1 to 20 parts by mass, to 100 parts by mass of all polymer components. If it is less than 0.1 part by mass, the effect of improving the adhesion cannot be expected, and if it is larger than 30 parts by mass, the storage stability of the liquid crystal alignment treating agent may be deteriorated.

To the liquid crystal alignment treating agent, as a compound other than those described above, a dielectric or conductive material for the purpose of altering the electrical characteristics such as the dielectric constant and conductivity of the liquid crystal alignment film may be added.

<Methods for Producing Liquid Crystal Alignment Film and Liquid Crystal Display Device, and Specific Ultraviolet Irradiation Apparatus>

The substrate to be used in a liquid crystal display device of the present invention is not particularly limited so long as it is a highly transparent substrate, and it is possible to use, not only a glass substrate, but also a plastic substrate such as an acrylic substrate, a polycarbonate substrate or a PET (polyethylene terephthalate) substrate, or further, a film thereof. In a case where the liquid crystal display device is to be used as a reverse device for e.g. a dimming window, the substrate is preferably a plastic substrate or film. Further, from the viewpoint of simplification of the process, it is preferred to employ a substrate having ITO (Indium Tin Oxide) electrodes, IZO (Indium Zinc Oxide) electrodes, IGZO (Indium Gallium Zinc Oxide) electrodes, an organic conductive film, etc. for liquid crystal driving, formed thereon. In the case of producing a reflection type reverse device, it is possible to use, as only one of the pair of substrates, a substrate having a metal or dielectric multilayer film such as a silicon wafer or aluminum formed thereon.

In the liquid crystal display device of the present invention, at least one of the pair of substrates has a liquid crystal alignment film to align liquid crystal molecules vertically. This liquid crystal alignment film can be obtained by applying a liquid crystal alignment treating agent onto the substrate and firing it, followed by alignment treatment by e.g.

rubbing treatment or light irradiation. However, in the case of a liquid crystal alignment film in the present invention, it can be used as a liquid crystal alignment film without such alignment treatment.

The method for applying the liquid crystal alignment treating agent is not particularly limited, but from an industrial viewpoint, may, for example, be screen printing, offset printing, flexo printing, an ink jet method, a dipping method, a roll coater method, a slit coating method, a spinner method, a spray method, etc., and the method may suitably be selected for use depending on the type of the substrates, the desired thickness of the liquid crystal alignment film, etc.

After applying the liquid crystal alignment treating agent on the substrate, the solvent is evaporated by a heating means such a hot plate, a heat circulating oven or an IR (infrared) oven, at a temperature of from 30 to 300° C., preferably from 30 to 250° C. depending upon the type of the substrates or the solvent used in the liquid crystal alignment treating agent. Particularly, in a case where a plastic substrate is used as the substrate, it is preferred to conduct the treatment at a temperature of from 30 to 150° C.

With respect to the thickness of the liquid crystal alignment film after firing, if it is too thick, such becomes disadvantageous from the aspect of power consumption of the liquid crystal display device, and if it is too thin, the reliability of the device is likely to be low. Therefore, it is preferably from 5 to 500 nm, more preferably from 10 to 300 nm, particularly preferably from 10 to 250 nm.

The liquid crystal composition to be used for the liquid crystal display device of the present invention is as described above, but therein, a spacer may be incorporated for controlling the electrode gap (referred to also as the gap) of the liquid crystal display device.

The injection method of the liquid crystal composition is not particularly limited, and, for example, the following method may be mentioned. That is, in a case where a glass substrate is to be used as the substrate, a method may be mentioned in which a pair of substrates having a liquid crystal alignment film formed thereon are prepared, then to the four sides of one substrate, a sealing agent is applied except for a portion thereof, thereafter, the other substrate is bonded so that the liquid crystal alignment film side be inside, to prepare an empty cell, and then, from the portion where the sealing agent is not applied, the liquid crystal composition is vacuum-injected to obtain a liquid crystal composition injected cell. Further, in a case where a plastic substrate or film is to be used as the substrate, a method may be mentioned in which a pair of substrates having a liquid crystal alignment film formed thereon are prepared, then on one substrate, the liquid crystal composition is dropped by an ODF (One Drop Filling) method or an inkjet method, and thereafter, the other substrate is bonded to obtain a liquid crystal composition injected cell. In the liquid crystal display device of the present invention, adhesion between the liquid crystal layer and the liquid crystal alignment film, is high, and therefore, the sealing agent may not be applied to the four sides of the substrate.

The gap of the liquid crystal display device can be controlled by e.g. the above-mentioned spacer. The method may be a method of incorporating a spacer of a desired size in the liquid crystal composition, as mentioned above, or a method of using a substrate having a column spacer of a desired size. Otherwise, in a case where by using plastic or film substrates as the substrates, bonding of the substrates is carried out by lamination, the gap may be controlled without incorporating a spacer.

The size of the gap of the liquid crystal display device is preferably from 1 to 100 μm, more preferably from 2 to 50 μm, particularly preferably from 5 to 20 μm. If the gap is too small, the contrast of the liquid crystal display device decreases, and if it is too large, the driving voltage of the device becomes high.

The liquid crystal display device of the present invention is obtainable by curing the liquid crystal composition by irradiation with ultraviolet rays, to form a liquid crystal layer of a cured product composite of the liquid crystal and the polymerizable compound. Curing the liquid crystal composition is conducted by irradiating the liquid crystal composition with ultraviolet rays. As the ultraviolet light source, it is preferred to use an ultraviolet light emitting diode (also called a specific ultraviolet irradiation apparatus), since it is thereby possible to irradiate with ultraviolet rays of a specific wavelength without a loss of irradiation light intensity even without using a wavelength selective filter, and further, it is possible to suppress a heat source generated from the light source. Further, the light source is preferably disposed above and below the device, because it is thereby possible to accelerate curing of the liquid crystal composition.

Figure 2:
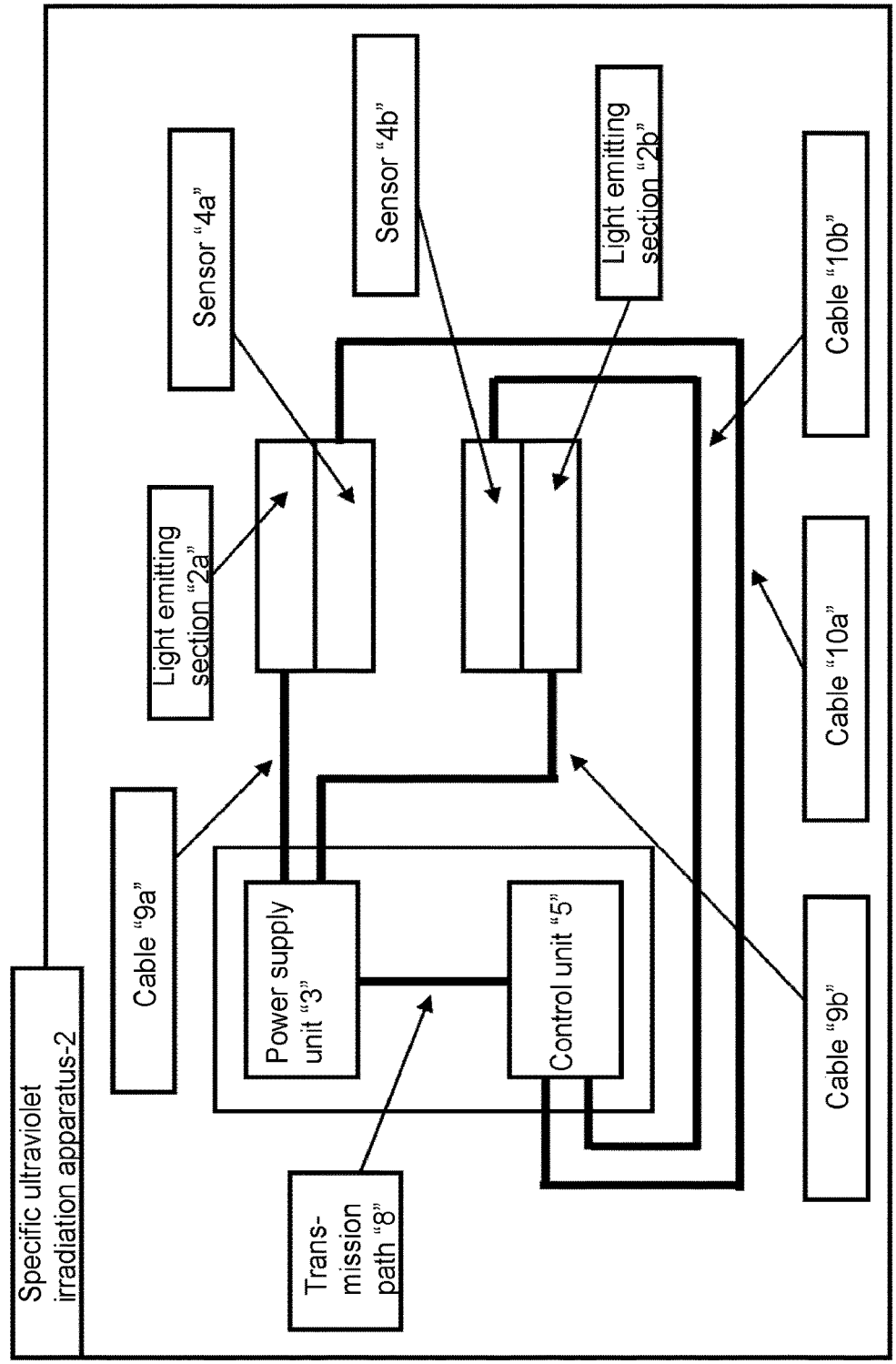
FIG. 2 is a schematic block diagram of a specific ultraviolet irradiation apparatus 2 in the present invention.

Preferred specific examples of the specific ultraviolet irradiation apparatus are as shown in FIG. 1 and FIG. 2.

FIG. 1 shows a block diagram of one specific ultraviolet irradiation apparatus (the specific ultraviolet irradiation apparatus-1). In FIG. 1, "2" denotes a light emitting section, and "3" denotes a power supply unit. The light emitting section "2" is provided with a plurality of ultraviolet light emitting diodes as light sources, and such ultraviolet light emitting diodes will receive the source power supplied through a flexible cord "6" from the power supply unit "3" to emit light so as to be able to irradiate with ultraviolet rays of the desired intensity. Each of the ultraviolet light emitting diodes is one to emit ultraviolet rays of a single wavelength, and one to emit ultraviolet rays of a wavelength necessary for the preparation of the liquid crystal display device.

Further, the light emitting section "2" is attached to the tip of a manipulator not shown in FIG. 1 and is designed to be able to freely move to or stop at any position in the working space according to a predetermined program, or under the control of the operator. Further, the directivity angle of the light emitting section "2" or ultraviolet light emitting diodes can be changed freely, so that it is possible to emit ultraviolet rays in the desired direction. Accordingly, this specific ultraviolet irradiation apparatus-1 is useful in a case where it is necessary to irradiate only a part of the liquid crystal composition injected cell at a narrow range, or ultraviolet irradiation is applied to an object to be treated, having a complicated shape or steric structure.

Further, the specific ultraviolet irradiation apparatus-1 is designed so that the irradiation light intensity, brightness and temperature of the ultraviolet rays applied to the object to be treated i.e. to the liquid crystal composition injected cell, can be always monitored, and at the same time, so that they fall within the predetermined ranges. Specifically, the sensor "4" to measure the brightness and the temperature at the surface of the object to be treated and the intensity of ultraviolet rays irradiated from the ultraviolet light emitting diodes, is disposed near the light emitting section "2", and the measured values by this sensor "4" are always input to the control unit "5" via a flexible cord "7". The control unit "5" has a built-in arithmetic circuit, and upon receipt of the measured values from the sensor "4", it will calculate, by the arithmetic circuit, the output conditions (referred to also as values of the supply power) of the ultraviolet light emitting diodes required to maintain the irradiation light intensity, brightness and temperature of the ultraviolet rays applied to the object to be treated, to be within predetermined ranges and will calculate correction values of the output conditions by taking the difference from the current output conditions. The correction values of the output conditions will be transmitted from the control unit "5" via a transmission path "8" to the power supply unit "3". Then, by receiving the transmitted correction values, the power supply unit "3" will change the output conditions. Thus, it is possible to maintain the irradiation light intensity, brightness and temperature of the ultraviolet rays to be within predetermined ranges.

Here, the control target items can be optionally selected depending on the type, nature, etc. of the object to be treated, i.e. of the liquid crystal composition injected cell, and it is possible to control all of the irradiation light intensity, brightness and temperature of ultraviolet rays, or it is possible to control only one or two among them. Also the upper limit value and lower limit value of each control target item can be optionally selected depending on the type, nature, etc. of the object to be treated.

In addition, at the forward end of each ultraviolet light emitting diode, a focusing lens may be installed. In such a case, it is possible to narrow the irradiation light of ultraviolet rays, and ultraviolet irradiation within a micro range, for example, at 1 μm or less, becomes possible. Further, when it is made possible to freely control the focusing lens, it becomes possible to freely change the irradiation range of the ultraviolet rays within its performance.

FIG. 2 shows a block diagram of another specific ultraviolet irradiation apparatus (the specific ultraviolet irradiation apparatus-2) different from one as described above. As shown in FIG. 2, the specific ultraviolet irradiation apparatus-2 has two light-emitting sections "2a" and "2b" which are arranged in parallel at the upper and lower two stages with a predetermined distance. In each of the light-emitting sections "2a" and "2b", as the light sources, a number (n×m pieces) of ultraviolet light emitting diodes are respectively aligned in a lattice (n rows×m columns) in the horizontal direction. Here, in the specific ultraviolet irradiation apparatus-2, in each of the light emitting sections "2a" and "2b", ultraviolet light emitting diodes are aligned in a lattice of n rows×m columns, but the ultraviolet light emitting diodes may be arranged in a zigzag pattern, radially or in a honeycomb shape. Further, the alignment direction of the ultraviolet light emitting diodes is not necessarily horizontal, but may be in a planar direction, i.e. it needs only be aligned along one planar or gently curved plane. Specifically, for example, it may be a structure aligned in the vertical direction.

In addition, the ultraviolet light emitting diodes are, like in the specific ultraviolet irradiation apparatus-1, those which emit ultraviolet rays of a single wavelength, and those which emit ultraviolet rays of a wavelength required to prepare the liquid crystal display device.

Further, the ultraviolet light-emitting diodes of the upper light emitting section "2a" are each being arranged to face downwardly, and designed to be able to emit light by receiving the power source electric power supplied via a cable "9a" from the power supply unit "3", to radiate ultraviolet rays with the desired intensity to the downward direction. On the other hand, ultraviolet light emitting diodes of the lower light emitting section "2b" are each being arranged to face upward, and designed to be able to emit light by receiving the power source electric power supplied via a cable "9b" from the power supply unit "3", and to radiate ultraviolet rays with the desired intensity to the upward direction. Thus, the specific ultraviolet irradiation apparatus-2 is capable of carrying out irradiation with ultraviolet rays at a plane on the object to be treated i.e. the liquid crystal composition injected cell and capable of carrying out irradiation with ultraviolet rays simultaneously on the upper and lower surfaces of the object to be treated.

Further, the specific ultraviolet irradiation apparatus-2 is designed so that the irradiation light intensity, brightness and temperature of ultraviolet rays applied to the object to be treated i.e. to the liquid crystal composition injected cell, can be always monitored, and at the same time, so that they fall within the predetermined ranges. Specifically, the sensors "4a" and "4b" to measure the brightness and the temperature at the surface of the object to be treated and the intensity of ultraviolet rays irradiated from the ultraviolet light emitting diodes, are respectively disposed near the light emitting sections "2a" and "2b", and the measured values by these sensors "4a" and "4b" are always input to the control unit "5" via cables "10a" and "10b". This control unit "5" has a built-in arithmetic circuit, and upon receipt of the measured values from the sensors "4a" and "4b", it will calculate, by the arithmetic circuit, the output conditions of the ultraviolet light emitting diodes required to maintain the irradiation light intensity, brightness and temperature of the ultraviolet rays applied to the object to be treated, to be within predetermined ranges and will calculate correction values of the output conditions by taking the difference from the current output conditions. The correction values of the output conditions will be transmitted from the control unit "5" via a transmission path "8" to the power supply unit "3". Then, by receiving the transmitted correction values, the power supply unit "3" will change the output conditions. Thus, it is possible to maintain the irradiation light intensity, brightness and temperature of the ultraviolet rays to be within predetermined ranges.

Further, in this specific ultraviolet irradiation apparatus-2, the outputs (referred to also as the power supply) of all ultraviolet light-emitting diodes disposed in the light emitting sections "2a" and "2b", can be, respectively, individually adjusted. Further, since the sensors "4a" and "4b" correspond individually to each one of the ultraviolet light emitting diodes disposed in the light emitting sections "2a" and "2b", it is possible to control the irradiation light intensity, brightness and temperature of ultraviolet rays of all ultraviolet light-emitting diodes, respectively, independently. Therefore, it is possible to eliminate variations in the irradiation light intensity and brightness of the ultraviolet rays to be irradiated, and the surface temperature of the object to be treated, i.e. of the liquid crystal composition injected cell, and it is possible to carry out irradiation with ultraviolet rays uniformly over the entire region of the surface of the object to be treated. Also, by preparing appropriate control conditions (referred to also as the profile) in advance depending on the type and production process of the object to be treated, and applying them when performing irradiation with ultraviolet rays, it is possible to prepare an optimum environment for irradiation with ultraviolet rays according to the characteristics, purpose, etc. of the object to be treated.

Specific examples of the profile may be (1) the irradiation light intensity of all of the ultraviolet light emitting diodes being 100%, (2) the irradiation light intensity of a half of the ultraviolet light emitting diodes being 100%, and the irradiation intensity of the remaining half of the ultraviolet light emitting diodes being 50%, (3) the irradiation light intensity of one-third of the total of the ultraviolet light-emitting diodes being 50%, and the irradiation light intensity of the rest of the ultraviolet light-emitting diodes being 25%, etc.

To prepare the liquid crystal display device of the present invention, it is preferred to use the specific ultraviolet irradiation apparatus-1 or -2, since it is thereby possible to control the wavelength, irradiation light intensity, brightness and temperature of the ultraviolet rays to be irradiated. It is particularly preferred to use the specific ultraviolet irradiation apparatus-2.

The wavelength of ultraviolet rays of the ultraviolet light emitting diodes at the time of using the specific ultraviolet irradiation apparatus-1 or -2, is preferably from 200 to 500 nm, more preferably from 250 to 450 nm, particularly preferably from 300 to 400 nm.

The irradiation light intensity of the ultraviolet light emitting diodes is preferably from 0.1 to 150 mW/cm$^2$, more preferably from 0.1 to 100 mW/cm$^2$, particularly preferably from 1 to 40 mW/cm$^2$. Most preferably, from the viewpoint of optical properties of the liquid crystal display device and adhesion between the liquid crystal layer and the liquid crystal alignment film, it is from 1 to 20 mW/cm$^2$. The irradiation time of ultraviolet rays is preferably from 1 to 600 seconds, more preferably from 5 to 300 seconds, particularly preferably from the viewpoint of optical properties of the liquid crystal display device and adhesion between the liquid crystal layer and the liquid crystal alignment film, from 5 to 120 seconds.

Further, the surface temperature of the object to be treated i.e. of the liquid crystal composition injected cell at the time of irradiation with ultraviolet rays, is preferably from 0 to 100° C., more preferably from 10 to 50° C., particularly preferably from 15 to 30° C.

As described above, by means of the specific ultraviolet irradiation apparatus, and by using a liquid crystal composition comprising a liquid crystal, a polymerizable compound and a specific compound, and a liquid crystal alignment film obtained from a liquid crystal alignment treating agent containing a specific polymer having a specific side chain structure, it is possible to obtain a liquid crystal display device having good optical properties, i.e. transparency when no voltage is applied and scattering properties when a voltage is applied, being good, and further, adhesion between the liquid crystal layer and the liquid crystal alignment film being high.

EXAMPLES

Hereinafter, the present invention will be described in further detail with reference to Examples, but the present invention is by no means thereby limited. Abbreviations used in the following are as follows.
(Specific Compound)

S1

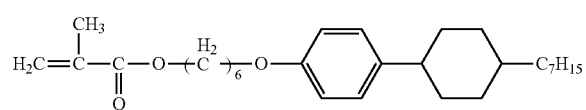

S2

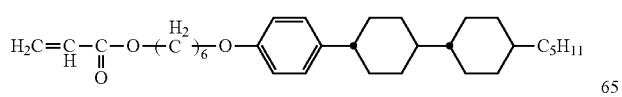

(Liquid Crystal)

L1: MLC-6608 (manufactured by Merck Ltd.)
(Polymerizable Compound)

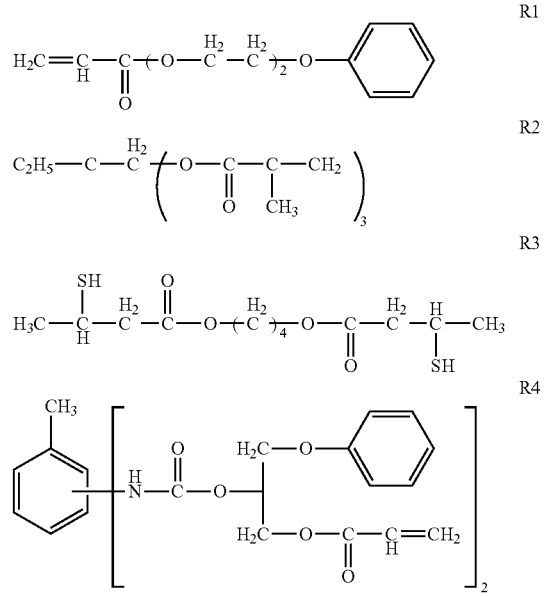

(R4: Phenyl glycidyl ether acrylate toluene diisocyanate urethane prepolymer)
(Photoinitiator)

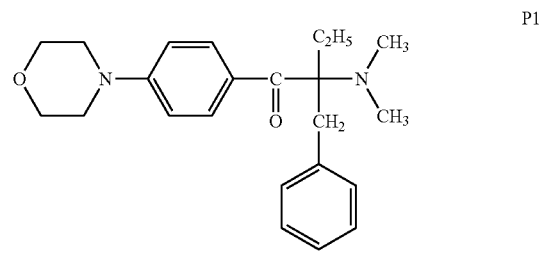 [SMILES: CCC(Cc1ccccc1)(C(=O)c1ccc(N2CCOCC2)cc1)N(C)C]

(Organophosphate Compound)

X1: Tetraphenyl dipropylene glycol diphosphate
(Specific Side Chain Type Diamine (1))

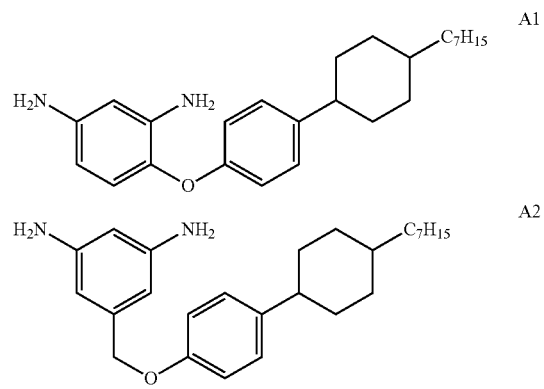

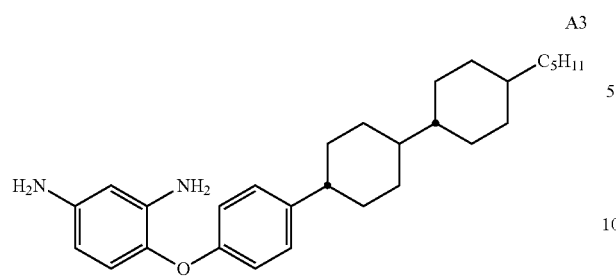
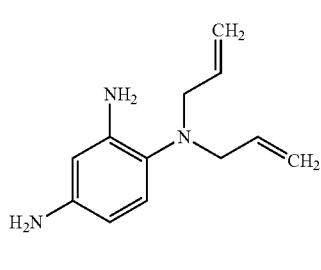
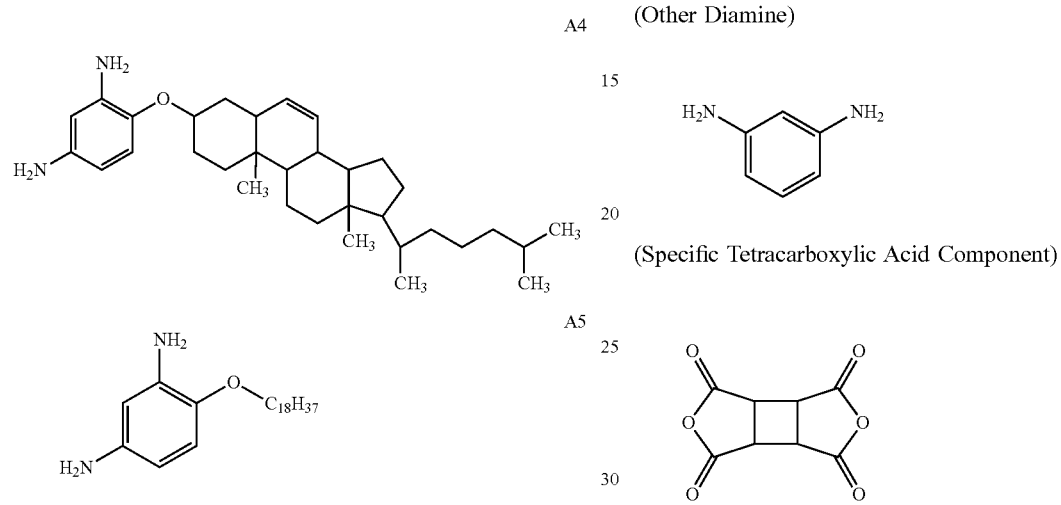
(Other Diamine)
(Specific Tetracarboxylic Acid Component)
(Specific Side Chain Type Diamine (2))
(Third Diamine)
<Monomers for Producing Polysiloxane-Type Polymers>
F1: Compound represented by the following F1
F2: Octadecyltriethoxysilane F3: 3-Methacryloxypropyltrimethoxysilane
F4: 3-Ureidopropyltriethoxysilane
F5: Tetraethoxysilane

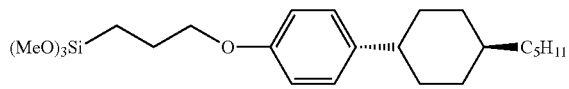
F1

<Specific Generating Agent>

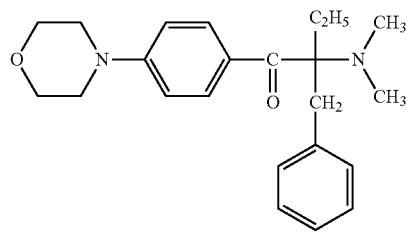
N1

<Specific Adhesion Compound>

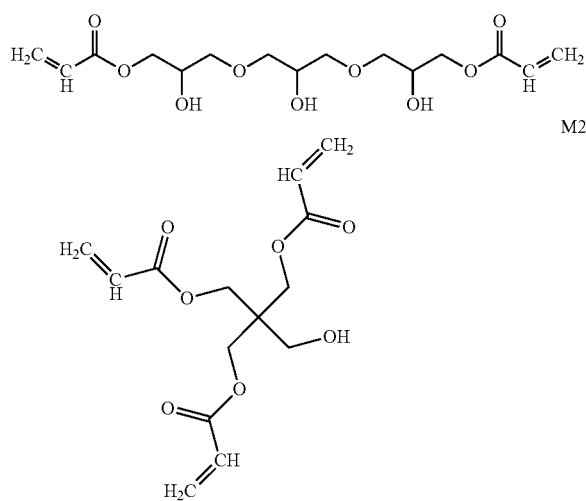
M1

M2

<Specific Crosslinkable Compound>

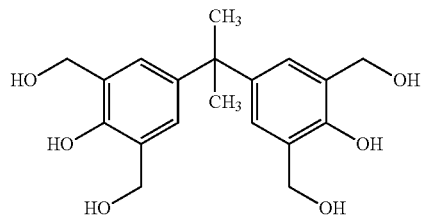
K1

<Solvent>
NMP: N-Methyl-2-pyrrolidone
NEP: N-Ethyl-2-pyrrolidone
γ-BL: γ-Butyrolactone
BCS: Ethylene glycol monobutyl ether
PB: Propylene glycol monobutyl ether
PGME: Propylene glycol monomethyl ether
ECS: Ethylene glycol monoethyl ether
EC: Diethylene glycol monoethyl ether "Molecular Weight Measurement of Polyimide-Type Polymer"

Measured as follows by using a room temperature gel permeation chromatography (GPC) apparatus (GPC-101) (manufactured by Showa Denko K.K.), and a column (KD-803, KD-805) (manufactured by Shodex).

Column temperature: 50° C.

Eluent: N,N'-Dimethylformamide (additives: 30 mmol/L (liter) of lithium bromide monohydrate ($LiBr.H_2O$), 30 mmol/L of phosphoric acid anhydrous crystal (o-phosphoric acid), and 10 ml/L of tetrahydrofuran (THF))

Flow rate: 1.0 ml/min

Standard samples for preparation of calibration curve: TSK standard polyethylene oxide (molecular weight: about 900,000, 150,000, 100,000 and 30,000) (manufactured by TOSOH CORPORATION) and polyethylene glycol (molecular weight: about 12,000, 4,000 and 1,000) (manufactured by Polymer Laboratories Ltd.).

"Measurement of Imidization Rate of Polyimide-Type Polymer"

20 mg of polyimide powder was put in an NMR (nuclear magnetic resonance) sample tube (NMR sampling tube standard, φ5 (manufactured by Kusano Scientific Co., Ltd.)), and deuterated dimethyl sulfoxide (DMSO-d6, 0.05 mass % TMS (tetramethylsilane) mixed product) (0.53 ml) was added and dissolved completely by applying ultrasound. The solution was subjected to measurement of proton NMR at 500 MHz by an NMR measuring machine (JNW-ECA500) (manufactured by JEOL DATUM Ltd.). The imidization rate was decided by using, as a reference proton, a proton derived from a structure that does not change before and after imidization, and obtained by the following formula by using the peak integration value of this proton and the proton peak integration value derived from the NH group of amide acid appearing in the vicinity of from 9.5 ppm to 10.0 ppm.

$$\text{Imidization rate (\%)} = (1 - \alpha \cdot x/y) \times 100$$

(x is the proton peak integration value derived from the NH group of amide acid, y is the peak integration value of the reference proton, α is the ratio of the number of the reference protons to one NH group proton of the amide acid in the case of a polyamide acid (imidization rate is 0%).)

"Synthesis of Polyimide-Type Polymer"

Synthesis Example 1

E1 (3.50 g, 17.8 mmol), A2 (2.85 g, 7.22 mmol), B2 (1.92 g, 5.42 mmol) and C1 (0.83 g, 5.46 mmol) were mixed in PGME (27.3 g) and reacted at 40° C. for 30 hours, to obtain a polyamic acid solution (1) (resin solid content concentration (Rc): 25 mass %). The number-average molecular weight (Mn) of this polyamic acid was 11,100, and the weight average molecular weight (Mw) was 46,300.

Synthesis Example 2

E2 (1.98 g, 7.91 mmol), A1 (3.05 g, 8.01 mmol), B1 (1.27 g, 4.81 mmol) and C1 (0.49 g, 3.22 mmol) were mixed in NMP (16.7 g) and reacted at 50° C. for 8 hours, and then, E1 (1.55 g, 7.90 mmol) and NMP (8.33 g) were added, followed by the reaction at 40° C. for 8 hours to obtain a polyamic acid solution (2) (Rc: 25 mass %). Mn of the polyamic acid was 21,000, and Mw was 62,700.

Synthesis Example 3

The polyamic acid solution (2) (30.0 g) obtained in Synthesis Example 2, was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (3). The imidization rate of the polyimide was 58%, Mn was 18,800, and Mw was 50,100.

Synthesis Example 4

E2 (1.02 g, 4.08 mmol), A2 (2.28 g, 5.78 mmol), B2 (1.76 g, 4.97 mmol) and C2 (1.18 g, 5.80 mmol) were mixed in NMP (17.3 g) and reacted at 50° C. for 8 hours, and then, E1 (2.40 g, 12.2 mmol) and NMP (8.64 g) were added, followed by the reaction at 40° C. for 8 hours, to obtain a polyamic acid solution (Rc: 25 mass %).

The obtained polyamic acid solution (30.0 g) was diluted to 6 mass % by adding NMP, and then, as imidization catalysts, acetic anhydride (3.85 g) and pyridine (2.45 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (4). The imidization rate of the polyimide was 60%, Mn was 17,200, and Mw was 48,900.

Synthesis Example 5

E2 (2.11 g, 8.43 mmol), A4 (2.10 g, 4.26 mmol), B1 (0.90 g, 3.41 mmol) and C1 (1.43 g, 9.40 mmol) were mixed in NEP (16.4 g) and reacted at 50° C. for 8 hours, and then, E1 (1.65 g, 8.41 mmol) and NEP (8.18 g) were added, followed by the reaction at 40° C. for 8 hours, to obtain a polyamic acid solution (Rc: 25 mass %).

The obtained polyamic acid solution (30.0 g) was diluted to 6 mass % by adding NMP, and then, as imidization catalysts, acetic anhydride (3.85 g) and pyridine (2.40 g) were added, followed by the reaction at 50° C. for 2 hours. The reaction solution was poured into methanol (460 ml), and the obtained precipitate was collected by filtration. The precipitate was washed with methanol and dried at 60° C. under reduced pressure to obtain a polyimide powder (5). The imidization rate of the polyimide was 49%, Mn was 16,500, and Mw was 46,300.

Synthesis Example 6

E3 (3.55 g, 15.8 mmol), A2 (2.85 g, 7.22 mmol), B1 (0.85 g, 3.22 mmol), C2 (0.82 g, 4.03 mmol) and D1 (0.17 g, 1.57 mmol) were mixed in NMP (24.7 g) and reacted at 40° C. for 12 hours, to obtain a polyamic acid solution (Rc: 25 mass %).

The obtained polyamic acid solution (30.0 g) was diluted to 6 mass % by adding NMP, and then, as imidization catalysts, acetic anhydride (3.85 g) and pyridine (2.40 g) were added, followed by the reaction at 50° C. for 4.5 hours. The reaction solution was poured into methanol (460 ml), and the obtained precipitate was collected by filtration. The precipitate was washed with methanol and dried at 60° C. under reduced pressure to obtain a polyimide powder (6). The imidization rate of the polyimide was 64%, Mn was 15,600, and Mw was 46,500.

Synthesis Example 7

E3 (3.55 g, 15.8 mmol), A4 (1.98 g, 4.02 mmol), B2 (2.27 g, 6.40 mmol) and C1 (0.85 g, 5.59 mmol) were mixed in NMP (26.0 g) and reacted at 40° C. for 12 hours, to obtain a polyamic acid solution (Rc: 25 mass %).

The obtained polyamic acid solution (30.0 g) was diluted to 6 mass % by adding NMP, and then, as imidization catalysts, acetic anhydride (3.90 g) and pyridine (2.50 g) were added, followed by the reaction at 50° C. for 2 hours. The reaction solution was poured into methanol (460 ml), and the obtained precipitate was collected by filtration. The precipitate was washed with methanol and dried at 60° C. under reduced pressure to obtain a polyimide powder (7). The imidization rate of the polyimide was 50%, Mn was 18,100, and Mw was 49,900.

Synthesis Example 8

E4 (2.22 g, 7.39 mmol), A3 (2.27 g, 5.25 mmol), B1 (0.40 g, 1.51 mmol), B2 (1.06 g, 2.99 mmol) and C1 (0.80 g, 5.26 mmol) were mixed in NMP (16.4 g) and reacted at 40° C. for 12 hours, and then, E1 (1.45 g, 7.39 mmol) and NMP (8.19 g) were added, followed by the reaction at 40° C. for 8 hours, to obtain a polyamic acid solution (Rc: 25 mass %).

The obtained polyamic acid solution (30.0 g) was diluted to 6 mass % by adding NMP, and then, as imidization catalysts, acetic anhydride (4.50 g) and pyridine (3.10 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (8). The imidization rate of the polyimide was 71%, Mn was 16,500, and Mw was 44,600.

Synthesis Example 9

E5 (1.57 g, 7.40 mmol), A2 (2.96 g, 7.50 mmol), B2 (1.59 g, 4.49 mmol) and C2 (0.61 g, 3.00 mmol) were mixed in PGME (16.4 g) and reacted at 50° C. for 24 hours, and then, E1 (1.45 g, 7.39 mmol) and PGME (8.18 g) were added, followed by the reaction at 40° C. for 8 hours, to obtain a polyamic acid solution (9) (Rc: 25 mass %). Mn of the polyamic acid was 10,300, and Mw was 50,100.

Synthesis Example 10

E2 (1.98 g, 7.91 mmol), A5 (3.02 g, 8.02 mmol), B1 (1.27 g, 4.81 mmol) and C1 (0.49 g, 3.22 mmol) were mixed in NMP (16.6 g) and reacted at 50° C. for 8 hours, and then, E1 (1.55 g, 7.90 mmol) and NMP (8.30 g) were added, followed by the reaction at 40° C. for 8 hours, to obtain a polyamic acid solution (Rc: 25 mass %).

The obtained polyamic acid solution (30.0 g) was diluted to 6 mass % by adding NMP, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C.

under reduced pressure to obtain a polyimide powder (10). The imidization rate of the polyimide was 59%, Mn was 17,200, and Mw was 49,800.

Synthesis Example 11

E2 (3.19 g, 12.7 mmol), C1 (0.79 g, 5.19 mmol) and D1 (2.23 g, 20.6 mmol) were mixed in NMP (17.4 g) and reacted at 50° C. for 8 hours, and then, E1 (2.50 g, 12.7 mmol) and NMP (8.71 g) were added, followed by the reaction at 40° C. for 8 hours, to obtain a polyamic acid solution (11) (Rc: 25 mass %). Mn of the polyamic acid was 24,900, and Mw was 76,600.

Synthesis Example 12

To the polyamic acid solution (11) (30.0 g) obtained in Synthesis Example 11, NMP was added for dilution to 6 mass %, and then, as imidization catalysts, acetic anhydride (3.90 g) and pyridine (2.40 g) were added, followed by the reaction at 50° C. for 4 hours. The reaction solution was poured into methanol (460 ml), and the obtained precipitate was collected by filtration. The precipitate was washed with methanol and dried at 60° C. under reduced pressure to obtain a polyimide powder (12). The imidization rate of the polyimide was 59%, Mn was 22,300, and Mw was 58,600.

The polyimide type polymers obtained in Synthesis Examples are shown in Table 12.

water (10.8 g), and oxalic acid (0.70 g) as a catalyst, was added dropwise at 25° C. over 30 minutes, followed by further stirring at 25° C. for 30 minutes. Thereafter, the reaction solution was heated and refluxed for 30 minutes by using an oil bath, and then, a mixed solution preliminarily prepared by mixing ECS (0.90 g) and a methanol solution (1.20 g) with a F4 content of 92 mass %, was added. After further refluxing for 30 minutes, the reaction mixture was left to cool to obtain a polysiloxane solution (1) (concentration calculated as $SiO_2$ (Sc): 12 mass %).

Synthesis Example 14

In a 200 ml four-necked reaction flask equipped with a thermometer and a reflux tube, EC (25.4 g), F1 (8.20 g), F3 (19.9 g) and F5 (20.0 g) were mixed, to prepare a solution of alkoxysilane monomers. To this solution, a solution previously prepared by mixing EC (12.7 g), water (10.8 g) and oxalic acid (1.10 g) as a catalyst, was added dropwise at 25° C. over 30 minutes, followed by further stirring at 25° C. for 30 minutes. Thereafter, the reaction solution was heated and refluxed for 30 minutes by using an oil bath, and then, a mixed solution preliminarily prepared by mixing EC (0.90 g) and a methanol solution (1.20 g) with a F4 content of 92 mass %, was added. After refluxing for an additional 30 minutes, the reaction mixture was left to cool, to obtain a polysiloxane solution (2) (Sc: 12 mass %).

TABLE 12

| | | | Diamine component | | | | |
|---|---|---|---|---|---|---|---|
| | Polymer | Tetracarboxylic acid component | Specific side chain type diamine compound (1) | Specific side chain type diamine compound (2) | Third diamine compound | Other diamine compound | Imidization rate (%) |
| Synthesis Example 1 | Polyamic acid solution (1) | E1 (3.50 g, 17.8 mmol) | A2 (2.85 g, 7.22 mmol) | B2 (1.92 g, 5.42 mmol) | C1 (0.83 g, 5.46 mmol) | | *1 |
| Synthesis Example 2 | Polyamic acid solution (2) | E1 (1.55 g, 7.90 mmol), E2 (1.98 g, 7.91 mmol) | A1 (3.05 g, 8.01 mmol) | B1 (1.27 g, 4.81 mmol) | C1 (0.49 g, 3.22 mmol) | | *1 |
| Synthesis Example 3 | Polyimide powder (3) | E1 (1.55 g, 7.90 mmol), E2 (1.98 g, 7.91 mmol) | A1 (3.05 g, 8.01 mmol) | B1 (1.27 g, 4.81 mmol) | C1 (0.49 g, 3.22 mmol) | | 58 |
| Synthesis Example 4 | Polyimide powder (4) | E1 (2.40 g, 12.2 mmol), E2 (1.02 g, 4.08 mmol) | A2 (2.28 g, 5.78 mmol) | B2 (1.76 g, 4.97 mmol) | C2 (1.18 g, 5.80 mmol) | | 60 |
| Synthesis Example 5 | Polyimide powder (5) | E1 (1.65 g, 8.41 mmol), E2 (2.11 g, 8.43 mmol) | A4 (2.10 g, 4.26 mmol) | B1 (0.90 g, 3.41 mmol) | C1 (1.43 g, 9.40 mmol) | | 49 |
| Synthesis Example 6 | Polyimide powder (6) | E3 (3.55 g, 15.8 mmol) | A2 (2.85 g, 7.22 mmol) | B1 (0.85 g, 3.22 mmol) | C2 (0.82 g, 4.03 mmol) | D1 (0.17 g, 1.57 mmol) | 64 |
| Synthesis Example 7 | Polyimide powder (7) | E3 (3.55 g, 15.8 mmol) | A4 (1.98 g, 4.02 mmol) | B2 (2.27 g, 6.40 mmol) | C1 (0.85 g, 5.59 mmol) | | 50 |
| Synthesis Example 8 | Polyimide powder (8) | E1 (1.45 g, 7.39 mmol), E4 (2.22 g, 7.39 mmol) | A3 (2.27 g, 5.25 mmol) | B1 (0.40 g, 1.51 mmol), B2 (1.06 g, 2.99 mmol) | C1 (0.80 g, 5.26 mmol) | | 71 |
| Synthesis Example 9 | Polyamic acid solution (9) | E1 (1.45 g, 7.39 mmol), E5 (1.57 g, 7.40 mmol) | A2 (2.96 g, 7.50 mmol) | B2 (1.59 g, 4.49 mmol) | C2 (0.61 g, 3.00 mmol) | | *1 |
| Synthesis Example 10 | Polyimide powder (10) | E1 (1.55 g, 7.90 mmol), E2 (1.98 g, 7.91 mmol) | A5 (3.02 g, 8.02 mmol) | B1 (1.27 g, 4.81 mmol) | C1 (0.49 g, 3.22 mmol) | | 59 |
| Synthesis Example 11 | Polyamic acid solution (11) | E1 (2.50 g, 12.7 mmol), E2 (3.19 g, 12.7 mmol) | | | C1 (0.79 g, 5.19 mmol) | D1 (2.23 g, 20.6 mmol) | *1 |
| Synthesis Example 12 | Polyimide powder (12) | E1 (2.50 g, 12.7 mmol), E2 (3.19 g, 12.7 mmol) | | | C1 (0.79 g, 5.19 mmol) | D1 (2.23 g, 20.6 mmol) | 59 |

*1: Polyamic acid

"Synthesis of Polysiloxane-Type Polymer"

Synthesis Example 13

In a 200 ml four-necked reaction flask equipped with a thermometer and a reflux tube, ECS (28.3 g), F1 (4.10 g), F3 (7.45 g) and F5 (32.5 g) were mixed, to prepare a solution of alkoxysilane monomers. To this solution, a solution which was previously prepared by mixing ECS (14.2 g), Synthesis Example 15

In a 200 ml four-necked reaction flask equipped with a thermometer and a reflux tube, EC (29.2 g), F1 (4.10 g) and F5 (38.8 g) were mixed, to prepare a solution of alkoxysilane monomers. To this solution, a solution which was previously prepared by mixing EC (14.6 g), water (10.8 g) and oxalic acid (0.50 g) as a catalyst, was added dropwise at 25° C. over 30 minutes, followed by further stirring at 25° C. for 30 minutes. Thereafter, the reaction solution was heated and refluxed for 30 minutes by using an oil bath, and then, a mixed solution preliminarily prepared by mixing EC (0.90 g) and a methanol solution (1.20 g) with a F4 content of 92 mass %, was added. After further refluxing for 30 minutes, the reaction mixture was left to cool, to obtain a polysiloxane solution (3) (Sc: 12 mass %).

Synthesis Example 16

In a 200 ml four-necked reaction flask equipped with a thermometer and a reflux tube, ECS (28.3 g), F2 (4.07 g), F3 (7.45 g) and F5 (32.5 g) were mixed, to prepare a solution of alkoxysilane monomers. To this solution, a solution which was previously prepared by mixing ECS (14.2 g), water (10.8 g) and oxalic acid (0.70 g) as a catalyst, was added dropwise at 25° C. over 30 minutes, followed by further stirring at 25° C. for 30 minutes. Thereafter, the reaction solution was heated and refluxed for 30 minutes by using an oil bath, and then, a mixed solution preliminarily prepared by mixing ECS (0.90 g) and a methanol solution (1.20 g) with a F4 content of 92 mass %, was added. After further refluxing for 30 minutes, the reaction mixture was left to cool, to obtain a polysiloxane solution (4) (Sc: 12 mass %).

The polysiloxane-type polymers obtained in the respective Synthesis Examples are shown in Table 13.

Examples 1, 2, 5, 6, 9 and 10, was pressure filtered through a membrane filter with a pore size of 1 µm. The obtained solution was spin-coated on an ITO surface of an ITO electrode-attached glass substrate (length: 100 mm, horizontal: 100 mm, thickness: 0.7 mm) washed with pure water and IPA (isopropyl alcohol) and heat-treated at 100° C. for 5 minutes on a hot plate, and at 210° C. for 30 minutes in a heat circulating clean oven, to obtain an ITO substrate provided with a liquid crystal alignment film having a film thickness of 100 nm. Two such ITO substrates were prepared, and the liquid crystal alignment film surface of one of the substrates was coated with a spacer (particle diameter 6 µm, manufactured by Catalysts & Chemicals Ind. Co., Ltd.). Thereafter, on the liquid crystal alignment film surface of the substrate coated with the spacer, the above-mentioned liquid crystal composition was dropped by an ODF (One Drop Filling) method, and then, the bonding was carried out so that the liquid crystal alignment film surface of the other substrate would face thereto, to obtain a liquid crystal display device before treatment.

This liquid crystal display device before treatment was subjected to irradiation with ultraviolet rays, by using a specific ultraviolet irradiation apparatus (referred to also as a specific ultraviolet irradiation apparatus) having ultraviolet light-emitting diodes as the light source, as shown in FIG. 2. Specifically, the wavelength of the light source of the ultraviolet light emitting diodes was 365 nm, the intensity of

TABLE 13

| | | Alkoxysilane component | | |
| | Resin component | Alkoxysilane monomer represented by the formula [A1] | Alkoxysilane monomer represented by the formula [A2] | Alkoxysilane monomer represented by the formula [A3] |
| --- | --- | --- | --- | --- |
| Synthesis Example 13 | Polysiloxane solution (1) | F1 (4.10 g) | F3 (7.45 g), F4 (1.10 g) | F5 (32.5 g) |
| Synthesis Example 14 | Polysiloxane solution (2) | F1 (8.20 g) | F3 (19.9 g), F4 (1.10 g) | F5 (20.0 g) |
| Synthesis Example 15 | Polysiloxane solution (3) | F1 (4.10 g) | F4 (1.10 g) | F5 (38.8 g) |
| Synthesis Example 16 | Polysiloxane solution (4) | F2 (4.07 g) | F3 (7.45 g), F4 (1.10 g) | F5 (32.5 g) |

"Preparation of Liquid Crystal Composition"

Liquid crystal composition (1): obtained by mixing L1 (2.40 g), R1 (1.20 g), R2 (1.20 g), S1 (0.024 g) and P1 (0.012 g).

Liquid crystal composition (2): obtained by mixing L1 (2.40 g), R1 (1.20 g), R2 (1.20 g), S1 (0.168 g) and P1 (0.012 g).

Liquid crystal composition (3): obtained by mixing L1 (2.40 g), R1 (0.60 g), R2 (0.60 g), R3 (0.60 g), R4 (0.60 g), S1 (0.168 g) and P1 (0.012 g).

Liquid crystal composition (4): obtained by mixing L1 (2.40 g), R1 (0.60 g), R2 (0.60 g), R3 (0.60 g), R4 (0.60 g), S2 (0.048 g) and P1 (0.012 g).

Liquid crystal composition (5): obtained by mixing L1 (2.40 g), R1 (0.60 g), R2 (0.60 g), R3 (0.60 g), R4 (0.60 g), S1 (0.168 g), P1 (0.012 g) and X1 (0.012 g).

Liquid crystal composition (6): obtained by mixing L1 (2.40 g), R1 (1.20 g), R2 (1.20 g) and P1 (0.012 g).

"Preparation of Liquid Crystal Display Device (Glass Substrate)"

The liquid crystal alignment treating agent obtained in each of Examples 4, 12, 13, 18, 19 and 22, and Comparative ultraviolet rays was 10 mW/cm$^2$, the irradiation time was 60 seconds, and further, the temperature of the substrate surface was controlled to be 20° C.

Further, in Comparative Examples 5 and 9, irradiation with ultraviolet rays was applied to the liquid crystal display device before treatment by using a ultraviolet irradiation apparatus having a metal halide lamp as the light source. Specifically, with the intensity of the ultraviolet rays being 30 mW/cm$^2$, ultraviolet rays were irradiated through a cut filter that cut off wavelengths of 350 nm or less, and the irradiation time was set to be 30 seconds. At that time, the temperature of the substrate surface was not controlled, but it was confirmed that the temperature rose to about 50° C.

Thus, a liquid crystal display device (reverse type device) (glass substrate) was obtained. By using this liquid crystal display device, evaluation of the liquid crystal alignment property was carried out. For the liquid crystal alignment property, the present device was observed by a polarizing microscope (ECLIPSE E600WPOL, manufactured by Nikon Corporation) to confirm whether or not the liquid crystal was aligned vertically. In the liquid crystal display devices in Examples, the liquid crystal was aligned vertically. On the other hand, in the liquid crystal display devices in Comparative Examples 1 and 2, the liquid crystal was not aligned vertically.

"Preparation of Liquid Crystal Display Device (Plastic Substrate)"

The liquid crystal alignment treating agent in each of Examples 1 to 3, 5 to 11, 14 to 17, 20 and 21 and Comparative Example 3, 4, 7 and 8, was pressure filtered through a membrane filter with a pore size of 1 μm. The obtained solution was applied by a bar coater on an ITO surface of an ITO electrode-attached PET (polyethylene terephthalate) substrate (length: 150 mm, horizontal: 150 mm, thickness: 0.2 mm) washed with pure water, and heat-treated at 100° C. for 5 minutes on a hot plate and at 120° C. for 2 minutes in a heat circulating clean oven, to obtain an ITO substrate provided with a liquid crystal alignment film having a film thickness of 100 nm. Two such ITO substrates were prepared, and the liquid crystal alignment film surface of one of the substrates was coated with a spacer (particle diameter 6 μm, manufactured by Catalysts & Chemicals Ind. Co., Ltd.). Thereafter, on the liquid crystal alignment film surface of the substrate coated with the spacer, the liquid crystal composition was dropped by an ODF method, and then, bonding was carried out so that the liquid crystal alignment film surface of the other substrate would face thereto, to obtain a liquid crystal display device before treatment.

This liquid crystal display device before treatment was subjected to irradiation with ultraviolet rays, by using a specific ultraviolet irradiation apparatus having ultraviolet light-emitting diodes as the light source, as shown in FIG. 2. Specifically, the wavelength of the light source of the ultraviolet light emitting diodes was 365 nm, the intensity of ultraviolet rays was 10 mW/cm$^2$, the irradiation time was 60 seconds, and further, the temperature of the substrate surface was controlled to be 20° C.

Further, in Comparative Example 7, irradiation with ultraviolet rays was applied to the liquid crystal display device before treatment by using a ultraviolet irradiation apparatus having a metal halide lamp as the light source. Specifically, with the intensity of the ultraviolet rays being 30 mW/cm$^2$, ultraviolet rays were irradiated through a cut filter that cut off wavelengths of 350 nm or less, and the irradiation time was set to be 30 seconds. At that time, the temperature of the substrate surface was not controlled, but it was confirmed that the temperature rose to about 50° C.

Thus, a liquid crystal display device (reverse type device) (plastic substrate) was obtained.

By using this liquid crystal display device, evaluation of the liquid crystal alignment property was carried out. For the liquid crystal alignment property, the present device was observed by a polarizing microscope (ECLIPSE E600WPOL) (manufactured by Nikon Corporation) to confirm whether or not the liquid crystal was aligned vertically. In the liquid crystal display devices in Examples, the liquid crystal was aligned vertically. On the other hand, in the liquid crystal display devices in Comparative Examples 3 and 4, the liquid crystal was not aligned vertically.

"Evaluation of Optical Properties (Transparency and Scattering Properties)"

Using the liquid crystal display devices (glass substrate and plastic substrate) obtained by the above-described methods, evaluation of the optical properties (transparency and scattering properties) was carried out.

Evaluation of transparency when no voltage was applied, was conducted by measuring the transmittance of the liquid crystal display device (glass substrate, plastic substrate) in a state where no voltage was applied. Specifically, using the UV-3600 (manufactured by Shimadzu Corporation) as the measuring device, the measurement was conducted under conditions at a temperature of 25° C. and a scanning wavelength of from 300 to 800 nm. At that time, in the case of a liquid crystal display device (glass substrate), the above mentioned ITO electrode-attached glass substrate was used as a reference, and in the case of a liquid crystal display device (plastic substrate), the above mentioned ITO electrode-attached PET substrate was used as a reference. The evaluation was based on the transmittance at a wavelength of 450 nm, and one having a higher transmittance was regarded to be better in transparency.

Further, evaluation of the transmittance after storage for 36 hours in a constant temperature and humidity tank under a humidity of 90% RH at temperature of 80° C. was also carried out. One with a lower reduction rate in transmittance after storage in the constant temperature and humidity tank, relative to the transmittance immediately after the preparation of the liquid crystal display device (initial value), was regarded to be better in this evaluation.

Further, evaluation of the transmittance after irradiation with ultraviolet rays of 5 J/cm$^2$ as calculated at 365 nm, was also carried out by using a tabletop UV curing device (HCT3B28HEX-1, manufactured by Senraito Co.).

Further, in Examples 1 to 3, 5 to 8, 14 to 19 and 22, in addition to the standard tests as described above, evaluation of the transmittance after storage for 72 hours in a constant temperature and humidity tank at a temperature of 80° C. under a humidity of 90% RH, was also carried out as an emphasized test. Here, the evaluation method was under the same conditions as described above.

Evaluation of the scattering properties when a voltage was applied, was carried out by applying 30V by AC driving to the liquid crystal display device (glass substrate), and visually observing the alignment state of the liquid crystal. A case where the liquid crystal display device became cloudy, i.e. a case where scattering properties were obtained, was regarded as good in this evaluation (shown as "good" in the table).

Further, confirmation of the alignment state of the liquid crystal after storage for 36 hours in a constant temperature and humidity tank at a temperature of 80° C. under a humidity of 90% RH was also carried out.

Further, confirmation of the alignment state of the liquid crystal after irradiation with ultraviolet rays of 5 J/cm$^2$ as calculated at 365 nm was also carried out by using a tabletop UV curing device (HCT3B28HEX-1, manufactured by Senraito Co.).

The evaluation results of the transmittance (%) and scattering properties immediately after preparation of the liquid crystal display device (initial), after storage in the constant temperature and humidity tank (constant temperature and humidity) and after irradiation with ultraviolet rays (ultraviolet rays) are shown as summarized in Tables 18 to 20.

"Evaluation of Adhesion Between Liquid Crystal Layer and Liquid Crystal Alignment Film"

Using the liquid crystal display devices (glass substrate and plastic substrate) obtained by the above mentioned methods, evaluation of adhesion between the liquid crystal layer and the liquid crystal alignment film was carried out.

A liquid crystal display device (glass substrate, plastic substrate) was stored in a constant temperature and humidity tank at a temperature of 80° C. under a humidity of 90% RH for 36 hours, whereby the presence or absence of air bubbles in the liquid crystal display device and peeling of the device, were confirmed. Specifically, a case where no air bubbles were observed in the device, and peeling of the device (a state in which the liquid crystal layer and the liquid crystal alignment film are peeled) did not occur, was regarded as good in this evaluation (shown as "good" in the table).

Further, the presence or absence of air bubbles in the liquid crystal display device and peeling of the device, were confirmed also after the liquid crystal display device (glass substrate, plastic substrate) was subjected to irradiation with ultraviolet rays of 5 J/cm$^2$ as calculated at 365 nm, by using a tabletop UV curing device (HCT3B28HEX-1) (manufactured by Senraito Co.).

Further, in Examples 1 to 3, 5 to 8, 14 to 19 and 22, in addition to the standard tests as described above, as an emphasized test, evaluation of adhesion after storage for 72 hours in a constant temperature and humidity tank at a temperature of 80° C. under a humidity of 90% RH was also carried out. Here, the evaluation method was under the same conditions as described above.

The adhesion results (adhesion) between the liquid crystal layer and the liquid crystal alignment film, after storage in the constant temperature and humidity tank (constant temperature and humidity) and after irradiation with ultraviolet rays (ultraviolet rays), are shown in Tables 21 to 23.

Example 1

To the polyamic acid solution (1) (5.50 g) obtained in Synthesis Example 1, PGME (20.7 g) and γ-BL (4.38 g) were added and stirred at 25° C. for 4 hours, to obtain a liquid crystal alignment treating agent (1). This liquid crystal alignment treating agent was confirmed to be a uniform solution, in which abnormality such as turbidity or precipitation was not observed. By using the liquid crystal alignment treating agent (1) and the liquid crystal composition (2), a liquid crystal display device was prepared and evaluated.

Example 2

To the polyamic acid solution (1) (5.50 g) obtained in Synthesis Example 1, N1 (0.069 g), M1 (0.207 g), K1 (0.097 g), PGME (20.7 g) and γ-BL (4.38 g) were added and stirred at 25° C. for 6 hours, to obtain a liquid crystal alignment treating agent (2). This liquid crystal alignment treating agent was confirmed to be a uniform solution, wherein abnormality such as turbidity or precipitation was not observed. By using the liquid crystal alignment treating agent (2) and the liquid crystal composition (2), a liquid crystal display device was prepared and evaluated.

Example 3

By using the liquid crystal alignment treating agent (2) in Example 2 and the liquid crystal composition (3), a liquid crystal display device was prepared and evaluated.

Example 4

To the polyamic acid solution (2) (5.50 g) obtained in Synthesis Example 2, NMP (11.9 g) and BCS (13.1 g) were added and stirred at 25° C. for 4 hours, to obtain a liquid crystal alignment treating agent (3). This liquid crystal alignment treating agent was confirmed to be a uniform solution, wherein abnormality such as turbidity or precipitation was not observed. By using this liquid crystal alignment treating agent (3) and the liquid crystal composition (1), a liquid crystal display device was prepared and evaluated.

Example 5

To the polyimide powder (3) (1.50 g) obtained in Synthesis Example 3, γ-BL (3.18 g) and PGME (28.7 g) were added and stirred at 60° C. for 24 hours, to obtain a liquid crystal alignment treating agent (4). This liquid crystal alignment treating agent was confirmed to be a uniform solution, wherein abnormality such as turbidity or precipitation was not observed. By using this liquid crystal alignment treating agent (4) and the liquid crystal composition (1), a liquid crystal display device was prepared and evaluated.

Example 6

To the polyimide powder (4) (1.50 g) obtained in Synthesis Example 4, γ-BL (6.37 g) and PGME (25.5 g) were added and stirred at 60° C. for 24 hours, to obtain a liquid crystal alignment treating agent (5). This liquid crystal alignment treating agent was confirmed to be a uniform solution, wherein abnormality such as turbidity or precipitation was not observed. By using this liquid crystal alignment treating agent (5) and the liquid crystal composition (1), a liquid crystal display device was prepared and evaluated.

Example 7

By using the liquid crystal alignment treating agent (5) in Example 6 and the liquid crystal composition (2), a liquid crystal display device was prepared and evaluated.

Example 8

By using the liquid crystal alignment treating agent (5) in Example 6 and the liquid crystal composition (3), a liquid crystal display device was prepared and evaluated.

Example 9

To the polyimide powder (4) (1.50 g) obtained in Synthesis Example 4, γ-BL (6.37 g) and PGME (25.5 g) were added and stirred at 60° C. for 24 hours. Thereafter, N1 (0.105 g), M1 (0.45 g) and K1 (0.075 g) were added, and stirred at 25° C. for 4 hours, to obtain a liquid crystal alignment treating agent (6). This liquid crystal alignment treating agent was confirmed to be a uniform solution, wherein abnormality such as turbidity or precipitation was not observed. By using this liquid crystal alignment treating agent (6) and the liquid crystal composition (5), a liquid crystal display device was prepared and evaluated.

Example 10

To the polyimide powder (5) (1.55 g) obtained in Synthesis Example 5, γ-BL (8.22 g) and PGME (24.7 g) were added and stirred at 60° C. for 24 hours. Thereafter, N1 (0.047 g), M1 (0.155 g) and K1 (0.078 g) were added and stirred at 25° C. for 4 hours, to obtain a liquid crystal alignment treating agent (7). This liquid crystal alignment treating agent was confirmed to be a uniform solution, wherein abnormality such as turbidity or precipitation was not observed. By using this liquid crystal alignment treating agent (7) and the liquid crystal composition (4), a liquid crystal display device was prepared and evaluated.

Example 11

To the polyimide powder (6) (1.50 g) obtained in Synthesis Example 6, γ-BL (3.18 g) and PGME (28.7 g) were added and stirred at 60° C. for 24 hours. Thereafter, N1 (0.075 g) and K1 (0.105 g) were added and stirred at 25° C. for 4 hours, to obtain a liquid crystal alignment treating agent (8). This liquid crystal alignment treating agent was confirmed to be a uniform solution, wherein abnormality such as turbidity or precipitation was not observed. By using this liquid crystal alignment treating agent (8) and the liquid crystal composition (3), a liquid crystal display device was prepared and evaluated.

Example 12

To the polyimide powder (7) (1.50 g) obtained in Synthesis Example 7, γ-BL (12.7 g), BCS (9.55 g) and PB (9.55 g) were added and stirred at 60° C. for 24 hours. Then, N1 (0.105 g), M2 (0.075 g) and K1 (0.075 g) were added and stirred at 25° C. for 4 hours, to obtain a liquid crystal alignment treating agent (9). This liquid crystal alignment treating agent was confirmed to be a uniform solution, wherein abnormality such as turbidity or precipitation was not observed. By using this liquid crystal alignment treating agent (9) and the liquid crystal composition (5), a liquid crystal display device was prepared and evaluated.

Example 13

To the polyimide powder (8) (1.50 g) obtained in Synthesis Example 8, NEP (15.9 g), BCS (6.37 g) and PB (9.55 g) were added and stirred at 60° C. for 24 hours. Thereafter, N1 (0.075 g) and K1 (0.045 g) were added and stirred at 25° C. for 4 hours, to obtain a liquid crystal alignment treating agent (10). This liquid crystal alignment treating agent was confirmed to be a uniform solution, wherein abnormality such as turbidity or precipitation was not observed. By using this liquid crystal alignment treating agent (10) and the liquid crystal composition (4), a liquid crystal display device was prepared and evaluated.

Example 14

To the polyamic acid solution (9) (5.50 g) obtained in Synthesis Example 9, PGME (22.1 g) and γ-BL (2.92 g) were added and stirred at 25° C. for 4 hours, to obtain a liquid crystal alignment treating agent (11). This liquid crystal alignment treating agent was confirmed to be a uniform solution, wherein abnormality such as turbidity or precipitation was not observed. By using this liquid crystal alignment treating agent (11) and the liquid crystal composition (2), a liquid crystal display device was prepared and evaluated.

Example 15

By using the liquid crystal alignment treating agent (11) in Example 14 and the liquid crystal composition (3), a liquid crystal display device was prepared and evaluated.

Example 16

By using the liquid crystal alignment treating agent (11) in Example 14 and the liquid crystal composition (5), a liquid crystal display device was prepared and evaluated.

Example 17

To the polyimide powder (10) (1.50 g) obtained in Synthesis Example 10, γ-BL (3.18 g) and γ-BL (28.7 g) were added and stirred at 60° C. for 24 hours, to obtain a liquid crystal alignment treating agent (12). This liquid crystal alignment treating agent was confirmed to be a uniform solution, wherein abnormality such as turbidity or precipitation was not observed. By using this liquid crystal alignment treating agent (12) and the liquid crystal composition (1), a liquid crystal display device was prepared and evaluated.

Example 18

To the polysiloxane solution (1) (12.5 g) obtained in Synthesis Example 13, ECS (1.73 g), BCS (9.55 g) and PB (9.55 g) were added and stirred at 25° C. for 4 hours, to obtain a liquid crystal alignment treating agent (13). This liquid crystal alignment treating agent was confirmed to be a uniform solution, wherein abnormality such as turbidity or precipitation was not observed. By using this liquid crystal alignment treating agent (13) and the liquid crystal composition (2), a liquid crystal display device was prepared and evaluated.

Example 19

By using the liquid crystal alignment treating agent (13) in Example 18 and the liquid crystal composition (3), a liquid crystal display device was prepared and evaluated.

Example 20

To the polysiloxane solution (2) (12.0 g) obtained in Synthesis Example 14, N1 (0.072 g), M1 (0.288 g), EC (0.14 g), PB (10.7 g) and PGME (9.17 g) were added and stirred at 25° C. for 4 hours, to obtain a liquid crystal alignment treating agent (14). This liquid crystal alignment treating agent was confirmed to be a uniform solution, wherein abnormality such as turbidity or precipitation was not observed. By using this liquid crystal alignment treating agent (14) and the liquid crystal composition (5), a liquid crystal display device was prepared and evaluated.

Example 21

To the polysiloxane solution (3) (12.0 g) obtained in Synthesis Example 15, EC (0.14 g), PB (10.7 g) and PGME (9.17 g) were added and stirred at 25° C. for 4 hours, to obtain a liquid crystal alignment treating agent (15). This liquid crystal alignment treating agent was confirmed to be a uniform solution, wherein abnormality such as turbidity or precipitation was not observed. By using this liquid crystal alignment treating agent (15) and the liquid crystal composition (4), a liquid crystal display device was prepared and evaluated.

Example 22

To the polysiloxane solution (4) (12.0 g) obtained in Synthesis Example 16, ECS (1.66 g), BCS (9.17 g) and PB (9.17 g) were added and stirred at 25° C. for 4 hours, to obtain a liquid crystal alignment treating agent (16). This liquid crystal alignment treating agent was confirmed to be a uniform solution, wherein abnormality such as turbidity or precipitation was not observed. By using this liquid crystal alignment treating agent (16) and the liquid crystal composition (2), a liquid crystal display device was prepared and evaluated.

Comparative Example 1

To the polyamic acid solution (11) (5.50 g) obtained in Synthesis Example 11, NMP (11.9 g) and BCS (13.1 g) were added and stirred at 25° C. for 4 hours, to obtain a liquid crystal alignment treating agent (17). This liquid crystal alignment treating agent was confirmed to be a uniform solution, wherein abnormality such as turbidity or precipitation was not observed. By using this liquid crystal alignment treating agent (17) and the liquid crystal composition (1), a liquid crystal display device was prepared and evaluated.

Comparative Example 2

By using the liquid crystal alignment treating agent (17) in Comparative Example 1 and the liquid crystal composition (6), a liquid crystal display device was prepared and evaluated.

Comparative Example 3

To the polyimide powder (12) (1.50 g) obtained in Synthesis Example 12, γ-BL (3.18 g) and PGME (28.7 g) were added and stirred at 60° C. for 24 hours, to obtain a liquid crystal alignment treating agent (18). This liquid crystal alignment treating agent was confirmed to be a uniform solution, wherein abnormality such as turbidity or precipitation was not observed. By using this liquid crystal alignment treating agent (18) and the liquid crystal composition (1), a liquid crystal display device was prepared and evaluated.

Comparative Example 4

By using the liquid crystal alignment treating agent (18) in Comparative Example 3 and the liquid crystal composition (6), a liquid crystal display device was prepared and evaluated.

Comparative Example 5

By using the liquid crystal alignment treating agent (3) in Example 4 and the liquid crystal composition (1), a liquid crystal display device was prepared and evaluated. Here, as the ultraviolet irradiation apparatus, the above-mentioned metal halide lamp type ultraviolet irradiation apparatus was used.

Comparative Example 6

By using the liquid crystal alignment treating agent (3) in Example 4 and the liquid crystal composition (6), a liquid crystal display device was prepared and evaluated.

Comparative Example 7

By using the liquid crystal alignment treating agent (4) in Example 5 and the liquid crystal composition (1), a liquid crystal display device was prepared and evaluated. Here, as the ultraviolet irradiation apparatus, the above-mentioned metal halide lamp type ultraviolet irradiation apparatus was used.

Comparative Example 8

By using the liquid crystal alignment treating agent (4) in Example 5 and the liquid crystal composition (6), a liquid crystal display device was prepared and evaluated.

Comparative Example 9

By using the liquid crystal alignment treating agent (13) in Example 18 and the liquid crystal composition (2), a liquid crystal display device was prepared and evaluated. Here, as the ultraviolet irradiation apparatus, the above-mentioned metal halide lamp type ultraviolet irradiation apparatus was used.

Comparative Example 10

By using the liquid crystal alignment treating agent (13) in Example 18 and the liquid crystal composition (6), a liquid crystal display device was prepared and evaluated.

TABLE 14

|  | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 1 | Liquid crystal alignment treating agent (1) | Polyamic acid solution (1) | — | — | — | — |
| Example 2 | Liquid crystal alignment treating agent (2) | Polyamic acid solution (1) | — | N1 (5) | M1 (15) | K1 (7) |
| Example 3 | Liquid crystal alignment treating agent (2) | Polyamic acid solution (1) | — | N1 (5) | M1 (15) | K1 (7) |
| Example 4 | Liquid crystal alignment treating agent (3) | Polyamic acid solution (2) | — | — | — | — |
| Example 5 | Liquid crystal alignment treating agent (4) | Polyimide powder (3) | — | — | — | — |
| Example 6 | Liquid crystal alignment treating agent (5) | Polyimide powder (4) | — | — | — | — |
| Example 7 | Liquid crystal alignment treating agent (5) | Polyimide powder (4) | — | — | — | — |
| Example 8 | Liquid crystal alignment treating agent (5) | Polyimide powder (4) | — | — | — | — |
| Example 9 | Liquid crystal alignment treating agent (6) | Polyimide powder (4) | — | N1 (7) | M1 (30) | K1 (5) |

TABLE 14-continued

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 10 | Liquid crystal alignment treating agent (7) | Polyimide powder (5) | — | N1 (3) | M1 (10) | K1 (5) |

TABLE 15

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 11 | Liquid crystal alignment treating agent (8) | Polyimide powder (6) | — | N1 (5) | — | K1 (7) |
| Example 12 | Liquid crystal alignment treating agent (9) | Polyimide powder (7) | — | N1 (7) | M2 (5) | K1 (5) |
| Example 13 | Liquid crystal alignment treating agent (10) | Polyimide powder (8) | — | N1 (5) | — | K1 (3) |
| Example 14 | Liquid crystal alignment treating agent (11) | Polyamic acid solution (9) | — | N1 (5) | M2 (10) | K1 (7) |
| Example 15 | Liquid crystal alignment treating agent (11) | Polyamic acid solution (9) | — | N1 (5) | M2 (10) | K1 (7) |
| Example 16 | Liquid crystal alignment treating agent (11) | Polyamic acid solution (9) | — | N1 (5) | M2 (10) | K1 (7) |
| Example 17 | Liquid crystal alignment treating agent (12) | Polyimide powder (10) | — | — | — | — |

TABLE 16

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Example 18 | Liquid crystal alignment treating agent (13) | Polysiloxane solution (1) | — | — | — | — |
| Example 19 | Liquid crystal alignment treating agent (13) | Polysiloxane solution (1) | — | — | — | — |
| Example 20 | Liquid crystal alignment treating agent (14) | Polysiloxane solution (2) | — | N1 (5) | M1 (20) | — |
| Example 21 | Liquid crystal alignment treating agent (15) | Polysiloxane solution (3) | — | — | — | — |
| Example 22 | Liquid crystal alignment treating agent (16) | Polysiloxane solution (4) | — | — | — | — |

TABLE 17

| | Liquid crystal alignment treating agent | Specific polymer | Polymer | Specific generating agent (*1) | Specific adhesion compound (*2) | Specific crosslinkable compound (*3) |
|---|---|---|---|---|---|---|
| Comparative Example 1 | Liquid crystal alignment treating agent (17) | — | Polyamic acid solution (11) | — | — | — |
| Comparative Example 2 | Liquid crystal alignment treating agent (17) | — | Polyamic acid solution (11) | — | — | — |
| Comparative Example 3 | Liquid crystal alignment treating agent (18) | — | Polyimide powder (12) | — | — | — |
| Comparative Example 4 | Liquid crystal alignment treating agent (18) | — | Polyimide powder (12) | — | — | — |
| Comparative Example 5 | Liquid crystal alignment treating agent (3) | Polyamic acid solution (2) | — | — | — | — |
| Comparative Example 6 | Liquid crystal alignment treating agent (3) | Polyamic acid solution (2) | — | — | — | — |
| Comparative Example 7 | Liquid crystal alignment treating agent (4) | Polyimide powder (3) | — | — | — | — |
| Comparative Example 8 | Liquid crystal alignment treating agent (4) | Polyimide powder (3) | — | — | — | — |
| Comparative Example 9 | Liquid crystal alignment treating agent (13) | Polysiloxane solution (1) | — | — | — | — |

TABLE 17-continued

|  | Liquid crystal alignment treating agent | Specific polymer | Polymer | Specific generating agent (*1) | Specific adhesion compound (*2) | Specific crosslinkable compound (*3) |
|---|---|---|---|---|---|---|
| Comparative Example 10 | Liquid crystal alignment treating agent (13) | Polysiloxane solution (1) | — | — | — | — |

(*1): shows the content (parts by mass) of the specific generating agent to 100 parts by mass of all polymers.
(*2): shows the content (parts by mass) of the specific adhesion compound to 100 parts by mass of all polymers.
(*3): shows the content (parts by mass) of the specific crosslinkable compound to 100 arts by mass of all polymers.

TABLE 18

|  |  |  | Optical properties | | | | | |
|---|---|---|---|---|---|---|---|---|
|  |  |  | Transmittance (%) | | | Scattering properties | | |
|  |  |  | Constant temperature and humidity | | | | | |
|  | Liquid crystal alignment treating agent | Liquid crystal composition | Initial | (standard test/emphasized test) | Ultraviolet rays | Initial | Constant temperature and humidity | Ultraviolet rays |
| Example 1 | Liquid crystal alignment treating agent (1) | Liquid crystal composition (2) | 85.3 | 76.3/72.8 | 83.0 | Good | Good | Good |
| Example 2 | Liquid crystal alignment treating agent (2) | Liquid crystal composition (2) | 85.6 | 81.8/80.9 | 83.9 | Good | Good | Good |
| Example 3 | Liquid crystal alignment treating agent (2) | Liquid crystal composition (3) | 88.3 | 85.1/84.0 | 87.1 | Good | Good | Good |
| Example 4 | Liquid crystal alignment treating agent (3) | Liquid crystal composition (1) | 84.7 | 76.0/— | 82.4 | Good | Good | Good |
| Example 5 | Liquid crystal alignment treating agent (4) | Liquid crystal composition (1) | 84.9 | 76.1/72.7 | 82.5 | Good | Good | Good |
| Example 6 | Liquid crystal alignment treating agent (5) | Liquid crystal composition (1) | 85.2 | 76.2/72.9 | 82.8 | Good | Good | Good |
| Example 7 | Liquid crystal alignment treating agent (5) | Liquid crystal composition (2) | 88.3 | 79.0/75.3 | 85.7 | Good | Good | Good |
| Example 8 | Liquid crystal alignment treating agent (5) | Liquid crystal composition (3) | 88.5 | 79.3/76.3 | 86.6 | Good | Good | Good |
| Example 9 | Liquid crystal alignment treating agent (6) | Liquid crystal composition (5) | 88.7 | 85.5/— | 87.5 | Good | Good | Good |
| Example 10 | Liquid crystal alignment treating agent (7) | Liquid crystal composition (4) | 88.3 | 85.1/— | 87.0 | Good | Good | Good |
| Example 11 | Liquid crystal alignment treating agent (8) | Liquid crystal composition (3) | 88.4 | 83.2/— | 86.5 | Good | Good | Good |

TABLE 19

|  |  |  | Optical properties | | | | | |
|---|---|---|---|---|---|---|---|---|
|  |  |  | Transmittance (%) | | | Scattering properties | | |
|  |  |  | Constant temperature and humidity | | | | | |
|  | Liquid crystal alignment treating agent | Liquid crystal composition | Initial | (standard test/emphasized test) | Ultraviolet rays | Initial | Constant temperature and humidity | Ultraviolet rays |
| Example 12 | Liquid crystal alignment treating agent (9) | Liquid crystal composition (5) | 88.7 | 85.4/— | 87.3 | Good | Good | Good |
| Example 13 | Liquid crystal alignment treating agent (10) | Liquid crystal composition (4) | 88.2 | 83.1/— | 86.8 | Good | Good | Good |
| Example 14 | Liquid crystal alignment treating agent (11) | Liquid crystal composition (2) | 85.7 | 82.0/81.0 | 84.0 | Good | Good | Good |
| Example 15 | Liquid crystal alignment treating agent (11) | Liquid crystal composition (3) | 88.4 | 85.5/84.2 | 87.3 | Good | Good | Good |

TABLE 19-continued

| | Liquid crystal alignment treating agent | Liquid crystal composition | Optical properties ||||||
|---|---|---|---|---|---|---|---|---|
| | | | Transmittance (%) |||| Scattering properties ||
| | | | Initial | Constant temperature and humidity (standard test/emphasized test) | Ultraviolet rays | Initial | Constant temperature and humidity | Ultraviolet rays |
| Example 16 | Liquid crystal alignment treating agent (11) | Liquid crystal composition (5) | 88.7 | 85.8/84.4 | 87.4 | Good | Good | Good |
| Example 17 | Liquid crystal alignment treating agent (12) | Liquid crystal composition (1) | 83.0 | 72.5/69.8 | 78.8 | Good | Good | Good |
| Example 18 | Liquid crystal alignment treating agent (13) | Liquid crystal composition (2) | 86.1 | 77.4/73.8 | 83.9 | Good | Good | Good |
| Example 19 | Liquid crystal alignment treating agent (13) | Liquid crystal composition (3) | 88.8 | 80.5/76.8 | 87.2 | Good | Good | Good |
| Example 20 | Liquid crystal alignment treating agent (14) | Liquid crystal composition (5) | 89.0 | 80.8/— | 87.4 | Good | Good | Good |
| Example 21 | Liquid crystal alignment treating agent (15) | Liquid crystal composition (4) | 88.0 | 79.7/— | 86.5 | Good | Good | Good |
| Example 22 | Liquid crystal alignment treating agent (16) | Liquid crystal composition (2) | 84.1 | 76.5/73.7 | 83.2 | Good | Good | Good |

TABLE 20

| | Liquid crystal alignment treating agent | Liquid crystal composition | Optical properties ||||||
|---|---|---|---|---|---|---|---|---|
| | | | Transmittance (%) |||| Scattering properties ||
| | | | Initial | Constant temperature and humidity (standard test) | Ultraviolet rays | Initial | Constant temperature and humidity | Ultraviolet rays |
| Comparative Example 1 | Liquid crystal alignment treating agent (17) | Liquid crystal composition (1) | *1 | *1 | *1 | *1 | *1 | *1 |
| Comparative Example 2 | Liquid crystal alignment treating agent (17) | Liquid crystal composition (6) | *1 | *1 | *1 | *1 | *1 | *1 |
| Comparative Example 3 | Liquid crystal alignment treating agent (18) | Liquid crystal composition (1) | *1 | *1 | *1 | *1 | *1 | *1 |
| Comparative Example 4 | Liquid crystal alignment treating agent (18) | Liquid crystal composition (6) | *1 | *1 | *1 | *1 | *1 | *1 |
| Comparative Example 5 | Liquid crystal alignment treating agent (3) | Liquid crystal composition (1) | 69.5 | 59.8 | 66.9 | Good | *4 | *3 |
| Comparative Example 6 | Liquid crystal alignment treating agent (3) | Liquid crystal composition (6) | 67.2 | 59.9 | 65.0 | Good | *3 | *2 |
| Comparative Example 7 | Liquid crystal alignment treating agent (4) | Liquid crystal composition (1) | 69.7 | 60.0 | 67.3 | Good | *4 | *3 |
| Comparative Example 8 | Liquid crystal alignment treating agent (4) | Liquid crystal composition (6) | 67.6 | 60.5 | 65.5 | Good | *3 | *2 |
| Comparative Example 9 | Liquid crystal alignment treating agent (13) | Liquid crystal composition (1) | 70.9 | 61.1 | 68.1 | Good | *4 | *3 |
| Comparative Example 10 | Liquid crystal alignment treating agent (13) | Liquid crystal composition (6) | 65.3 | 58.3 | 63.2 | Good | *3 | *2 |

*1: The liquid crystal was not aligned vertically.

*2: At very limited locations in the device, disturbance in the liquid crystal alignment was observed.

*3: At several locations in the device, disturbance in the liquid crystal alignment was observed (the number of locations was larger than *2).

*4: In the device, disturbance in the liquid crystal alignment was observed (the number of locations was larger than *3).

TABLE 21

| | Liquid crystal alignment treating agent | Liquid crystal composition | Adhesion Constant temperature and humidity (standard test/ emphasized test) | Ultra-violet rays |
|---|---|---|---|---|
| Example 1 | Liquid crystal alignment treating agent (1) | Liquid crystal composition (2) | Good/*3 | Good |
| Example 2 | Liquid crystal alignment treating agent (2) | Liquid crystal composition (2) | Good/*2 | Good |
| Example 3 | Liquid crystal alignment treating agent (2) | Liquid crystal composition (3) | Good/Good | Good |
| Example 4 | Liquid crystal alignment treating agent (3) | Liquid crystal composition (1) | Good/— | Good |
| Example 5 | Liquid crystal alignment treating agent (4) | Liquid crystal composition (1) | Good/*3 | Good |
| Example 6 | Liquid crystal alignment treating agent (5) | Liquid crystal composition (1) | Good/*3 | Good |
| Example 7 | Liquid crystal alignment treating agent (5) | Liquid crystal composition (2) | Good/*3 | Good |
| Example 8 | Liquid crystal alignment treating agent (5) | Liquid crystal composition (3) | Good/*2 | Good |
| Example 9 | Liquid crystal alignment treating agent (6) | Liquid crystal composition (5) | Good/— | Good |
| Example 10 | Liquid crystal alignment treating agent (7) | Liquid crystal composition (4) | Good/— | Good |
| Example 11 | Liquid crystal alignment treating agent (8) | Liquid crystal composition (3) | Good/— | Good |

TABLE 22

| | Liquid crystal alignment treating agent | Liquid crystal composition | Adhesion Constant temperature and humidity (standard test/ emphasized test) | Ultra-violet rays |
|---|---|---|---|---|
| Example 12 | Liquid crystal alignment treating agent (9) | Liquid crystal composition (5) | Good/— | Good |
| Example 13 | Liquid crystal alignment treating agent (10) | Liquid crystal composition (4) | Good/— | Good |
| Example 14 | Liquid crystal alignment treating agent (11) | Liquid crystal composition (2) | Good/*2 | Good |
| Example 15 | Liquid crystal alignment treating agent (11) | Liquid crystal composition (3) | Good/Good | Good |
| Example 16 | Liquid crystal alignment treating agent (11) | Liquid crystal composition (5) | Good/Good | Good |
| Example 17 | Liquid crystal alignment treating agent (12) | Liquid crystal composition (1) | Good/*4 | Good |
| Example 18 | Liquid crystal alignment treating agent (13) | Liquid crystal composition (2) | Good/*3 | Good |
| Example 19 | Liquid crystal alignment treating agent (13) | Liquid crystal composition (3) | Good/*2 | Good |
| Example 20 | Liquid crystal alignment treating agent (14) | Liquid crystal composition (5) | Good/— | Good |
| Example 21 | Liquid crystal alignment treating agent (15) | Liquid crystal composition (4) | Good/— | Good |
| Example 22 | Liquid crystal alignment treating agent (16) | Liquid crystal composition (2) | Good/*4 | Good |

TABLE 23

| | Liquid crystal alignment treating agent | Liquid crystal composition | Adhesion Constant temperature and humidity (standard test) | Ultra-violet rays |
|---|---|---|---|---|
| Comparative Example 1 | Liquid crystal alignment treating agent (17) | Liquid crystal composition (1) | *1 | *1 |
| Comparative Example 2 | Liquid crystal alignment treating agent (17) | Liquid crystal composition (6) | *1 | *1 |
| Comparative Example 3 | Liquid crystal alignment treating agent (18) | Liquid crystal composition (1) | *1 | *1 |
| Comparative Example 4 | Liquid crystal alignment treating agent (18) | Liquid crystal composition (6) | *1 | *1 |
| Comparative Example 5 | Liquid crystal alignment treating agent (3) | Liquid crystal composition (1) | *3 | *2 |
| Comparative Example 6 | Liquid crystal alignment treating agent (3) | Liquid crystal composition (6) | *2 | *2 |
| Comparative Example 7 | Liquid crystal alignment treating agent (4) | Liquid crystal composition (1) | *3 | *2 |
| Comparative Example 8 | Liquid crystal alignment treating agent (4) | Liquid crystal composition (6) | *2 | *2 |
| Comparative Example 9 | Liquid crystal alignment treating agent (13) | Liquid crystal composition (1) | *3 | *2 |
| Comparative Example 10 | Liquid crystal alignment treating agent (13) | Liquid crystal composition (6) | *2 | *2 |

*1: Since the liquid crystal was not aligned vertically, no evaluation was possible.
*2: A very small amount of air bubbles was observed in the device.
*3: A small amount (more than *2) of air bubbles was observed in the device.
*4: A lot (more than *3) of air bubbles was observed in the device.

As is evident from the above, the liquid crystal display devices in Examples were, as compared with Comparative Examples, good in optical properties, i.e. in transparency when no voltage was applied, at the initial stage, after the storage in the constant temperature and humidity tank and after the irradiation with ultraviolet rays, and also high in adhesion between the liquid crystal layer and the liquid crystal alignment film. These properties were good also when plastic substrates were used as the substrates in the liquid crystal display device.

In particular, in Examples using the specific ultraviolet irradiation apparatus, as compared with in Comparative Examples using the metal halide type ultraviolet irradiation apparatus, transparency of the liquid crystal display device when no voltage was applied, was high, and scattering properties after storage in the constant temperature and humidity tank and after irradiation with ultraviolet rays were excellent, specifically in comparisons between Example 4 and Comparative Example 5, between Example 5 and Comparative Example 7, and between Example 18 and Comparative Example 9, under the same conditions.

In Examples containing a specific compound in the liquid crystal composition, as compared with Comparative Examples containing no specific compound, transparency of the liquid crystal display device when no voltage was applied, became particularly high, specifically in comparisons between Example 4 and Comparative Example 6, between Example 5 and Comparative Example 8, and between Example 18 and Comparative Example 10, under the same conditions.

In Comparative Examples using a liquid crystal alignment treating agent containing a polymer not containing the specific side chain structure (1), the liquid crystal was not vertically aligned, specifically in Comparative Examples 1 to 4.

In a case where the amount of a specific compound in the liquid crystal composition was large, as compared with a case where it was less, transparency of the liquid crystal display device when no voltage was applied, became high, specifically in a comparison between Examples 6 and 7 under the same conditions.

Further, in a case where in the liquid crystal composition, a polyfunctional thiol compound and urethane acrylate were incorporated, as compared with a case where they were not incorporated, adhesion between the liquid crystal layer and the liquid crystal alignment film in the liquid crystal display device became more improved, specifically in comparisons between Example 7 and Example 8, between Example 14 and Example 15, and between Example 18 and Example 19.

Among the specific side chain structures, in the case of using a diamine having a structure of the formula [2-1], as compared with the case of using a diamine having a structure of the formula [2-2], transparency of the liquid crystal display device when no voltage was applied, became high, and also after storage in a constant temperature and humidity tank for a long time, as was conducted in the emphasized test, transparency when no voltage was applied, became high. Further, in the evaluation of adhesion between the liquid crystal layer and the liquid crystal alignment film, in the case of using a diamine having a structure of the formula [2-1], such adhesion became high even after storage in a constant temperature and humidity tank for a long time, as conducted by the emphasized test, specifically in comparisons between Example 5 and Example 17 and between Example 18 and Comparative Example 22, under the same conditions.

Further, in a case where in the liquid crystal alignment treating agent, a specific generating agent, a specific adhesion compound and a specific crosslinkable compound were incorporated, as compared with the case where they were not incorporated, such a result was obtained that adhesion between the liquid crystal layer and the liquid crystal alignment film in the liquid crystal display device was further improved, specifically, in a comparison between Example 1 and Example 2, under the same conditions.

INDUSTRIAL APPLICABILITY

The liquid crystal display device of the present invention (the present device) is useful for a liquid crystal display for the purpose of display, and further, for a dimming window or a light shutter element for controlling the transmission and blocking of light.

The present device is suitable for use as a liquid crystal display device to be used in transportation equipment or machines, such as automobiles, railways, aircrafts, etc., specifically suitable for use as a light shutter device, etc. to be used for a dimming window or a room mirror to control transmission and blocking of light. In particular, the present device has good transparency when a voltage is not applied and good scattering properties when a voltage is applied, and in a case where the present device is used on a glass window of a vehicle, the efficiency for intaking light at night time will be high, and the effect of preventing the glare from ambient light will be also high. Therefore, the safety and ride comfort at the time of driving a vehicle, can be further improved. Further, in a case where the present device is made of a film, and used as bonded on a vehicle glass window, as compared with a conventional reverse device, failure or deterioration caused by low adhesion between the liquid crystal layer and the liquid crystal alignment film is less likely to occur, whereby the reliability of the device will be high.

Furthermore, the present device is useful as a light guide plate for a display device such as LCD, OLED, etc., or as a back plate for a transparent display. Specifically, in a case where it is used as a back plate for a transparent display, when the transparent display and the present device are combined to carry out a screen display on the transparent display, it is possible to prevent entering of light from the back. The present device becomes a scattering state when a voltage is applied at the time of performing a screen display on the transparent display, whereby it is possible to sharpen the image display, and after the screen display is finished, it becomes a transparent state under no application of a voltage.

The entire disclosure of Japanese Patent Application No. 2014-227294 filed on Nov. 7, 2014 including specification, claims, drawings and summary is incorporated herein by reference in its entirety.

REFERENCE SYMBOLS 1, 2: specific ultraviolet irradiation apparatus, 2: light-emitting section, 3: power supply unit, 4: sensor, 5: control unit, 6, 7: flexible cord, 8: transmission path, 2a, 2b: light-emitting section, 3: power supply unit, 4a, 4b: sensor, 5: control unit, 8: transmission path, 9a, 9b: cable, 10a, 10b: cable

The invention claimed is:

1. A liquid crystal display device having a liquid crystal layer formed by disposing a liquid crystal composition containing a liquid crystal and a polymerizable compound between a pair of substrates provided with electrodes and irradiating and curing the composition with ultraviolet rays by an ultraviolet irradiation apparatus, wherein the irradiating and curing are performed while maintaining a substrate surface temperature in a range of 0 to 30° C. and at least one of the substrates being provided with a liquid crystal alignment film to vertically align a liquid crystal, wherein the ultraviolet irradiation apparatus is an ultraviolet irradiation apparatus capable of controlling the irradiation light intensity and wavelength of the ultraviolet rays to be irradiated and the surface temperature of the pair of the substrates, said liquid crystal composition contains a compound represented by the following formula [1], and said liquid crystal alignment film is a liquid crystal alignment film obtained from a liquid crystal alignment treating agent containing a polymer having a side chain structure represented by the following formula [2-1] or formula [2-2]:

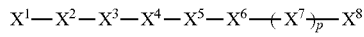  [1]

wherein
X¹ is at least one selected from the group consisting of the following formula [1-a] to formula [1-g],
X² is at least one bond group selected from the group consisting of a single bond, —O—, —NH—, —N(CH₃)—, —CH₂O—, —CONH—, —NHCO—, —CON(CH₃)—, —N(CH₃)CO—, —COO— and —OCO—,
X³ is a single bond or —(CH₂)$_a$—, wherein a is an integer of from 1 to 15,
X⁴ is at least one bond group selected from the group consisting of a single bond, —O—, —OCH₂—, —COO— and —OCO—,
X⁵ is a benzene ring, a cyclohexane ring or a $C_{17\text{-}51}$ divalent organic group having a steroid skeleton,
X⁶ is at least one bond group selected from the group consisting of a single bond, —O—, —OCH₂—, —CH₂O—, —COO— and —OCO—,
X⁷ is a benzene ring or a cyclohexane ring, wherein any optional hydrogen atom on the cyclic group of said X⁵ or X⁷ may be substituted by a $C_{1\text{-}3}$ alkyl group, a $C_{1\text{-}3}$ alkoxy group, a $C_{1\text{-}3}$ fluorinated alkyl group, a $C_{1\text{-}3}$ fluorinated alkoxy group or a fluorine atom,
p is an integer of from 0 to 4, and
X⁸ is at least one selected from the group consisting of a $C_{1\text{-}18}$ alkyl group, a $C_{2\text{-}18}$ alkenyl group, a $C_{1\text{-}18}$ fluorinated alkyl group, a $C_{1\text{-}18}$ alkoxy group and a $C_{1\text{-}18}$ fluorinated alkoxy group,

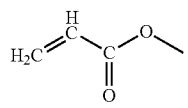  [1-a]

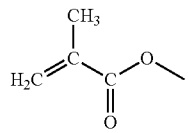  [1-b]

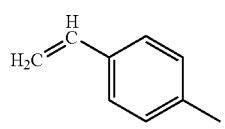  [1-c]

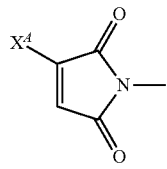  [1-d]

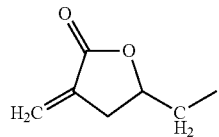  [1-e]

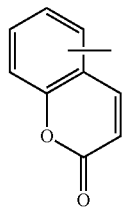  [1-f]

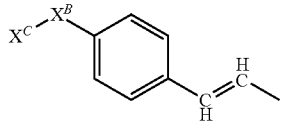  [1-g]

wherein
$X^A$ is a hydrogen atom or a benzene ring,
$X^B$ is at least one cyclic group selected from the group consisting of a benzene ring, a cyclohexane ring and a heterocyclic ring, and
$X^C$ is at least one selected from the group consisting of a $C_{1\text{-}18}$ alkyl group, a $C_{1\text{-}18}$ fluorinated alkyl group, a $C_{1\text{-}18}$ alkoxy group and a $C_{1\text{-}18}$ fluorinated alkoxy group,

  [2-1]

wherein
Y¹ is at least one bond group selected from the group consisting of a single bond, —(CH₂)$_n$—, wherein a is an integer of from 1 to 15, —O—, —CH₂O—, —CONH—, —NHCO—, —CON(CH₃)—, —N(CH₃)CO—, —COO— and —OCO—,
Y² is a single bond or —(CH₂)$_b$—, wherein b is an integer of from 1 to 15,
Y³ is at least one selected from the group consisting of a single bond, —(CH₂)$_c$—, wherein c is an integer of from 1 to 15, —O—, —CH₂O—, —COO— and —OCO—,
Y⁴ is at least one divalent cyclic group selected from the group consisting of a benzene ring, a cyclohexane ring and a heterocyclic ring, or a $C_{17\text{-}51}$ divalent organic group having a steroid skeleton,
Y⁵ is at least one divalent cyclic group selected from the group consisting of a benzene ring, a cyclohexane ring and a heterocyclic ring, wherein any optional hydrogen atom on the cyclic group of said Y⁴ or Y⁵ may be substituted by a $C_{1\text{-}3}$ alkyl group, a $C_{1\text{-}3}$ alkoxy group, a $C_{1\text{-}3}$ fluorinated alkyl group, a $C_{1\text{-}3}$ fluorinated alkoxy group or a fluorine atom,
n is an integer of from 0 to 4, and
Y⁶ is at least one selected from the group consisting of a $C_{1\text{-}8}$ alkyl group, a $C_{2\text{-}18}$ alkenyl group, a $C_{1\text{-}18}$ fluorinated alkyl group, a $C_{1\text{-}18}$ alkoxy group and a $C_{1\text{-}18}$ fluorinated alkoxy group,

  [2-2]

wherein
Y⁷ is at least one bond group selected from the group consisting of a single bond, —O—, —CH₂O—, —CONH—, —NHCO—, —CON(CH₃)—, —N(CH₃)CO—, —COO— and —OCO—, and
Y⁸ is a $C_{8\text{-}22}$ alkyl group or a $C_{6\text{-}18}$ fluorinated alkyl group.

2. The liquid crystal display device according to claim 1, wherein the ultraviolet irradiation apparatus is constructed so that a plurality of ultraviolet light emitting diodes are provided in a light emitting section; the light emitting section is constructed to be movable to an optional position in a working space, and so that the directivity angle of the irradiation light can be freely changed; a sensor for measuring the irradiation light intensity of ultraviolet rays irradiated from the ultraviolet light emitting diodes, the brightness at the surface of the object to be treated and the surface temperature of the object to be treated, is disposed in the vicinity of the light emitting section; and from the measured values by the sensor, the irradiation intensity of ultraviolet rays to the object to be treated, the brightness, and the output condition of the ultraviolet light emitting diodes required to bring the temperature to be within a predetermined range, are calculated and output to a power supply unit, or the ultraviolet irradiation apparatus has one or a plurality of light emitting section in which a plurality of ultraviolet light emitting diodes are aligned in a planar direction, and is constructed so that planar exposure can be applied to the object to be treated; a sensor for measuring the intensity of ultraviolet rays irradiated from the ultraviolet light emitting diodes, the brightness at the surface of the object to be treated and the surface temperature of the object to be treated, is disposed in the vicinity of the light emitting section; and from the measured values by the sensor, the irradiation intensity of ultraviolet rays to the object to be treated, the brightness, and the output condition of the ultraviolet light emitting diodes required to bring the temperature to be within a predetermined range, are calculated and output to a power supply unit.

3. The liquid crystal display device according to claim 2, wherein the irradiation light intensity in the ultraviolet irradiation apparatus is from 1 to 40 mW/cm².

4. The liquid crystal display device according to claim 2, wherein the surface temperature of the object to be treated at the time of irradiation with ultraviolet rays by using the ultraviolet irradiation apparatus, is from 15 to 30° C.

5. The liquid crystal display device according to claim 2, wherein the irradiation time with ultraviolet rays at the time of irradiation with ultraviolet rays by using the ultraviolet irradiation apparatus, is from 5 to 120 seconds.

6. The liquid crystal display device according to claim 1, wherein the compound represented by the formula [1] is at least one selected from the group consisting of the following formula [1a-1] to formula [1a-6]:

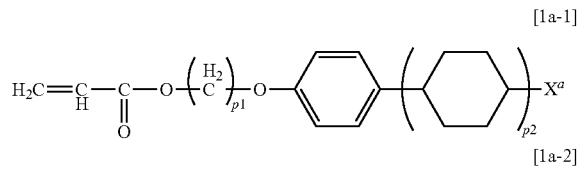

[1a-1]

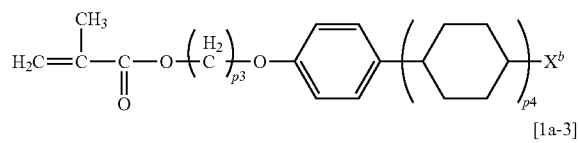

[1a-2]

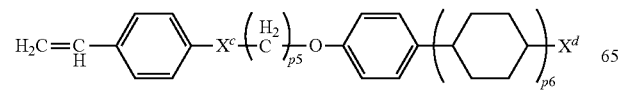

[1a-3]

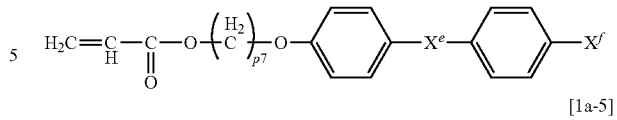

[1a-4]

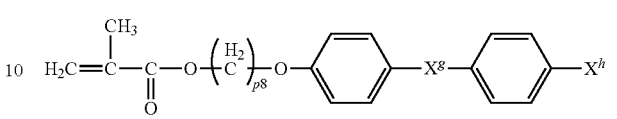

[1a-5]

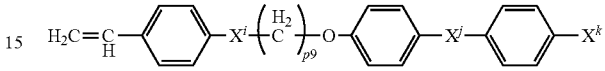

[1a-6]

wherein $X^a$, $X^b$, $X^d$, $X^f$, $X^h$ and $X^k$ are each independently a $C_{1-18}$ alkyl group or a $C_{1-18}$ alkoxy group, $X^c$ and $X^i$ are each independently —O—, —COO— or —OCO—, $X^e$, $X^g$ and $X^j$ are each independently —CH$_2$—, —O—, —COO— or —OCO—, p1, p3, p5, p7, p8 and p9 are each independently an integer of from 1 to 12, and p2, p4 and p6 are each independently an integer of 1 or 2.

7. The liquid crystal display device according to claim 1, wherein the liquid crystal has a phase transition temperature of from 40 to 120° C., a refractive index anisotropy (Δn) of from 0.150 to 0.350, and a dielectric anisotropy (Δε) of from −1 to −10.

8. The liquid crystal display device according to claim 1, wherein the polymerizable compound contained in the liquid crystal composition contains a polyfunctional thiol compound and an urethane acrylate or urethane methacrylate.

9. The liquid crystal display device according to claim 1, wherein the liquid crystal composition contains an organic phosphoric acid compound.

10. The liquid crystal display device according to claim 1, wherein the liquid crystal alignment treating agent contains at least one polymer selected from the group consisting of an acrylic polymer, a methacrylic polymer, a novolak resin, a polyhydroxystyrene, a polyimide precursor, a polyimide, a polyamide, a polyester, a cellulose and a polysiloxane.

11. The liquid crystal display device according to claim 1, wherein the liquid crystal alignment treating agent contains a polyimide precursor obtained by a reaction of a tetracarboxylic acid component and a diamine component containing a diamine having a side chain structure of the formula [2-1] or formula [2-2], or a polyimide obtained by imidizing the polyimide precursor.

12. The liquid crystal display device according to claim 11, wherein the diamine having a side chain structure represented by the formula [2-1] or formula [2-2] is a diamine represented by the following formula [2a]:

[2a]

wherein Y is a structure represented by the formula [2-1] or formula [2-2], and m is an integer of from 1 to 4.

13. The liquid crystal display device according to claim 11, wherein the diamine component contains a diamine having a side chain structure represented by the following formula [3]:

$$—W^1—W^2—W^3—W^4 \quad [3]$$

wherein
W$^1$ is at least one bond group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—,
W$^2$ is a single bond, a C$_{1-18}$ alkylene group or a C$_{6-24}$ organic group having at least one cyclic group selected from the group consisting of a benzene ring, a cyclohexane ring and a heterocyclic ring, wherein any optional hydrogen atom on the cyclic group may be substituted by a C$_{1-3}$ alkyl group, a C$_{1-3}$ alkoxy group, a C$_{1-3}$ fluorinated alkyl group or a C$_{1-3}$ fluorinated alkoxy group,
W$^3$ is at least one selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—, and
W$^4$ is at least one selected from the group consisting of structures represented by the following formula [3-a] to formula [3-g]:

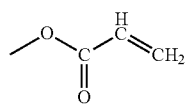
[3-a]

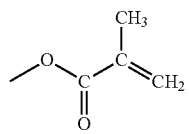
[3-b]

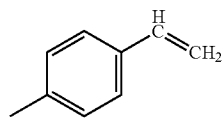
[3-c]

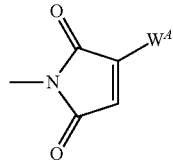
[3-d]

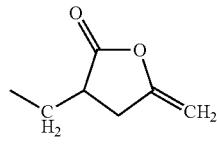
[3-e]

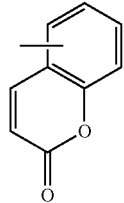
[3-f]

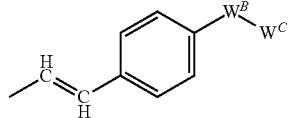
[3-g]

wherein
W$^A$ is a hydrogen atom or a benzene ring,
W$^B$ is at least one cyclic group selected from the group consisting of a benzene ring, a cyclohexane ring and a heterocyclic group, and
W$^C$ is at least one selected from the group consisting of a C$_{1-18}$ alkyl group, a C$_{1-18}$ fluorinated alkyl group, a C$_{1-18}$ alkoxy group and a C$_{1-18}$ fluorinated alkoxy group.

14. The liquid crystal display device according to claim 13, wherein the diamine having a side chain structure represented by the formula [3] is a diamine represented by the following formula [3a]:

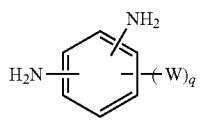
[3a]

wherein W is a structure represented by the formula [3], and q is an integer of from 1 to 4.

15. The liquid crystal display device according to claim 11, wherein the tetracarboxylic acid component is a tetracarboxylic acid component comprising a tetracarboxylic dianhydride represented by the following formula [5]:

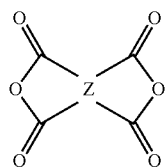
[5]

wherein Z is at least one selected from the group consisting of the following formula [5a] to formula [5k]:

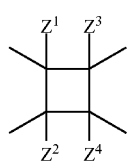
[5a]

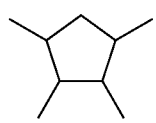
[5b]

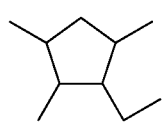
[5c]

-continued

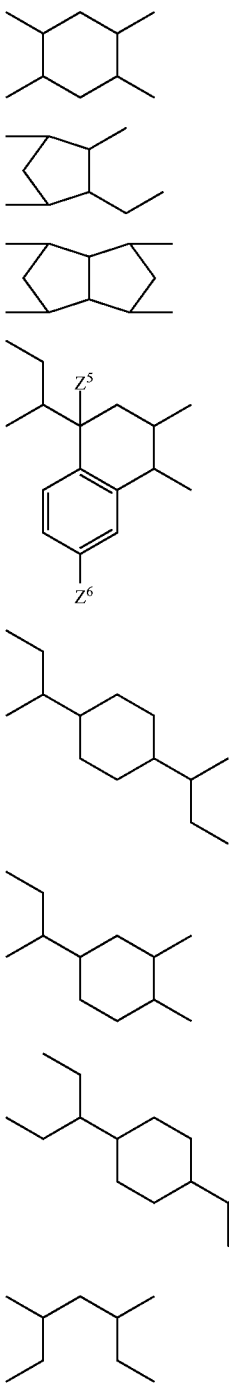

[5d]

[5e]

[5f]

[5g]

[5h]

[5i]

[5j]

[5k]

wherein
$Z^1$ to $Z^4$ are each independently at least one selected from the group consisting of a hydrogen atom, a methyl group, a chlorine atom and a benzene ring, and
$Z^5$ and $Z^6$ are each independently a hydrogen atom or a methyl group.

16. The liquid crystal display device according to claim 1, wherein the liquid crystal alignment treating agent contains a polysiloxane obtained by poly-condensing an alkoxysilane represented by the following formula [A1], or a polysiloxane obtained by poly-condensing an alkoxysilane represented by the formula [A1] and an alkoxysilane represented by the following formula [A2] and/or formula [A3]:

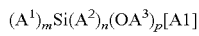 [A1]

wherein
$A^1$ is a side chain structure represented by the formula [2-1] or formula [2-2],
$A^2$ is a hydrogen atom or a $C_{1-5}$ alkyl group,
$A^3$ is a $C_{1-5}$ alkyl group,
m is an integer of 1 or 2,
n is an integer of from 0 to 2, and
p is an integer of from 0 to 3, provided that m+n+p is 4,

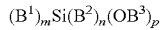 [A2]

wherein
$B^1$ is a $C_{2-12}$ organic group having at least one selected from the group consisting of a vinyl group, an epoxy group, an amino group, a mercapto group, an isocyanate group, a methacryl group, an acryl group, an ureido group and a cinnamoyl group,
$B^2$ is a hydrogen atom or a $C_{1-5}$ alkyl group,
$B^3$ is a $C_{1-5}$ alkyl group, m is an integer of 1 or 2,
n is an integer of from 1 to 2, and
p is an integer of from 0 to 3, provided that m+n+p is 4,

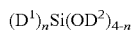 [A2]

wherein
$D^1$ is a hydrogen atom or a $C_{1-5}$ alkyl group,
$D^2$ is a $C_{1-5}$ alkyl group, and
n is an integer of from 0 to 3.

17. The liquid crystal display device according to claim 1, wherein the liquid crystal alignment treating agent contains at least one generating agent selected from the group consisting of a photo-radical generating agent, a photo-acid generating agent and a photo-base generating agent.

18. The liquid crystal display device according to claim 1, wherein the liquid crystal alignment treating agent contains a compound having at least one group selected from the group consisting of the following formula [b-1] to formula [b-8]:

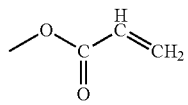 [b-1]

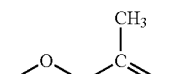 [b-2]

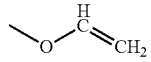 [b-3]

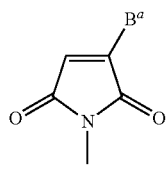 [b-4]

 [b-5]

-continued

[b-6]

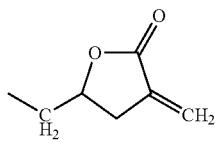

[b-7]

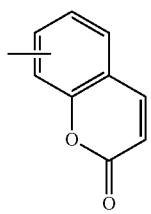

[b-8]

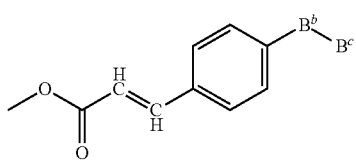

wherein
$B^a$ is a hydrogen atom or a benzene ring,
$B^b$ is at least one cyclic group selected from the group consisting of a benzene ring, a cyclohexane ring and a heterocyclic ring, and
$B^c$ is at least one selected from the group consisting of a $C_{1-18}$ alkyl group, a $C_{1-18}$ fluorinated alkyl group, a $C_{1-18}$ alkoxy group and a $C_{1-18}$ fluorinated alkoxy group.

19. The liquid crystal display device according to claim 1, wherein the liquid crystal alignment treating agent contains a compound having at least one substituent selected from the group consisting of an epoxy group, an isocyanate group, an oxetane group, a cyclocarbonate group, a hydroxy group, a hydroxyalkyl group and a $C_{1-3}$ alkoxyalkyl group.

20. The liquid crystal display device according to claim 1, wherein the liquid crystal alignment treating agent contains at least one solvent selected from the group consisting of 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone and solvents represented by the following formula [D1] to formula [D3]:

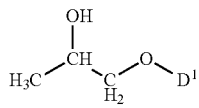

[D1]

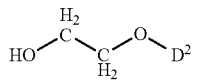

[D2]

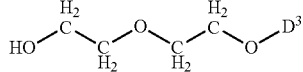

[D3]

wherein $D^1$, $D^2$ and $D^3$ are each a $C_{1-4}$ alkyl group.

21. The liquid crystal display device according to claim 1, wherein the liquid crystal alignment treating agent contains at least one solvent selected from the group consisting of N-methyl-2-pyrrolidone, N-ethyl-2-pyrrolidone and γ-butyrolactone.

22. The liquid crystal display device according to claim 1, wherein the thickness of the liquid crystal layer is from 5 to 20 μm.

23. The liquid crystal display device according to claim 1, wherein the substrates of the liquid crystal display device are glass substrates or plastic substrates.

* * * * *